United States Patent [19]
Faville

[11] Patent Number: 5,160,978
[45] Date of Patent: Nov. 3, 1992

[54] AUTOMATED DRILL BIT RECOGNITION SYSTEM

[75] Inventor: Paul E. Faville, Renton, Wash.

[73] Assignee: The Boeing Company, Seattle, Wash.

[21] Appl. No.: 706,961

[22] Filed: May 29, 1991

[51] Int. Cl.$^5$ .................. G01B 11/02; G01B 11/08
[52] U.S. Cl. .................. 356/394; 209/579;
  209/586; 356/383; 356/386; 364/559; 364/562;
  364/563
[58] Field of Search .............. 356/372, 383, 384, 385,
  356/386, 387, 394; 364/560, 562, 564, 559,
  551.02; 209/576, 577, 578, 579, 586

[56] References Cited
U.S. PATENT DOCUMENTS

| | | | |
|---|---|---|---|
| 3,052,999 | 9/1962 | Sedgwick et al. | 40/2.2 |
| 3,128,645 | 4/1964 | Anthony | 77/5 |
| 3,251,150 | 5/1966 | Sedgwick et al. | 40/2.2 |
| 3,366,248 | 1/1968 | Sedgwick et al. | 211/1.5 |
| 3,587,360 | 6/1971 | Oxenham | 77/5 |
| 3,805,393 | 4/1974 | Lemelson | 33/174 |
| 3,869,800 | 3/1975 | Bartlett et al. | 33/174 |
| 4,271,967 | 6/1981 | Matsuo et al. | 356/383 |
| 4,533,823 | 8/1985 | Vittorio | 235/375 |
| 4,657,395 | 4/1987 | Shiraishi et al. | 356/385 |
| 4,923,067 | 5/1990 | Fuller, Jr. et al. | 209/539 |
| 4,924,998 | 5/1990 | Fuller, Jr. | 198/365 |
| 4,933,074 | 6/1990 | Fuller, Jr. et al. | 209/540 |
| 4,940,128 | 7/1990 | Fuller, Jr. et al. | 198/395 |

*Primary Examiner*—F. L. Evans
*Attorney, Agent, or Firm*—Bruce A. Kaser

[57] ABSTRACT

The invention is an apparatus and method for determining and identifying drill bit type in a simple manner that does not involve complex mathematical techniques. The invention utilizes a laser scanner that produces a plurality of crosswise diameter measurements taken equidistantly along each drill bit's length. The crosswise measurement indicates the diameter of the bit's silhouette at a given location. By comparing such diameters with what would be expected for a given bit, the bit's shank type, maximum diameter, flute characteristics and length can be accurately ascertained. Having such information enables identification of the bit so that it may be later kept track of during subsequent sorting and refurbishment operations.

16 Claims, 8 Drawing Sheets

AUTOMATED DRILL BIT RECOGNITION SYSTEM

DESCRIPTION

1. Technical Field

This invention generally relates to automated systems for identifying and typing large numbers of articles that are used in manufacturing environments. More particularly, it relates to automated systems for sorting large numbers of drill bits with respect to size and type.

2. Copyright Claim

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

3. Background Information

Many large-scale manufacturing operations use huge numbers of drilling, cutting and milling bits and blades. By way of illustration, The Boeing Company, who is the assignee of the invention disclosed here, is presently using approximately 6,000,000 general purpose drill bits each year at its various manufacturing facilities in the Puget Sound region of Washington state. Nearly all of these bits are periodically returned to a single refurbishment or resharpening facility approximately seven times, on average, during the useful life of each bit.

These bits come in a wide variety of types and sizes. At Boeing, there are twenty basic types which can be broken down into sub-types on the basis of differences in length, diameter, and flute characteristics. Taking into account all of these variations results in more than six hundred unique drill bit configurations, all of which must be identified and sorted before bit refurbishment.

In many manufacturing environments, it is common to identify and sort bits by hand, which is time-consuming and tedious. At Boeing, for example, given the large number of bits in use there, hand-sorting represented a significant cost detriment from the standpoint of the high amount of labor required, on a nearly round-the-clock basis, in order to keep up with the volume of sorting required. Further, and as one would imagine, sorting one bit after another during the course of a work shift becomes extremely dull and boring for the laborer, which makes hand-sorting subject to a relatively high degree of error given the relatively small differences between certain types of bits. For this reason, Boeing has developed an automated drill sorting system that has taken the drill-bit sorting process almost completely out of human hands, and consequently sorts bits more quickly and accurately than was ever previously done by hand labor.

A large portion of Boeing's drill sorting system consists of mechanical conveying and sorting machinery that receives large numbers of bits in bulk, and automatically separates them and places them, in single file, onto a specialized gravity conveyor apparatus. The bits are conveyed in a generally end-to-end orientation, and the conveyor apparatus includes a mechanism for orienting or reorienting bits, as the case may be, so that each has a common leading and following end. As each bit moves through the conveyor apparatus, it is identified as to type, and is thereafter received by a carrier. The carrier moves the bit to an appropriate bin, corresponding to bit type, where it is stored for later refurbishment along with bits of the same type.

The Boeing Company has several issued patents or patent applications that relate to various aspects of the above-described system, all of which are identified below. One such patent, issued on Jul. 10, 1990 as U.S. Pat. No. 4,940,128, is titled "Article Orientation System and Method." It generally discloses the gravity conveyor apparatus briefly described above, and along with the other patents referenced below, also describes, in a very generalized fashion, how individual bits are identified. The gravity conveyor apparatus disclosed there makes up an important part of the present invention, although, as will become apparent, the conveyor embodiment disclosed here is not the same as the '128 conveyor. More importantly, none of Boeing's prior patents disclose the particular way or system of recognizing individual bits by using laser technology along the lines of the invention disclosed and claimed here.

Admittedly, the use of laser technology is well-known in connection with measuring the dimensions of objects. For example, one kind of optical micrometer known to the applicant here has a low power helium-neon laser that scans the object to be measured. The laser provides a very narrow and parallel beam that is swept across the item or object to be measured along a path corresponding to the direction of the dimensional measurement which is sought. A photo detector, positioned on the opposite side of the object, receives or collects the beam. As the skilled person would know, the beam is interrupted or "shadowed" by the object's body as it sweeps from one side edge to another. The photo detector outputs a time-dependent signal indicative of the period of the shadow or interrupt, which can be converted into a highly accurate dimension indicating the width of the body silhouette across the path of the sweep. An optical micrometer of this type is manufactured by LaserMike Inc., 6060 Executive Boulevard, Dayton, Ohio 45424, under the trademark "LaserMike," and is further discussed below in the context of the present invention.

As will become apparent, the present invention utilizes an optical micrometer of the above-described type, in combination with a programmed method of operation that is extremely simple in implementation, but is also extremely accurate in its ability to distinguish one type of bit from another, even in situations where there are very minor differences between the bits that are being identified. How the present invention accomplishes this is disclosed below.

RELATED PATENTS AND PATENT APPLICATIONS

The present invention constitutes a portion of an automated drill sorting system that is the subject of the following U.S. patents or patent applications:

1. U.S. Pat. No. 4,940,128, issued on Jul. 10, 1990, and titled "Article Orientation System and Method."

2. U.S. Pat. No. 4,933,074, issued on Jun. 12, 1990, and titled "Article Singulating System and Method."

3. U.S. Pat. No. 4,924,998, issued on May 15, 1990, and titled "Storage Mechanism for Sorted Articles."

4. U.S. Pat. No. 4,923,067, issued on May 8, 1990, and titled "Automated Drill Sorting System and Method."

5. U.S. application Ser. No. 07/469,138, filed Jan. 24, 1990, and titled "Article Orientation System and Method" (divisional application of prior application Ser. No. 07/270,251, which eventually issued as the '128 patent cited above).

The '128 patent generally relates to the gravity conveyor described above, and discloses a rotatable section for changing the end-to-end orientation of a given drill bit so that its orientation will be common with the others travelling along the disclosed gravity conveyor. The '074 patent generally relates to a system that singulates drill bits after they have been received in bulk or, in other words, separates individual bits for later sorting. The '998 patent generally relates to a storage mechanism for holding sorted bits for later refurbishment. Lastly, the '067 patent generally relates to the drill sorting system as a whole, although it does not disclose the drill recognition system which is the subject of the present invention.

SUMMARY OF THE INVENTION

The invention is an apparatus and method for automatically recognizing and distinguishing drill bit types. The apparatus in accordance with the invention is a computer-controlled conveyor mechanism having a feed track that conveys individual bits, one by one, through a pair of scanners. The scanners provide dimensional data relative to each bit. The method involves a specialized software procedure for recognizing and/or ascertaining the identity of each bit by analyzing the dimensional data from the scanners.

Summarizing the apparatus first, it includes a programmable recognition computer that controls and coordinates all hardware operations, and processes scanner data to recognize bit type. The apparatus includes a drill bit feed track that is operable to sequentially convey individual drill bits along a certain path. A first laser scanner is positioned along an upstream portion of the track, and provides a means for determining certain initial information about each bit. As is further summarized and described below, the scanner makes or provides crosswise diameter measurements of each bit's silhouette, from its butt end to its point end.

It is anticipated that all bits will be placed on the track in random alignment, some being aligned point end first, and the others being aligned butt end first. The data provided by the first scanner enables determination of bit orientation, and also determines whether more than one bit has been erroneously placed on the track.

After exiting the first scanner, each bit subsequently passes through both a shuttle mechanism and a flipper mechanism. If the data from the first scanner indicates that more than one bit is positioned side by side on the track, or another object, not to be sorted, has otherwise passed through the scanner, then the shuttle mechanism ejects the bits (or object) into either a recycle or reject container positioned on opposite lateral sides of the track. If the data indicates that any particular bit is moving along the track point end first, then the flipper mechanism is operated to reverse its end-to-end orientation, so that it continues further travel butt end first.

A second laser scanner is also positioned along the track, but downstream of the first scanner and the shuttle and flipper mechanisms just summarized. The second scanner operates similarly to the first, but provides more detailed data in that it provides a plurality of uniformly-spaced crosswise diameter measurements, or scans, of each bit at various equidistant locations along the bit's length. These measurements are analyzed by the recognition computer, and from such analysis, bit shank type, diameter, flute characteristics and length are identified in accordance with the method described below.

Both scanners are laser optical micrometers having a controlled laser beam through which each bit passes. The drill bit feed track also has a drill stroker portion that sequentially receives each bit, and moves it through the second scanner at a certain uniform velocity, to ensure that the distance between each scan of the second scanner is uniformly spaced.

The method of the invention is embodied in the software of the recognition computer. The recognition software is exceedingly simple and utilizes non-complex methods to recognize each bit from the data provided by the second scanner. The computer is programmed to first recognize and distinguish shank type. This is done by selecting certain crosswise measurements, at certain lengthwise locations along the bit, and comparing them with what would be expected for a given shank type at the same locations. If the measured dimensions do not substantially correspond with what is expected, then another comparison is made, but for another shank type, and so on, until a match is obtained. Once the match is made, then shank type is known.

After the shank type has been identified, the software then sequentially analyzes the crosswise diameter measurements forwardly of a certain starting location adjacent the shank. Such location is selected on the basis of where a maximum diameter of the bit should be located for that particular shank. Each measurement is sequentially analyzed, and compared with the diameter at the starting location. If, at any time, the computer determines that three sequential crosswise diameter measurements exceed the starting maximum diameter, then the computer updates the maximum diameter to a present maximum diameter. Such updating continues until all of the crosswise diameter measurements have been analyzed, all the way to the point end of the bit.

At the same time the computer is analyzing the bit's diameter, it is also programmed to determine flute characteristics, and more specifically, it simultaneously determines the location of flute valleys, and the existence of one or two land margins.

The location of the bit's first flute valley is determined by identifying when the crosswise diameter measurements sequentially pass through a certain value such as, for example, 85% of the bit's maximum diameter. When this happens, then the computer knows that the start of a flute valley has been detected, and it notes the location. Diameters are then sequentially scanned to find where they pass through a minimum value. This point is marked as the location of the first flute valley. Thereafter, the computer sequentially analyzes the diameter measurements forwardly of the first flute valley, and looks for a certain maximum after leaving the valley, followed by a decrease in the value of diameters within a certain distance after the flute valley. If the computer detects a series of measurements that follows such pattern, then it knows it has identified a first margin.

Second margins are identified similarly. That is, the computer locates the minimum diameter within the substantially constant range that follows a first margin, and thereafter looks for a series of crosswise diameter measurements within a certain following length, or distance, that goes through another maximum prior to going through another flute valley. If the computer identifies such pattern, then it knows the bit has a second margin.

The second flute valley is identified in the same way the first flute valley is identified. That is, the computer looks for another diameter that is less than 85% of the bit's maximum diameter, and thereafter scans the following diameters and determines where they go through a minimum. The minimum is noted as the location of the second flute valley. Knowing the location or distance between the first and second valleys, and knowing the crosswise or maximum diameter of the bit, makes it easy to calculate the flute helix angle on the basis of known mathematical relationships.

The length of the bit is calculated simply by multiplying the number of crosswise scans taken by the second scanner times the uniform distance between each scan. Knowing the bit's shank type, diameter, flute characteristics and length, enables the computer to assign a unique ID code to each bit, which is used for later bit sorting and refurbishment.

The invention as summarized above, will become more readily understood upon consideration of the following written description, which is to be taken in conjunction with the appended drawings.

BRIEF DESCRIPTION OF THE DRAWINGS

In the drawings, it is to be understood that like reference numerals and letters refer to like parts throughout the various views, unless indicated otherwise, and wherein.

BEST MODE FOR CARRYING OUT THE INVENTION 1.0 System Overview

Figure 1:
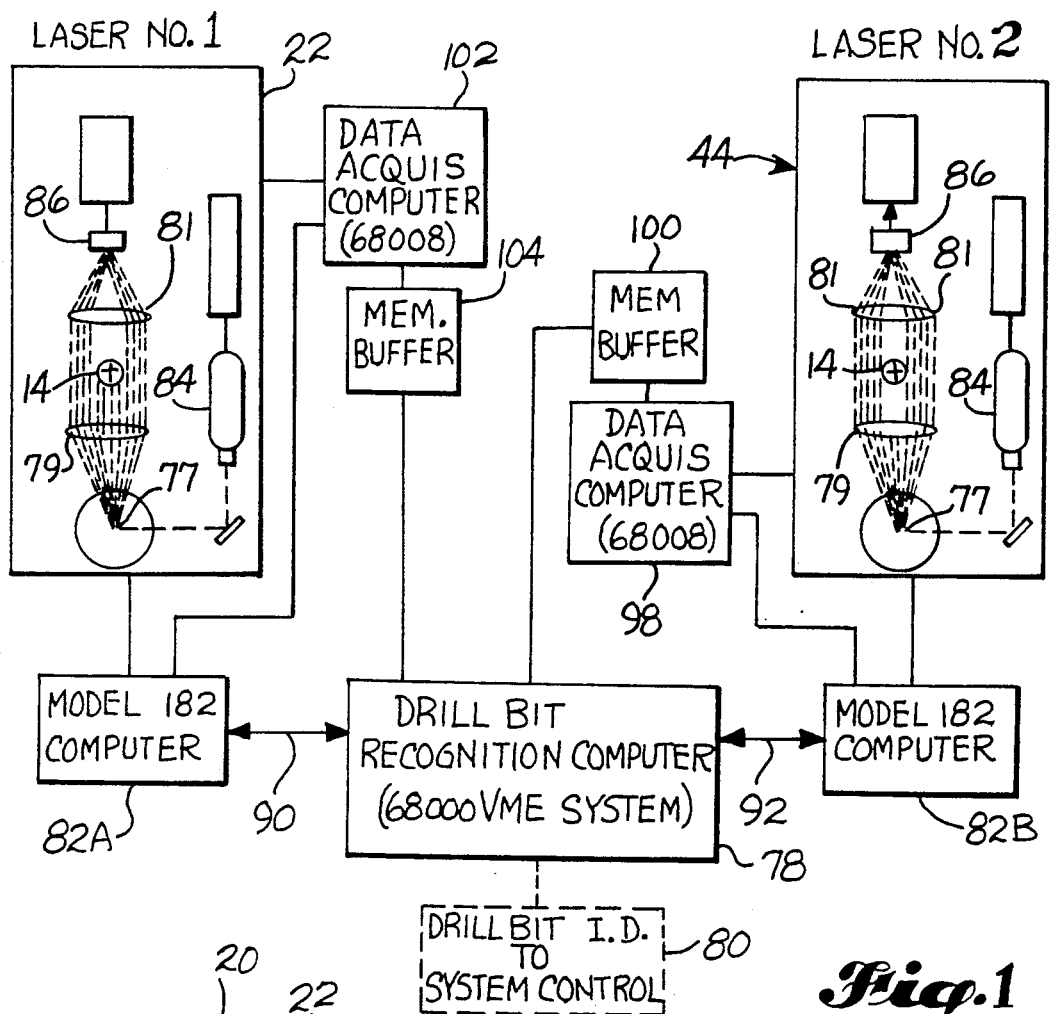
FIG. 1 is a schematic view of an automated drill bit recognition system in accordance with the invention.

Referring now to the drawings, and first to FIG. 1, shown generally at 10 is a drill bit recognition system in accordance with a preferred embodiment of the invention. In operation, the recognition system 10 is adapted to receive drill bits, one at a time, from an automated drill bit separation system along the lines disclosed in U.S. Pat. No. 4,933,074. Bits received from such system are oriented and identified by the recognition system, and thereafter transferred to a storage mechanism along the lines disclosed in U.S. Pat. No. 4,924,998.

Figure 2:
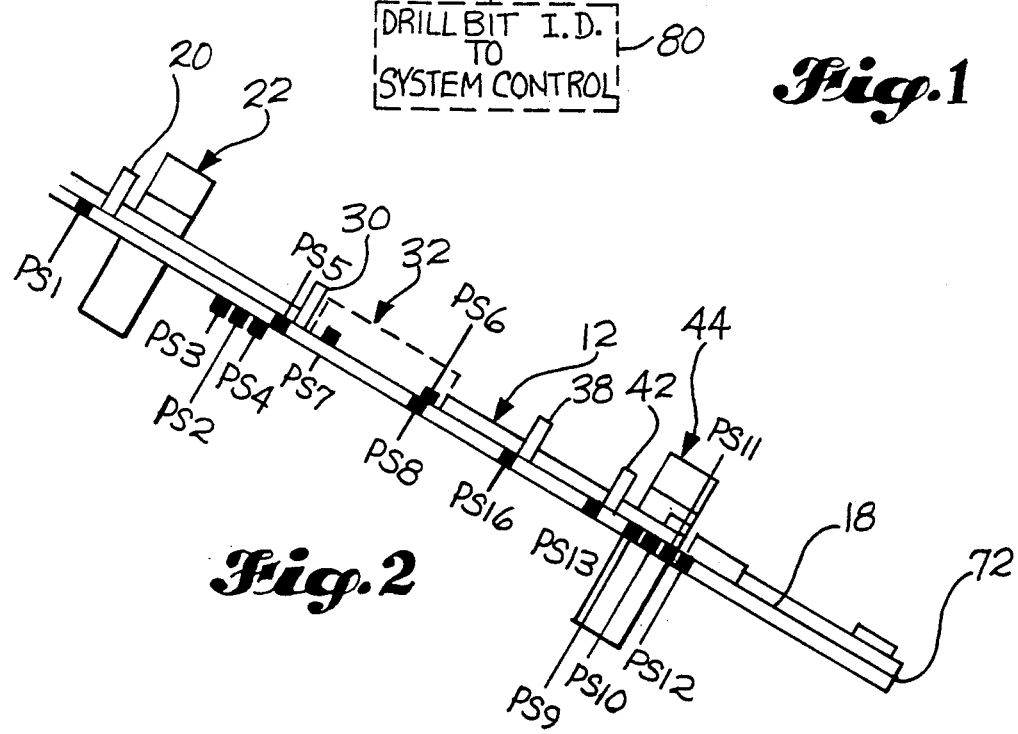
FIG. 2 is a schematic view showing the position of various sensors for controlling conveyance of drill bits or similar articles through a conveyor mechanism in accordance with the invention.
Figure 3:
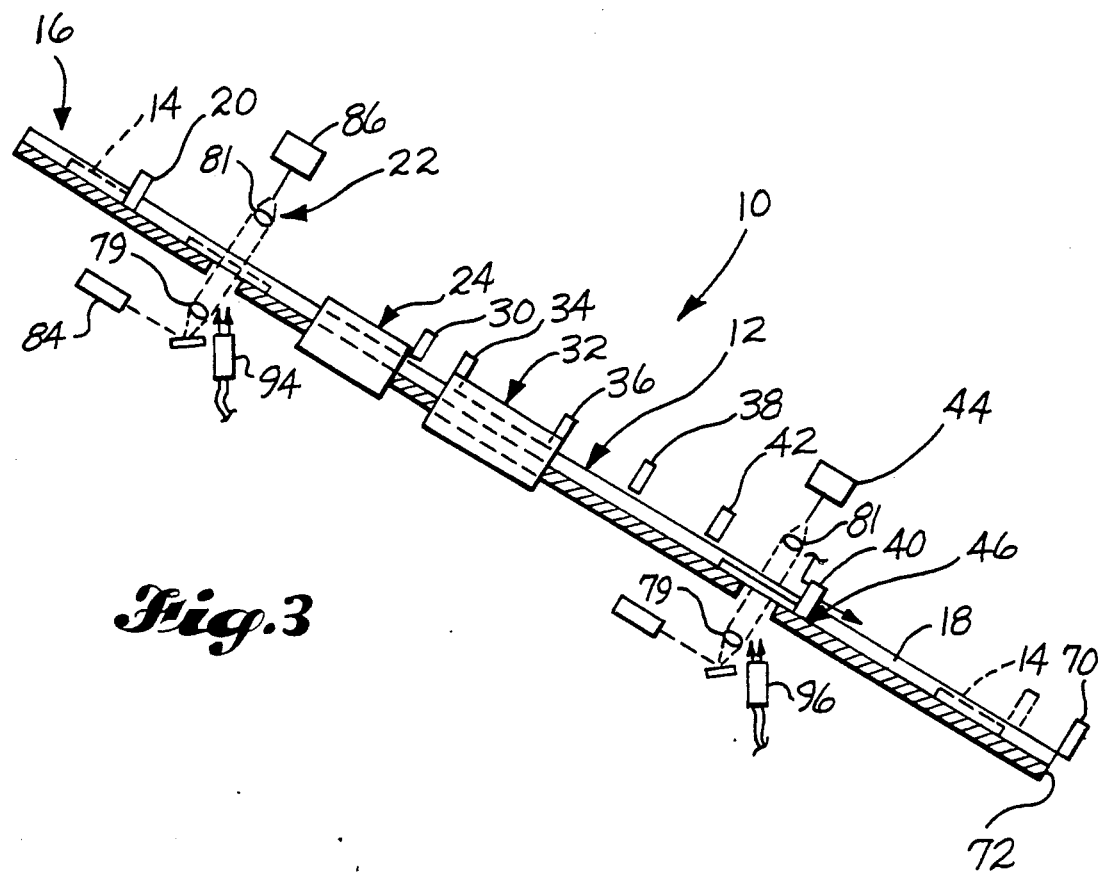
FIG. 3 is a schematic view similar to FIG. 2, but shows how movement of bits through the conveyor mechanism is controlled by gates, and the position of laser sensors for determining bit orientation and type.
Figure 4:
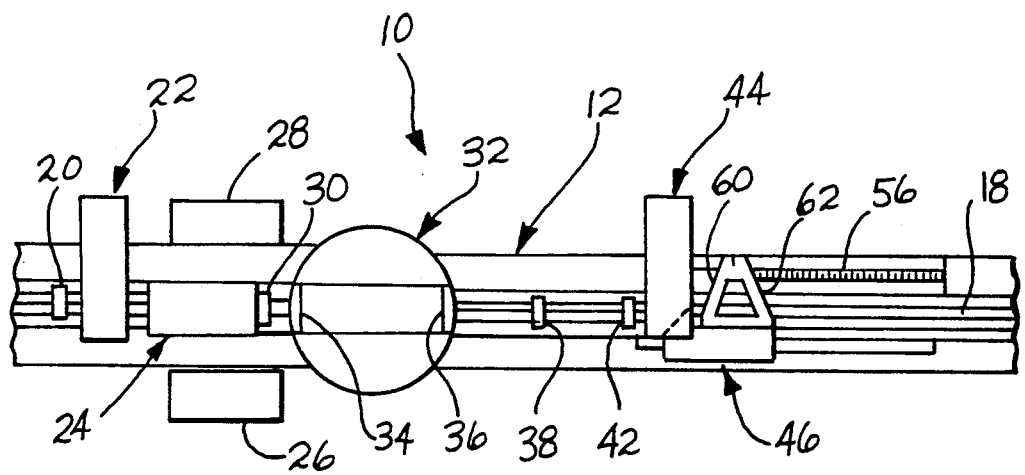
FIG. 4 is a detailed top-plan view of the conveyor mechanism shown in FIGS. 2 and 3.

The recognition system 10 is used in conjunction with a gravity conveyor mechanism that is indicated generally at 12 in FIGS. 2-4. A description of a similar type of gravity conveyor can be found in U.S. Pat. No. 4,940,128, although such patent does not disclose all of the details of the conveyor 12 disclosed here. Such patent does disclose, however, use of an optical micrometer upstream of a rotatable conveyor section for orienting drill bits in a common end-to-end arrangement. That is also an important aspect of the preferred way of carrying out the present invention. It does not disclose a downstream optical micrometer for identifying bit type after proper orientation has been accomplished.

It is to be appreciated that the disclosures of the '128; '074; and '998 patents just mentioned are all incorporated herein by reference. The disclosure of U.S. Pat. No. 4,923,067 is incorporated herein by reference as well. Such patents should be read together along with the present disclosure in order to obtain a good understanding as to how the present invention cooperatively interacts with the independent inventions disclosed in the patents for providing an integrated and automated drill sorter storage system.

Referring now to FIG. 3, the recognition system 10 receives individual drill bits 14 from the separation system of the '074 patent. Each bit 14 is placed on the upper end of the gravity conveyor mechanism 12, in the manner indicated generally by arrow 16 in FIG. 3. After placement on the conveyor 12, the bit 14 travels downwardly by the force of gravity.

The conveyor 12 has a V-shaped plastic track 18 that guides the bit 14 downwardly through the various sections of the conveyor mechanism. Bit movement is further controlled by a plurality of feed gates, in the manner further described below. In preferred form, the conveyor track 18 is approximately ten feet in length, and is sloped approximately 35° from the horizontal.

Seven feed gates are located along the length of the track 18 for controlling drill bit movement. A first gate, indicated at 20, controls bit movement through a first optical micrometer, or laser scanner 22 (sometimes referred to herein as a "laser"), and then into a shuttle mechanism or container 24.

The first laser scanner 22 provides preliminary information or data about the drill bit, which is sufficient to determine the bits' end-to-end orientation, or otherwise determine whether more than one bit was placed on the track 18 at the same time, or some other foreign object or out-of-size bit is on the track.

In the first case, i.e. more than one bit side by side on the track 18, the shuttle container 24 is activated to place the bit in a recycle container 26 (see FIG. 4). Bits in the recycle container 26 are eventually run through the conveyor mechanism 12 again, but at a later time.

In the second case, i.e. an out-of-size bit on the track 18, the shuttle container 24 is manipulated to place the object in a reject container 28, which is positioned on an opposite lateral side of the track 18 relative to the recycle container 26. Objects placed in the reject container 28 are eventually disposed of, or otherwise processed in accordance with the nature of the object rejected.

Exiting movement from the shuttle container 24 is controlled by a second gate 30. This gate permits the bit 14 to enter a flipper mechanism 32, which is a rotatable table having its own feed gates 34, 36. These gates 34, 36 respectively make up a third and fourth gate of the conveyor mechanism 12, and control entry and exiting movement to and from the flipper 32.

Depending on the orientation data provided by the first laser scanner 22, the flipper 32 may rotate in order to provide the bit 14 with the proper end-to-end orientation, which is preferably shank end or butt end first. Naturally, if the first scanner 22 indicates that the bit is oriented properly (tip end trailing), the flipper mechanism 32 does not rotate. In such case, the fourth or exit gate 36 is opened to permit the bit 14 to move further downwardly along conveyor track 18.

As the skilled person would realize, depending on the rotational position of the flipper mechanism 32, in some cases, the third gate 34 of the flipper mechanism functions as the exit gate, and the fourth gate 36 functions as the entryway gate. Such operation was clearly described in the '128 patent referenced above.

After leaving the flipper mechanism 32, further downward travel is controlled by fifth, sixth and seventh feed gates 38, 40, 42. These three gates 38, 40, 42 control bit travel through a second optical micrometer, or laser scanner, which is indicated generally at 44.

The fifth gate 38 intercepts each bit after it leaves the flipper mechanism 32. A drill stroker mechanism, indicated at 46 in FIGS. 3 and 4, controls the bit's rate of downward movement through the second laser scanner 44. It also carries the sixth feed gate 40.

Figure 5:
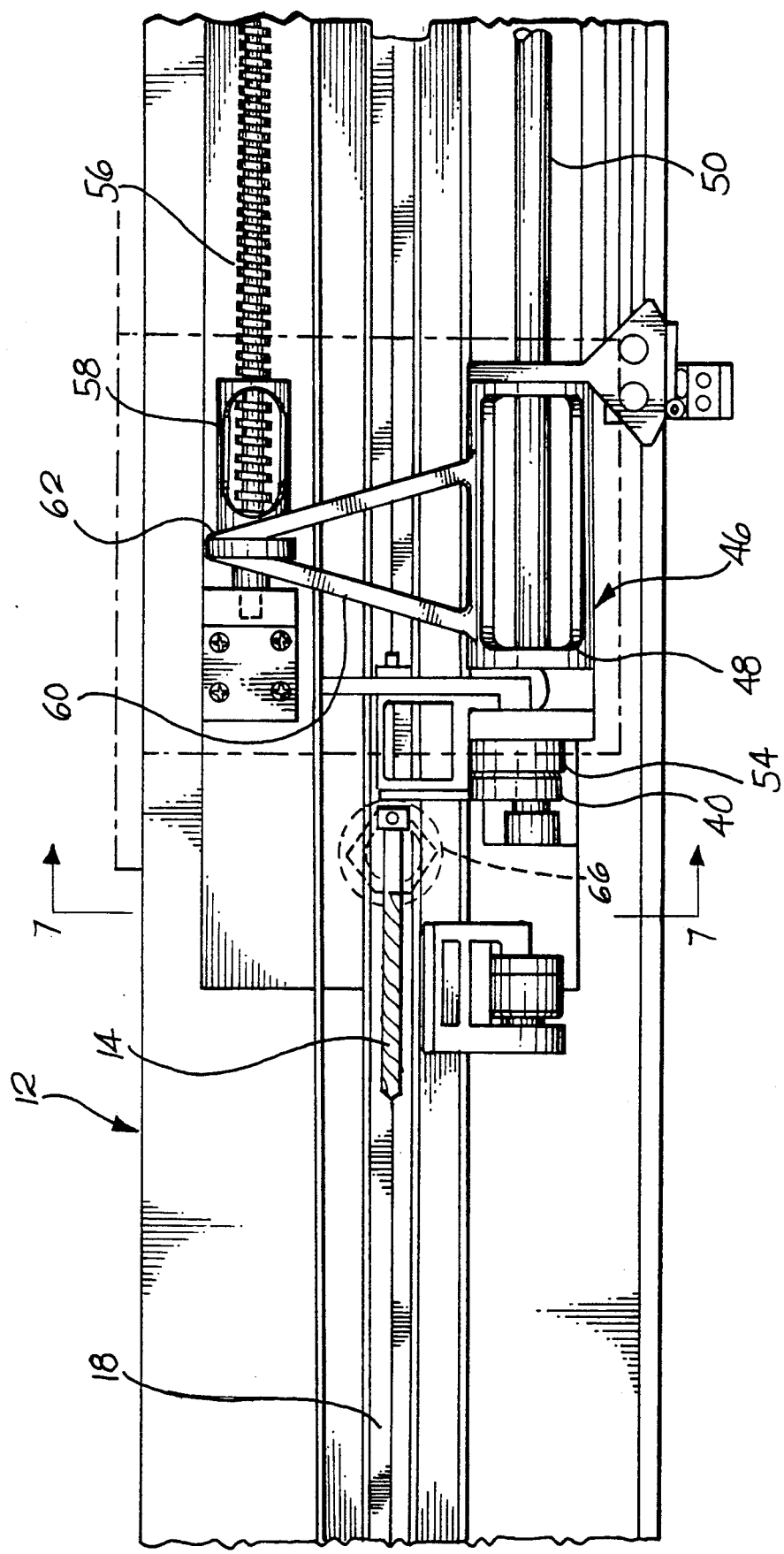
FIG. 5 is an enlarged top plan view of a portion of the conveyor mechanism shown in FIG. 4.
Figure 6:
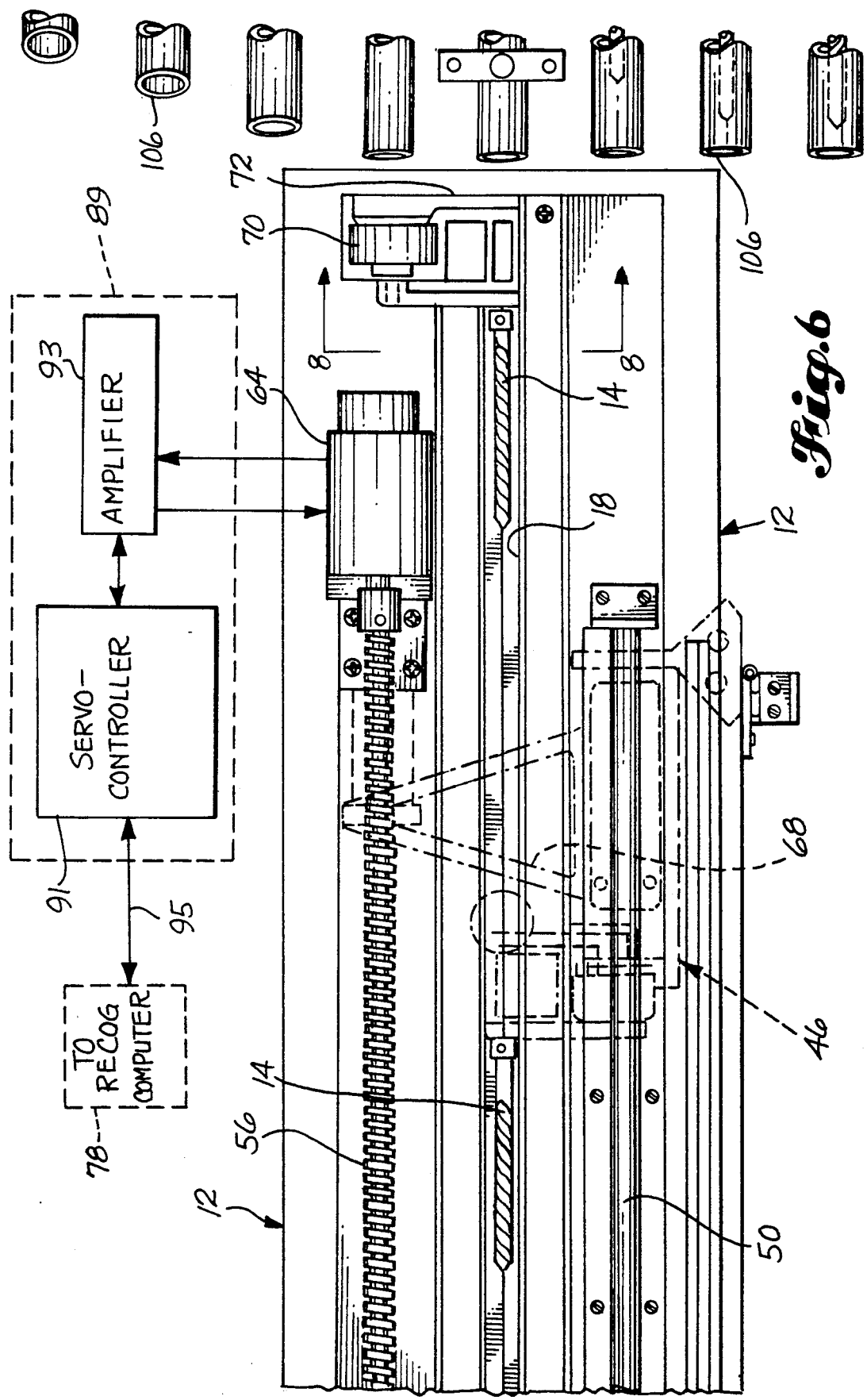
FIG. 6 is a view like FIG. 5, but shows a downstream portion of the conveyor mechanism, and its lower end.

Referring now to FIGS. 5 and 6, the drill stroker 46 consists of a carriage 48 that is mounted to a circular guide rail 50 of the conveyor 12 (see FIG. 7) via a conventional slide bearing 52. The sixth feed gate 40 is rotatably mounted to the upper end of the drill stroker carriage 48, as shown at 54 in FIG. 5.

Figure 7:
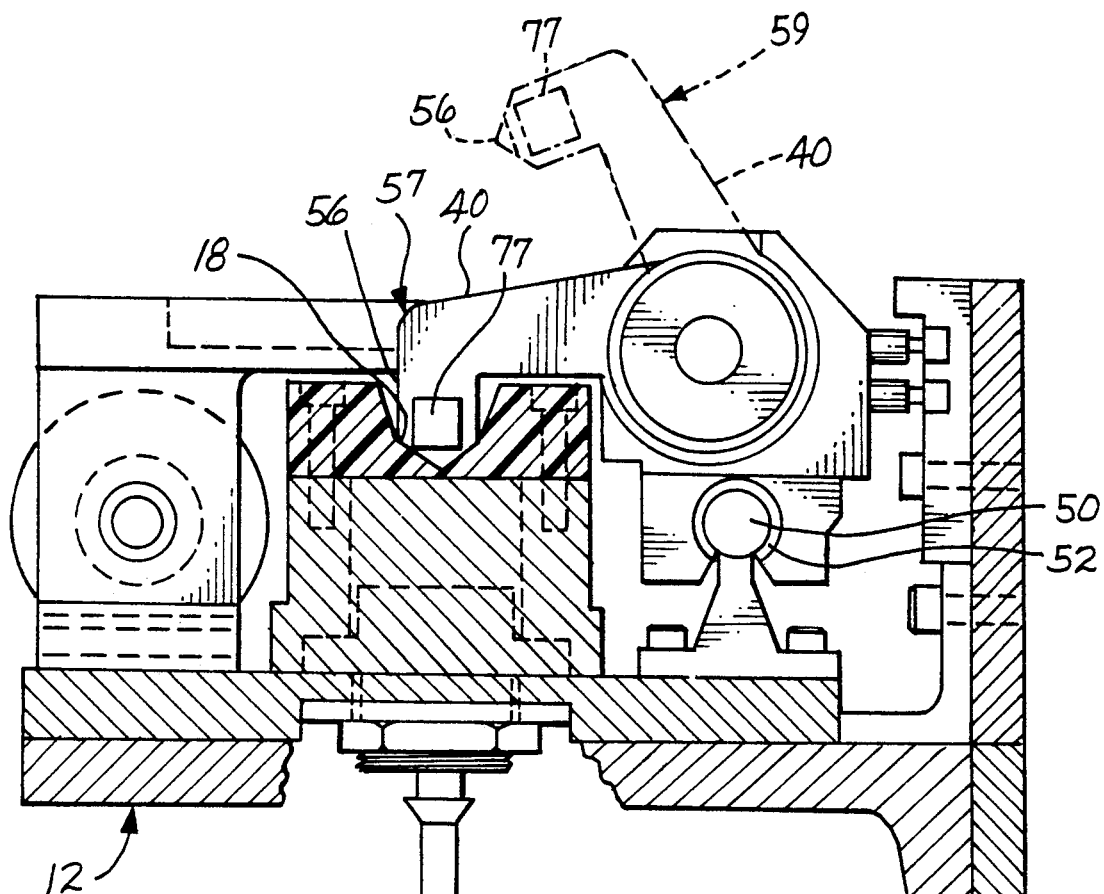
FIG. 7 is a cross-sectional view taken along line 7—7 in FIG. 5.

As is best seen in FIG. 7, the sixth gate 40 has an arm with a downwardly-projecting abutment 56 that is shaped to mate with the angles of the conveyor mechanism's V-shaped track 18. When the end 56 of gate 40 is in the downward position shown at 57 in FIG. 7, it blocks further bit travel down the track 18. When it is up, as shown at 59, the bit may pass.

As mentioned above, the drill stroker 46 functions to control the rate of drill bit movement through the second laser scanner 44. This is accomplished by a lead screw and lead nut arrangement 56, 58 that is driven by a servomotor 64.

The lead nut 58 is carried by a pair of converging arms 60, 62 that extend laterally across the space between the guide rail 50 and lead screw 56. The nut 58 includes internal threads that are in engagement with the external threads of the lead screw 56. The lead screw 56 is driven in rotation by the servomotor 64 (see FIG. 6), which is reversible in operation. The operational control of the servomotor 64 is further described later.

When the drill stroker 46 is in the "home" position shown in FIG. 5, any drill bit 14 stopped by the sixth gate 40 is in a position where it is ready to be scanned by the second laser scanner 44. The track 18 has an opening or slot, indicated by arrow 66, through which the scanner's laser beam passes. The servomotor 64 is then activated, and rotates lead screw 56 at a certain preselected rate. This causes the drill stroker carriage 48 to move downwardly along guide rail 50, until the drill passes the laser slot, as shown by dashed lines 68 in FIG. 6. At such position, the sixth gate 40 is raised as shown by the dashed lines 59 in FIG. 7, thereby permitting the drill bit 14 to slide further down the track 18. The total travel of the stroker 46 depends on drill length, which minimizes cycle time.

As the drill stroker 46 conveys the bit 14 through the second scanner 44, the scanner outputs periodic data scans in array format. This provides a mapping of bit diameter across the bit's silhouette, at numerous closely spaced together locations along the length of the bit. This information is used to identify the bit in accordance with the method that is described in the software portion of this description.

The conveyor mechanism 12 has an eighth gate 70 at its lower end 72, which controls exiting movement of each bit from the conveyor. At this point it should be mentioned that all of the conveyor gates 20, 30, 34, 36, 38, 40, 42, 70 as described above have the same purpose, i.e. to permit or prevent drill bit travel down track 18 at certain times as controlled by the recognition system 10. The structural configuration of each gate is dictated by the portion of the conveyor mechanism 12 in which the gate is used. For example, the first, second, fifth, seventh and eighth gates 22, 30, 38, 42, 70 may all be shaped and operate much the same way as the sixth gate 40, which is carried by the drill stroker 46.

Figure 8:
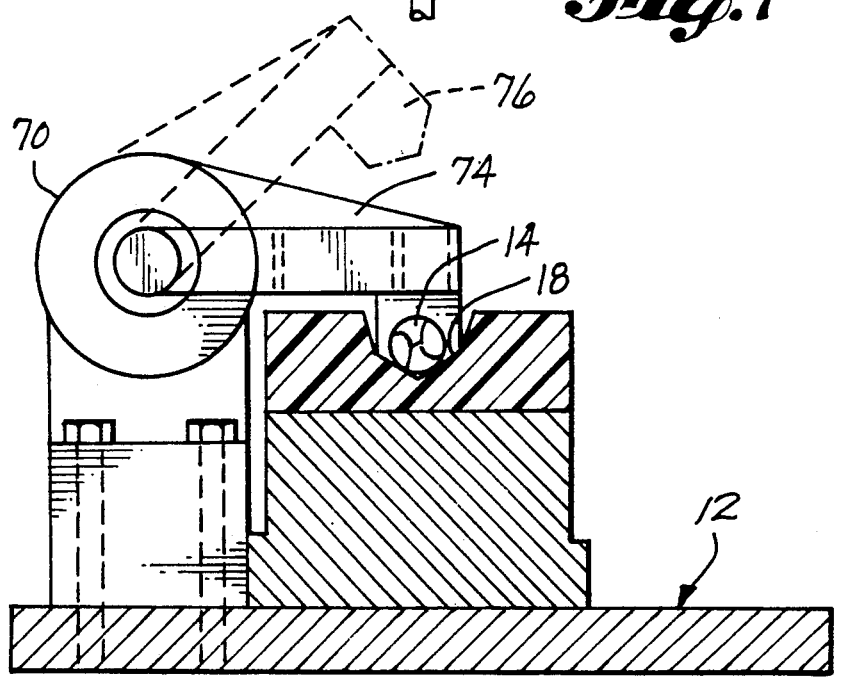
FIG. 8 is a cross-sectional view taken along line 8—8 in FIG. 6.

FIG. 8, for example, shows the eighth gate 70 positioned at the track's lower end 72. As can be seen there, it has an arm 74 that swings between an open position, where its blocking end 76 is spaced above the track 18, to a closed position, where its blocking end 76 fills the track. Such movement is controlled by a conventional rotary solenoid that is not shown in the drawings. The skilled person would be familiar with such a solenoid, however, including how to implement it in connection with the feed gates disclosed here. By way of example, Ledex, Inc. of Vandalia, Ohio, markets such a solenoid under model number H-1082-029.

The third and fourth gates 34, 36 are preferably guillotine-type gates of the type shown in FIGS. 2 and 3 of the '128 patent. There, each gate is operated upwardly or downwardly by an air cylinder.

When the drill stroker 46 reaches the end of its downward travel or stroke, as shown in FIG. 6, the sixth gate 40 is opened, and drive motor 64 reverses, thus sending the drill stroker 46 back up the track 18 to its home position. During such time, if a drill bit 14 is being held by the fifth gate 38, it is then opened, but the seventh gate 42 is closed to hold the bit until such time as the drill stroker 46 reaches home. Preferably, and as is further described below, data from the second scanner 44 is analyzed during the stroker return, in order to utilize what would otherwise be wasted cycle time.

In the event no bit 14 is being held by the fifth gate 38 at the time the drill stroker 46 releases a bit 14, and thereafter begins its upward travel, the fifth gate 38 will not open until such time as the stroker has returned home. In such situation, the seventh gate 42 serves as a deceleration gate that momentarily intercepts the next bit 14 before it enters the drill stroker 46. This saves wear and tear on the drill stroker 46.

It is important that each bit 14 not move or rotate while it is in the drill stroker 46. If the bit 14 rotates as it passes through the laser beam of the second scanner 44, helix angle and backtaper measurement errors will result. Accordingly, the sixth, or drill stroker gate 40, has a rubber pad 77 on its upstream face (see FIG. 7). Such pad must be perfectly flush with the face of the gate 40, and both the gate and pad 40, 77 must be parallel with the laser beam in both the horizontal and vertical planes.

The above-described operation of the conveyor mechanism 12 is controlled by a drill bit recognition computer 78. Such computer 78 is not only operatively connected to the hardware elements described above, but it is also connected to various proximity sensors located underneath the drill track 18. These sensors inform the computer 78 as to the presence and location of both drill bits passing through the conveyor 12, and the position of conveyor components.

The position of such sensors is schematically shown in FIG. 2. Directing attention there, it is readily seen that one proximity sensor is located under the drill track 18, slightly in front of each feed gate, for detecting the presence of any drill bit 14 respectively located there. For example, sensor PS1 is positioned in front of the first gate 20, and provides a signal indicating the initial placement of a drill bit 14 on the upper end of track 18. Similarly, sensors PS5, PS16, PS13, and PS9 respectively indicate drill bit presence at the second, fifth, seventh and sixth (drill stroker) gates 30, 38, 42, 40. Sensor PS8 indicates the presence of a bit in the flipper mechanism 32 for controlling either one of the third or fourth gates 34, 36 in such mechanism, depending on its rotational position. Although it is not shown in the drawings here, as it is not particularly germane to the patentability of the drill recognition system 10, a similar proximity sensor is positioned in front of the eighth gate 70, at the lower end 72 of the conveyor track 18.

Several other proximity sensors are also used to indicate the position of the shuttle container 24, flipper mechanism 32 and drill stroker 46 portions. For example, proximity sensors PS2, PS3, and PS4 respectively indicate center, left and right positions for the shuttle container 24, which relates to its movement to opposite lateral sides of the conveyor track 18, depending on whether or not a given bit 14, or other object, is ejected from the track 18 to either the recycle or reject containers 26, 28.

Proximity sensors PS6 and PS7 indicate the rotational position of the flipper mechanism 32, i.e. identifies whether the third or fourth feed gate 34, 36 is at the uppermost or lowermost position. Lastly, sensors PS10, PS11 and PS12 respectively indicate low calibration and high calibration positions, for calibrating the second laser scanner 44, and whether or not the drill stroker 46 is in the home position.

All of the proximity sensors are of a conventional type, which would be familiar to the skilled person. By way of example, The Micro Switch Division of Honeywell, Inc., of Minneapolis, Minn. 55408, provides such sensors and identifies them by Model No. 900 Series.

In summary, there are basically four operations performed on each bit 14 as it travels downwardly through the conveyor mechanism 12. First, each bit passes through the first laser scanner 22. There, certain preliminary information is determined about the bit relative to its orientation, or whether one or more bits have been placed on the track 18 improperly.

Second, each bit 14 then enters the shuttle container 24. Based on the preliminary information obtained from the first laser scanner 22, the bit may or may not exit the drill track 18 at that time.

If it does not exit, which would be the most common situation, the third operation involves orienting the bit 14 properly in the flipper mechanism 32, but only if its orientation was improper when it was first placed on the track 18. In accordance with the invention, each drill bit 14 is oriented butt-end first.

Fourth and last, each bit 14 is then passed through the second laser scanner 44 by the drill stroker mechanism 46. There, data from the second laser scanner 44 is analyzed by the drill bit recognition computer 78 (see FIG. 1) to determine bit type or identity.

The recognition computer 78 outputs an identification (ID) code corresponding to the bit as identified, which is then transmitted to a sorter system computer, indicated schematically at 80 in FIG. 1. The latter computer 80 has overall control of all of the systems or subsystems operating in cooperation with the recognition system 10, and uses the ID code to keep track of each bit, and to later place each bit in the proper storage bin.

Having thus provided a general system overview of the drill bit recognition system 10, the following description will set forth a more detailed description of (a) the hardware components and requirements that interlink the drill bit recognition computer 78 to both the laser scanners 22, 44 and other hardware components of the conveyor mechanism 12; and (b) the recognition computer software requirements, for controlling conveyor mechanism parts and analyzing data from the laser scanners 22, 44.

2.0 System Hardware

Referring now to FIG. 1, both of the laser scanners 22, 44 are preferably helium-neon, 0.25 watt laser scanners. As mentioned above, a laser scanner well suited for use in conjunction with the present invention is an optical micrometer of a type manufactured by LaserMike, Inc., of Dayton, Ohio, which is sold under the trademark "LaserMike."

Figure 9:
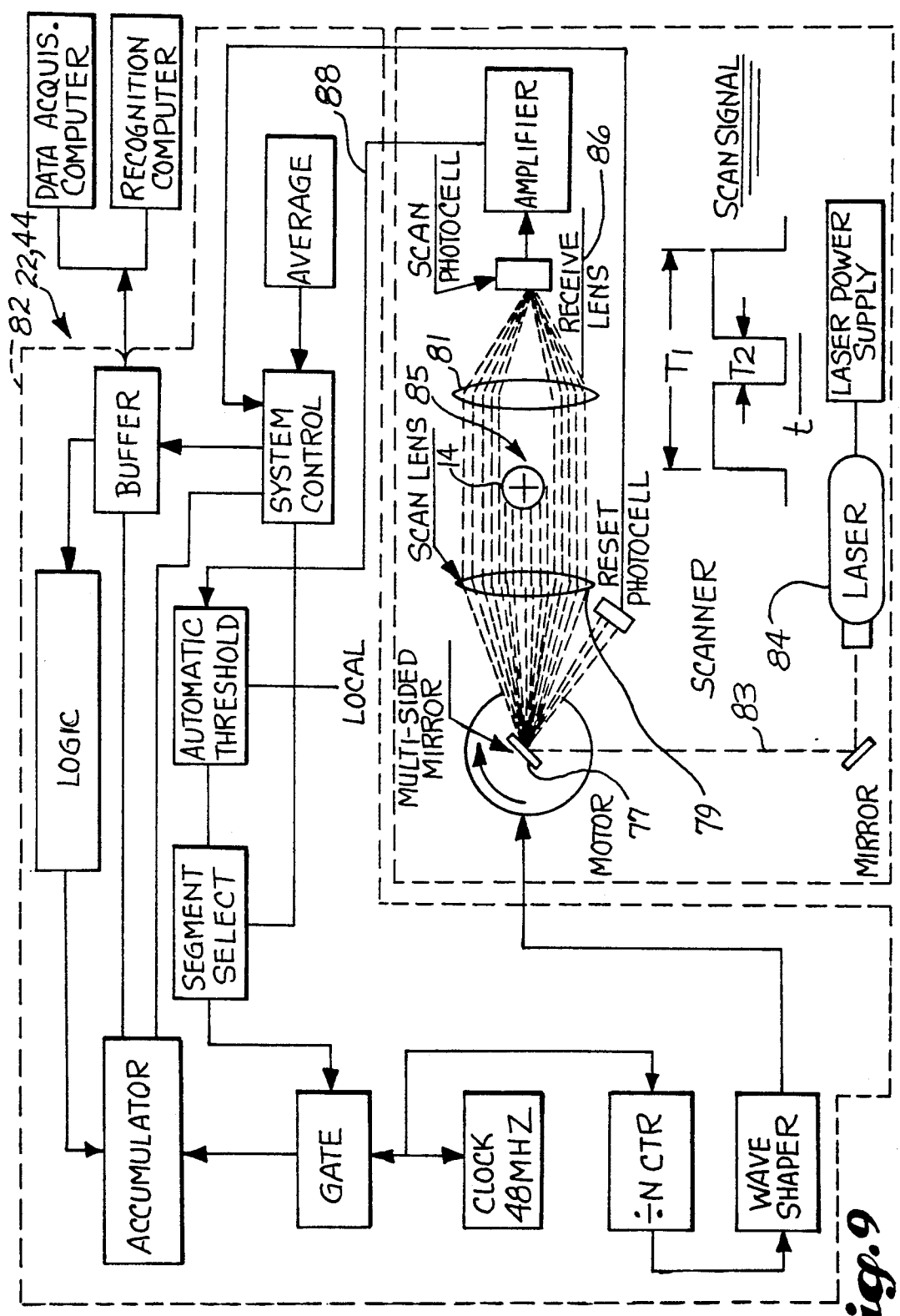
FIG. 9 is a schematic diagram showing the operation of the two laser scanners of the invention, which are used for recognizing the orientation and type of drill bits as they pass through the conveyor mechanism shown in FIGS. 2-6.

Each scanner is controlled by its own Model 182 processor 82A, 82B, (see FIG. 1), whose operation is schematically indicated in FIG. 9. Although both scanners 22, 44 are identical in structure and basic operation, they are configured differently, as described below, in order to meet the unique requirements of determining bit orientation in the upper part of the conveyor 12 (the first scanner 22), as opposed to recognizing bit type in the lower part (the second scanner 44).

For example, the first laser scanner 22 is preferably configured as a 666 scans per second unit. Any drill bit 14 moving down the conveyor track 18 by the force of gravity, moves over a slot in the track, similar to slot opening 66 in FIG. 5.

Referring again to FIG. 9, a motor-driven, rotatable, multi-sided mirror 77 and scan lens 79 are positioned on one side of the slot, and a receive lens 81 and photocell 86 are positioned on the opposite side. A beam 83 from the scanner laser 84 is transmitted through the slot by the mirror 77, and is interrupted or shadowed by the bit's profile, which is indicated generally at 85 in FIG. 9. The photocell on the opposite side receives the scan and processes it in a manner that is further described below. As is schematically indicated in FIG. 3, the laser 84 is preferably positioned below the conveyor track 18, while the photocell 86 is correspondingly positioned above.

As each bit 14 moves over the slot, every scan of the laser 84 is collected by the photocell 86 (see FIG. 9). Typically, in the first scanner 22, 85 to 95 scans will be obtained for a drill bit 14 that is six inches long, and 135 to 165 scans will be obtained for a twelve-inch bit. Each bit will accelerate somewhat as it moves through the first scanner 22, as a result of the natural force of gravity. This will cause the spacing between each scan to increase somewhat. For example, on a twelve-inch bit, the scan spacing may start out at around 0.06 inches, and finish at about 0.09 inches.

As mentioned above, each bit 14 that is placed in the scanner beam interrupts it for a certain period of time that is proportional to the bit's width or profile along any given scan line path. The interrupted beam is collected by the photocell 86, which then outputs a scan signal 88.

In FIG. 9, time $T_1$ represents the time during which the scanning beam is scanned or swept across the bit 14, while time $T_2$ represents the time of beam interruption caused by the bit's silhouette. Such time-dependent signal is sent to the Model 182 processor 82A for the scanner 22, which processes the scanned signal, and provides reset signals, and then generates a digital signal corresponding to the profile dimension caused by beam interruption. Such dimension is sometimes referred to herein as a crosswise dimensional measurement. The operation just described would be familiar to anyone having working knowledge of the LaserMike (trademark) optical micrometer identified above.

The second laser scanner 44 operates identically, although it is configured differently in order to provide more accurate dimensional data. By way of explanation, the second scanner 44 is configured to be a 400 scans per second unit. The travel rate of each bit through its beam is precisely controlled by a servocontroller system 89 (see FIG. 6) that operates the drill stroker servomotor 64 in a manner to be further described below. For most bits, the rate of travel through the second scanner beam is controlled, and held, at a steady rate of four inches per second. In other words, the drill stroker 46 is controlled so as to move downwardly along conveyor track 18 at that rate.

Referring now to FIG. 6, the servocontroller system 89 is a conventional closed-loop system whose operation would be generally familiar to the skilled person. In the instant case, it consists of the servomotor 64 previously described, which is a conventional, brushless DC motor that is reversible in operation. The motor 64 is fitted with a conventional shaft encoder that is preferably configured to output 100 pulses for each revolution of the lead screw 56. The lead screw preferably has a 0.2 inch lead.

The motor 64 is interconnected with an intelligent servocontroller computer 91 via an amplifier 93. Software for the servocontroller 91 is downloaded from the recognition computer 78 by a program called Newbam. Refer to the file cc.bam in the software appendix attached hereto. The servoprogram itself is called Newpar.BAM.

In accordance with the invention, the servocontroller 9 is a BAM-4 servocontroller which may be obtained from Berkeley Process Control, Inc., Richmond, Calif. 94804. The source file in the appendix containing servo operating parameters is written in Parasol, which is the language for the BAM-4 controller.

After the software for the servocontroller 91 is downloaded from the recognition computer 78, the servocontroller automatically goes through an initialization sequence where it checks the location of the home and calibration position sensors, PS10, PS11 and PS12 of the conveyor mechanism 12. Preferably, the servomotor shaft encoder is configured to output a four-channel TTL-level differential for the servocontroller 91. One channel is tapped off, and routed to the second laser scanner 44, for input to terminal B2 of its respective Model 182 computer 82B.

As indicated above, and as is schematically indicated at 95 in FIG. 6, the servocontroller 91 is interfaced with the recognition computer 78, not only for downloading of servocontroller software, but for the necessary communications between the recognition computer and the controller in order to accomplish recognition system 10 operations. In accordance with the invention, several interface lines are required between the recognition computer 78 and the servocontroller 91. These are as follows: (a) a controller "ready signal"; (b) a downstroke "start" signal for the drill stroker 46; (c) a return home signal for the drill stroker 46; (d) a calibration sequence strobe; (e) a cobalt-drill sequence signal; and (f) a drill-in-beam signal (i.e. laser segment error signal).

When the downstroke start signal is received by the controller 91 from the recognition computer 78, the servocontroller checks for the cobalt-drill sequence signal, which implements a special stroker sequence in the software that is unique to the recognition of special cobalt drills. Specifically, if the cobalt signal is active, the servosystem 89 moves the drill stroker 46 at a rate of one inch per second, instead of the typical four inch per second rate described above, until the servocontroller 91 receives a "drill-in-the-beam" signal. At this point, the servocontroller 91 is programmed to count fifty encoder pulses, equal to 0.1 inches of drill stroker travel, and then increase the downstroke speed to four inches per second. If the cobalt drill signal is not active, the downstroke is four inches per second for the entire stroke.

When the Model 182 processor 82B of the second laser scanner 44 receives an encoder pulse, it then transmits the next scan value to a data acquisition computer 98 (see FIG. 1), which is a conventional 68008 microprocessor-based computer that would be well-familiar to the skilled person. During the four inch per second downstroke, scan data is taken every 0.03 inches of travel. If the downstroke is one inch per second, scan data is taken every 0.006 inches of stroker travel. Such extra data is taken only on straight-shank jobber drills to help identify those drills made of cobalt steel alloy. As further discussed below, straight-shank jobber drills are detected, and flagged, as such during the analysis of data from the first laser scanner 22.

A scan-mark circuit between the encoder and the second Model 182 computer 82B divides the encoder pulses of the servomotor 64 by fifteen during the four inch per second stroke, and by three during the one inch per second stroke. The output pulses from this circuit are fed to terminal B3 of the second laser's Model 182 computer 82B. As mentioned above, when the Model 182 computer 82B receives the encoder pulse, the next scan value of the laser scanner is transmitted to the 68008 data acquisition computer 98.

When any given downstroke of drill stroker 46 is completed, the recognition computer 78 then signals the 68008 data acquisition computer 98, which then transfers all scan data as an array from its onboard memory to a battery-backed static RAM memory buffer 100, where the recognition computer can access the data.

The downstroke of drill stroker 46 continues until the servocontroller 91 receives a return-home signal from the recognition computer 78. This signal is also the start signal for the second laser 44. The recognition computer 78 monitors the laser segment error signal mentioned above, in order to determine whether or not the drill bit 14 is past the laser slot 66 in drill track 18. If so, it then brings the start signal high. If the servocontroller 91 does not receive the return-home/start signal, it stops the drill stroker 46 automatically, based on a maximum-allowed downstroke encoder count that is tallied by the servocontroller 91. When the return-home signal is received, the servocontroller 91 returns the drill stroker 46 to its home position at the rate of fifteen inches per second.

Based on the laser scan rate, and the drill travel rate, the maximum positional error of each scan from the second laser 44 is 0.01 inches. Basic accuracy of the scanner 44 at four hundred scans per second is plus or minus 0.0002 inches.

It should be mentioned at this point, that the first laser 22 outputs scan data identically to the configuration described above. That is to say, scan data is output by the scanner 22 to its own dedicated 68008 data acquisition computer 102. Upon receipt of a signal from the recognition computer 78 indicating that the bit has passed through the first scanner 22, the data acquisition computer 102 downloads its data to a battery-backed memory buffer 104, which is later accessed by the recognition computer in order to determine preliminary orientation and other information relative to the first scanner 22.

Each Model 182 processor 82A, 82B has several TTL-level inputs and open-collector outputs that are in communication with the recognition computer 78, as schematically indicated at 90, 92 in FIG. 1. All inputs and outputs are active low, and are assigned as follows:

TABLE I

| Description | |
|---|---|
| Model 182 inputs: Terminal | |
| B1 | Start signal (look for drill) |
| B2 | Encoder enable (look for encoder pulse) |
| B3 | Encoder pulse |
| B4 | Calibration signal |
| B5 | Lo-cal ready signal |
| B6 | Hi-cal ready signal |
| B7 | Stop signal (reset and look for start) |
| B8 | 5 Volts internal (very low current) |
| B9 & B10 | Signal common |
| B11 & B12 | 12 Volts (for output pullup) |
| Model 182 outputs: Terminal | |
| A3 | Segment error signal |
| A4 | Lo-cal pin request signal |
| A5 | Hi-cal pin request signal |
| A6 | Calibration done (10 msec.pulse) |

Preferably, the first laser 22 sends every scan, and the second laser 44 sends a scan only upon receiving an encoder pulse from the scan-mark circuit. Therefore, terminal B2 is hard wired high to terminal B8 for the first laser 22, and is hard wired low to terminal B9 for the second laser 44.

In operation, each Model 182 computer 82A, 82B looks for the start of a drill bit 14, but only when the start signal at terminal B1 goes low. This is done by internally checking for the segment error signal. In other words, when a single drill bit 14 is in the beam of either scanner 22, 44, there will be three beam segments, and the segment error signal output at terminal A3 will be high. If no bit or more than one bit is in the beam, the segment error signal will be low.

The recognition computer 78 monitors and uses the segment error signal from the second laser 44 to determine when each bit 14 has passed the laser slot or opening 66 in the conveyor track 18. Further, the recognition computer 78 also uses the segment error signal from both laser scanners 22, 44 to determine if their respective laser slots are otherwise clear.

If the segment signal indicates that something is in one or the other scanner beams when it should not be, an air jet, schematically indicated at 94, 96, in FIG. 3, is activated by the recognition computer 78 to clear the blocked slot. The segment error signal from the second laser 44 is also used by the servocontroller in certain situations when the travel rate of the drill stroker 46 is selected to be one inch per second, as described above.

The stop signal input at terminal B7 is essentially a reset input that allows the recognition computer 78 to place either Model 182 computer 82A, 82B back to the point where it is waiting for a start signal. The stop signal must be active for at least two milliseconds, and it is always set to the opposite level of the start signal by the recognition software in the recognition computer 78.

Figure 10:
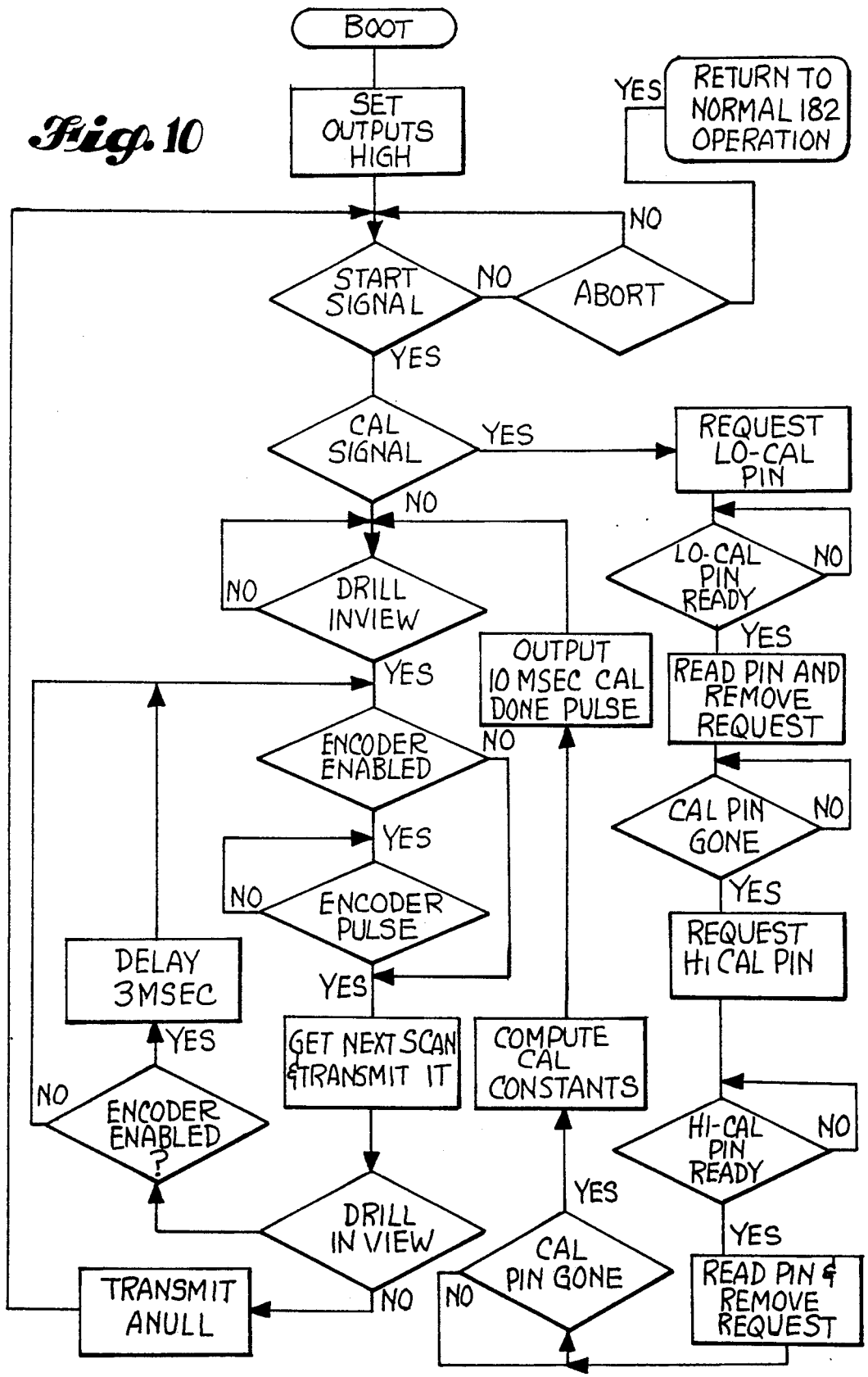
FIG. 10 is a flow chart of scanner software.

FIG. 10 is a flow chart illustrating how each Model 182 computer 82A, 82B operates to control and calibrate laser scanners 22, 44, respectively. Each scan, which is essentially a diameter measurement output by either laser scanner 22, 44, consists of four ASCII digits followed by a line feed (HEX No. 0a). A decimal point should be assumed to be before the first digit, and is not transmitted. The actual sequence used to transmit a character is as follows: First, the busy line from the data acquisition computer 98, 102 is checked. The Model 82 computer 82A, 82B will wait until the line is inactive. Second, the ASCII data is set up on the data lines, followed by toggling a strobe line. A null (HEX 00) is transmitted when a given drill bit 14 leaves any one of laser scanners 22, 44.

2.1 Scanner Calibration

The skilled person would know that the laser scanners 22, 44 are relative instruments, and are consequently subject to drift over time. As such, they require periodic calibration. The drill bit recognition process embodied in the software of the recognition computer 78, as will be described in detail below, handles calibration automatically. In accordance with the software appendix in accompaniment hereto, calibration is performed at startup, one-half hour after startup, and at two-hour intervals thereafter.

With respect to the second laser scanner 44, it is desirable that calibration pins be mounted to the back side of the drill stroker gate (the sixth gate) 40. It is recommended that one pin be 3/32 of an inch in diameter, and the other be ⅛ inch in diameter. Calibration pins for the first scanner 22 may be mounted on arms attached to individual rotary solenoids, much like the rotary gates 40, 70 shown in FIGS. 7 and 8 as described above, where the purpose of such solenoids is solely to place a calibration pin in the field of view of the scanner. All calibration pins must be highly accurate in diameter, and must be kept very clean and free of any dirt or other particles.

With respect to the second scanner, when the recognition computer 78 pulls terminal B4 of the Model 182 computer 82B low, the Model 182 computer 82B pulls terminal A4 low, and requests placement of the low-cal pin in the path of the laser beam. In other words, the drill stroker is then operated to place the small, 3/32 inch diameter pin in the path of the beam.

The recognition computer 78 then reads the necessary signals to determine whether or not the pin is in the beam, and then pulls the input terminal B5 low. The Model 182 computer 82B then reads the pin diameter, and thereafter requests placement of the high-cal pin (⅛ inch diameter) by pulling terminal A5 low. The recognition computer 78 responsively removes the low cal pin from the beam, and then places the high-cal beam in the beam by appropriately moving the drill stroker 46. It then verifies that the pin is in place, and pulls terminal B6 low. This notifies the Model 182 computer 82B that the pin is in place, and the Model 182 then reads the high-cal pin diameter, following by pulling terminal A6 low for at least 10 milliseconds. An identical procedure is followed in calibrating the first laser scanner 22.

2.2 Hardware Listing

With the exception of the laser scanners 22, 44, and the structural components of the gravity conveyor mechanism 12, including proximity sensors PS1–PS12, all of the recognition system computer hardware can be obtained from a single manufacturer, PEP Modular Computers, Inc., of 600 N. Bell Avenue, Pittsburgh, Pa. 15106.

The recognition computer 78 is a 68000 VMEBUS-/EUROBUS system, with an 8 megahertz clock, 448K of ROM, and 1 megabyte of RAM. Such a system has 15 board slots available, 9 on the VMEBUS and 6 on the EUROBUS. Table II below sets forth a listing of all recognition system computer hardware, and designates the model and part number as supplied by PEP Modular Computers, Inc. The first column of the table describes the manufacturer's designation of the part. The second column identifies the manufacturer's part or model number. The third column identifies the type of bus system. The fourth column describes each component of the recognition system 10 that makes up the data acquisition computers 98, 102; the memory buffers 100, 104; and the drill bit recognition computer 78, as is schematically indicated in FIG. 1. Lastly, the fifth column describes the function of each component.

TABLE II

| Manufacturer Designation | Manufacturer Part No. | BUS | Description | Function |
|---|---|---|---|---|
| | | | Recognition System Computer Hardware | |
| VME2000 | 2102-02 | VME/EURO | 68000 VME SYSTEM | |
| VMPM68KA2 | 500/30 | VME | Microcomputer | CPU |
| VMEM-D | 506-0 | VME | Dynamic RAM | System RAM |
| VMEM-S1 | 502-20 | VME | EPROM | Operating system ROM |
| VIOC | 501-1 | VME | VME/EUROBUS converter | Laser No. 1 (orientation) data acquisition |
| VIOC | 501-1 | VME | VME/EUROBUS converter | Laser No. 2 (recognition) data acquisition |
| VIOC | 531-1 | VME | VME/EUROBUS converter | Hardware control I/O |
| MPM 68008 | 160-⅝ | EURO | Microcomputer | Laser No. 1 data acquistion |
| CIM-2 | 147-20 | EURO | Universal I/O | RS-232 serial communications |
| BMU-2 | 151-20/1 | EURO | CMOS RAM | Orient-process mailbox memory |
| P10-4 | 164-0 | EURO | Parallel output | High-power parallel outputs |
| MPM68008 | 160-⅝ | EURO | Micrcomputer | Laser No. 2 data acquisition |
| P10-4 | 164-3 | EURO | Parallel output | Low-power Parallel outputs |
| BMU-2 | 151-20/1 | EURO | CMOS RAM | Recognize-process mailbox memory |
| PI | 156-01 | EURO | Parallel input | Parallel inputs |

All items manufactured by Pep Modular Computers, Inc.

3.0 System Software

In preferred form, the operating system software used by the recognition computer 78 is OS-9 version 2.2, which would be familiar to the skilled person. As mentioned above, a copy of the recognition system software is appended hereto. It is written in C language, except for the 68008 data acquisition software 98, 102, which is written in assembly language in order to obtain maximum speed.

Any person who reviews the software appendix would realize that, in most cases, the source files have the same name as the function they contain. One exception is the source file called "DATATRANSC.C," which contains the transmit, receive and error loop time handling functions. Another exception is the IOSUB.C file, which contains all of the parallel input/output functions. The reject function is located in the source file "SHUTTLE.C" and the file "QUITCHECK.C" contains both the quit check function and the get out function.

The software basically consists of three processes: (a) startask; (b) orient; and (c) recognize. Briefly, startask is what would be known by the skilled person as the mother task of the recognition system 10. It is activated by SYSGO at system boot, and starts the system clock. It receives a "start" command from a drill sorter system controller 80 (see FIG. 1), and upon receipt of such command, checks the readiness of the servocontroller 91. If the servocontroller 91 is not ready, the recognition computer 78 downloads the controller program into the servocontroller 91.

Startask is followed by the orient process which involves controlling conveyor track hardware from the first to fifth gates 20, 38, and analyzing drill diameter data from the first laser scanner 22. The orient process is then followed by the recognition process, which controls the conveyor mechanism hardware from the fifth gate 38 through the drill stroker 46, and analyzes data from the second laser scanner 44. What follows below is a detailed description as to how the software controls both the orient and recognition processes.

3.1 The Orient Process

As mentioned above, the orient process controls drill track hardware from the first to fifth gates 20, 38, and analyzes the drill data from the first laser scanner 22. As was also previously mentioned, it is the objective of the system 10 to ensure that each bit 14 is oriented butt end first by the time it reaches the fifth gate 38.

The drill sensors PS1–PS16 under the conveyor track 18 and in front of each gate are continually scanned in sequence by the recognition computer 78, starting with the first gate 20 to determine the presence or absence of a drill bit 14. If no bit 14 is sensed at any given gate, the sensor at the next gate upstream is checked. If a drill bit 14 is present there, then that gate is opened to release the bit. The gate remains open until the bit 14 is detected at the next gate downstream. All source-code listings for such process are found in the Appendix.

Before a bit 14 is released from the first gate 20, the laser segment error signal of the first scanner 22 is checked in order to see if anything is in the beam of the first laser. If there is something in the beam, the air jet 94 underlying the slot in the track 18 is activated, in order to clear the track or slot. The air jet 94 remains on until the slot is cleared. Then, the bit 14 at the first gate 20 is released and passed through the beam of the first scanner 22.

Diameter data from the first scanner 22 is transmitted by its Model 182 processor 82A to the data acquisition computer 102, which temporarily stores the data in onboard RAM. When the drill bit 14 arrives at the shuttle gate (the second gate) 30, then the first gate 20 is closed, and the data acquisition computer 102 is notified that drill data transmission from the first laser scanner 22 is complete. The data acquisition computer 102 then transfers the data from its onboard memory to the memory buffer 104, where the recognition computer 78 can access it.

Diameter data from the first scanner 22 is analyzed by the recognition computer 78 to determine the following:

1. Drill within the diameter limits of 3/32 to ½ inch?
2. Drill within the length limits of ½ to 13 inches?
3. Did more than one item pass through the laser beam?
4. Is drill too heavy?
5. Is the drill a large center drill?
6. Did drill pass through the beam point-end or shank-end first?
7. Does the drill appear to be a straight-shank jobber?

If the bit as determined by the software of the recognition computer 78 fails test 1 or 2 above, or passes test 4 or 5 above, it is then removed from the conveyor track 18 by actuating the shuttle container 24 in a manner so that the bit 14 enters the reject container 28 for subsequent hand-processing.

Test No. 4 is designed to catch those drill bits over 0.4 inches in diameter, and greater than approximately 10 inches in length. Such drills are considered to be too heavy for the storage carousel transfer tube and trip solenoid mechanism of the '067 patent. Large center drills, which are the subject of test 5, are removed from the conveyor track 18 in order to avoid damage to downstream conveyor hardware. All of these items are shuttled to the reject container 28.

In the event more than one item passes through the beam of scanner 22, such items are removed from the track 18 by actuating the shuttle container 24 to the right in a manner so that such items enter the recycle container 26, and are eventually rerun through the drill sorting system of the '067 patent.

It is possible that more than one bit may pass through the laser beam, either side-by-side or end to end. In accordance with the recognition system 10, if the laser 22 sees more than one part in the beam at any given time, it transmits a scan value of 9999. This value is looked for by the recognition computer 78 during its data analysis, and if it occurs more than twice, it assumes that multiple drills have passed through the laser 22.

The laser 22 transmits a null (HEX 00) when it scans the end of any drill bit 14. Therefore, if two bits pass through the beam end to end, and there is a gap between them large enough for the laser to detect, there will be a null in the middle of the data examined by the recognition computer 78. In such case, the recognition computer 78 presumes that end-to-end drills have been passed through the scanner.

If multiple bits 14 pass through the scanner 22 in such a way that they appear as a single extra-long bit, one of two things will happen in the recognition computer software. The items will either be passed on through the system if maximum diameter or length limits are not exceeded as specified in the tests above, or they will be shuttled left into the reject container 28 if the limits are exceeded.

Any drill that passes tests 1–5 above is transferred on to the flipper mechanism 32. There, if test No. 6 indicates that the bit 14 passed through the laser beam point-end first, the mechanism 32 is rotated.

The recognition software determines orientation by dividing the total number of diameters obtained from the first laser scanner 22 in half, and then summing the halves. The largest total is always obtained from the shank-end half, because it is more continuous, and does not have flutes that would otherwise reduce its diameter at certain locations. The skilled person would realize, however, that such may not always be true for each and every drill bit used in industry. It is presently the method used at Boeing, because it is adequate for each and every bit that is refurbished there.

The 7th test identified above is designed to identify all straight-shank jobber drills. In particular, shank status is used to recognize whether or not a given drill bit 14 is made of a cobalt steel alloy. Such bits typically have a reduced diameter area at the butt end of their shank.

3.2 The Recognition Process

The recognition process portion of the system's software controls the conveyor mechanism hardware from the fifth gate 38 through the drill stroker 46, and analyzes data from the second laser scanner 44, and thereafter delivers the bit 14 with an appropriate ID code to a storage system.

The drill sensors PS16, PS13 and PS9, which are respectively located at the fifth gate 38, the seventh gate 42, and drill stroker gate 40, are sequentially scanned in the beginning of the recognition process. If a drill bit 14 is detected at the drill stroker gate 40, the servocontroller system 89 (see FIG. 6) is operated to run the drill stroker 46, so that the bit 14 is passed through the beam of the second laser scanner 44. If no bit 14 is present at the stroker gate 40, but one is at the seventh gate 42, then the seventh gate is opened so that the bit may pass downwardly into the stroker 46. If no bit 14 is at the sixth or seventh gates 40, 42, but one is at the fifth gate 38, then the bit is released from the fifth gate.

When a bit 14 is detected at the stroker gate 40 at the beginning of the recognition process, the recognition computer 78 calls for an identity function which controls the data acquisition process for that particular bit. The identity function controls the air jet 96, which keeps the laser slot 66 clean, and controls the various interface signals between the data acquisition computers 98, 102, memory buffers 100, 104, Model 182 computers 82A, 82B, and the servocontroller system 89. It also controls release of the drill bit 14 to storage system transfer tubes 106 (see FIG. 6).

Drill bit data from the second scanner 44 is analyzed by an analysis procedure called "ANALYZE" in the software appendix. Before a downstroke of drill stroker 46 begins, the identifying function checks to determine whether or not the transfer tube 106 is in place and ready to receive a bit, and that the sorter system computer 80 is ready to receive a drill bit code. These two signals are identified in the appendix by the commands "OK to load drill" and "OK to transmit."

Laser data is collected in array format during the downstroke of the drill stroker 46, and analyzed by the recognition computer 78 during the return stroke. The sixth gate 40 opens at the end of the downstroke and releases the bit 14, if the transfer tube 106 is in position. If not, the sixth gate remains closed and the drill bit is pushed back up the track by the stroker 46 and remains there until the "OK to load drill" signal is received.

If the sixth gate 40 opens at the end of a downstroke, it remains open on the return stroke until drill bit data analysis is complete, and a drill ID code has been transmitted to the sorter system computer 80. The recognition computer 78 then waits for a reply from the system computer 80 acknowledging receipt of the code.

Section 3.2.1 below explains the identification procedure as to how one bit is distinguished from another, and as to how identification codes are assigned to each bit 14. As explained above, in most cases, drill data is taken at 0.03 inch increments along the bit's length. Although in certain kinds of systems a different increment may be used, two factors were used to arrive at this particular increment for the recognition system 10: The size of the typical drill features being processed by the Boeing drill sorter system, and the time required by the recognition computer 78 to process scanner data and output an ID code.

For example, identification grooves in common quick-change adapters may be as narrow as 0.04 inches. Based on the laser scanner speed and a stroker rate of four inches per second, there is an uncertainty of 0.01 inches in the increment spacing, which means that any two consecutive data points may be anywhere from 0.03 to 0.04 inches apart, which is adequate to detect identification grooves having the above spacing. For certain kinds of bits, notably high spiral drills, narrow margins could be missed if larger increments were used.

3.2.1 Recognition Algorithms and Subroutines

That portion of the software which is dedicated to bit recognition identifies drill bits by determining four basic characteristics: (a) shank-type; (b) flute characteristics, including particular features relating to bit margins and helix angles; (c) overall length; and (d) bit diameter.

The software generates a two-digit hexadecimal "type" code for the first three characteristics identified above, and a separate two-digit hexadecimal "size" code for the bit diameter characteristic. These two codes, i.e. "drilltype" and "size" are concatenated to produce a four-digit hexadecimal ID code or "cutter-code," which is output by the recognition computer 78 to the sorter system computer 80, (see FIG. 1).

In accordance with a preferred embodiment of the invention, a type variable is assigned for the shank-type, flute and length characteristics described above, as follows in Table III:

TABLE III

| VARIABLE | VALUE | DESCRIPTION |
|---|---|---|
| | Indentification Variable Codes | |
| SHANK | 1 | straight shank |
| | 2 | long quick change adapter |
| | 3 | long quick change adapter with single groove |
| | 4 | long quick change adapter with double groove |
| | 5 | short quick change adapter |
| | 6 | ¼-28 threaded adapter with hex |
| | 7 | ¼-28 threaded adapter without hex |
| | 8 | 5/16-24 threaded adapter |
| | 9 | centerdrill |
| | 10 | cobalt straight shank |
| | 14 | quick change adapter reject |
| | 15 | reject |
| FEATURE | 1 | double margins |
| | 2 | no margins |
| | 3 | lo-spiral helix |
| | 4 | hi-spiral helix |
| | 5 | medium helix and single margin |
| | 6 | hi-spiral helix and no margins |
| LENCODE | 1 | jobber length |
| | 2 | ½ inch |
| | 3 | ¾ inch |
| | 4 | 1 inch |
| | 5 | 1¼ inches |
| | 6 | 2¼ inches |
| | 7 | 2¾ inches |
| | 8 | 3 inches |
| | 9 | 3¼ inches |
| | 10 | 4 inches |
| | 11 | 6 inches |
| | 12 | 12 inches |
| | 13 | taper length |
| | 14 | B5 or ST drill |
| | 15 | out of length limits |
| | 16 | cobalt taper length |
| | 17 | parabolic flute taper length |

The values of the variables set forth above are decimal values. Once these values are determined by the recognition computer 78, the value of the "feature" variable (any value from one to six—one corresponding to a double margin feature, and six corresponding to a high-spiral helix with no margins) is multiplied by 16.

The value determined for the length characteristic, i.e. "LENCODE" is multiplied by 256. For a further explanation of this particular methodology, reference is directed to source files ANALYZE.C and STEPCHECK.C in the Appendix.

These products, and the decimal value of the shank characteristic, are then summed to produce a unique decimal value representing the combination of the three characteristics. This value is then converted into a two-digit hexadecimal value which represents one of the fifty drill bit subtypes mentioned above in the background portion of this specification. Referring to the Appendix, the unique decimal value is specified as a variable "DRILCODE." The conversion of "DRIL-CODE" to the two-digit hexadecimal value can be examined in the source file called "TYPETABLE.C"

FIGS. 11-14 are illustrative of the bit features and characteristics identified by the system software. By way of example, the bit 14 shown in FIG. 11 has a straight shank 108, which means the recognition software would assign it a value of "one" in accordance with Table III above. It also has double margins 110, 112, which means the software would assign it a value of "one" pursuant to the "feature" variable of Table III. Its length would be determined by the number of diameters sensed by the second laser scanner 44 as it passed through such scanner's beam. As mentioned above, in most cases, scans have a spacing of approximately 0.03 inches. Multiplying that number by the number of scans provides the approximate length of the bit, at least sufficiently to assign it a value under the "LENCODE" variable of Table III.

Figure 11:
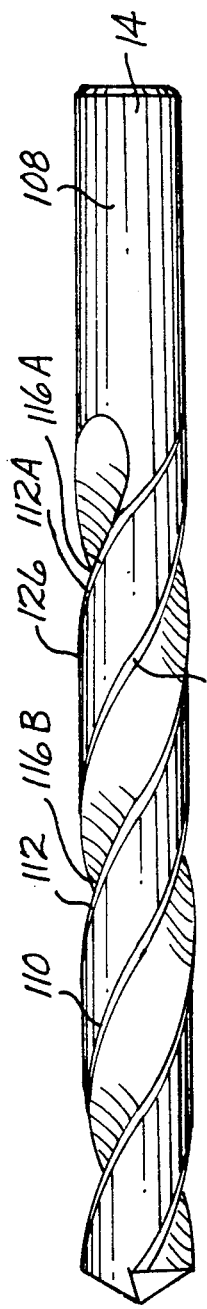
FIG. 11 is a side view of a typical drill bit that is identified by the recognition system shown in FIGS. 1-10.
Figure 12:
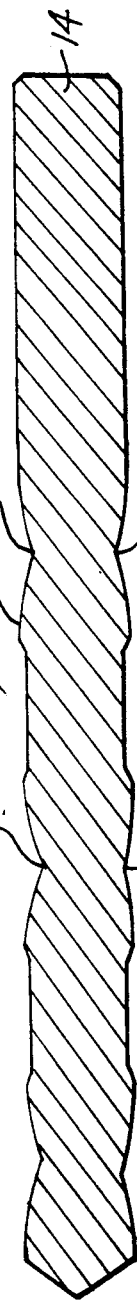
FIG. 12 is a side cross-sectional view of the bit shown in FIG. 11.

FIG. 12 is a side cross-sectional view of the bit shown in FIG. 11, and illustrates how the crosswise diameter measurement provided by each laser scan line could vary according to the bit's silhouette, and the location of flutes 114 and valleys 116 along its length. It is these variations which enable the recognition software to identify shank, feature and length characteristics in accordance with a simple methodology that does not involve complex mathematical routines, as will further be described below.

Figure 13:
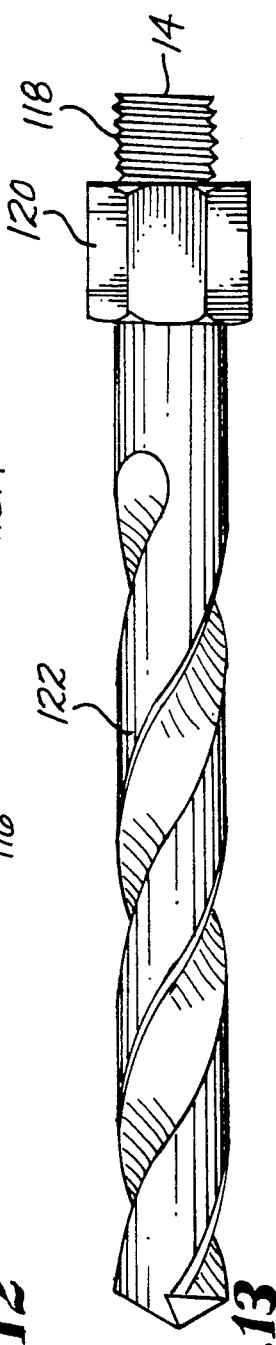
FIG. 13 is a view like FIG. 11, but of a different type of drill bit.

Referring now to FIG. 13, the bit 14 shown there has a threaded adapter 118 with a hex 120. Accordingly, it would typically be assigned a shank value of "6" depending on the size or diameter of the hex. The same bit has no margins 122, meaning that its feature value would be "2" in accordance with Table III above.

Figure 14:
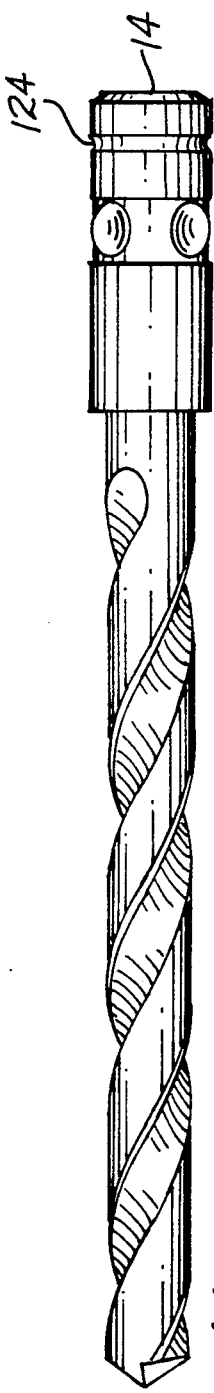
FIG. 14 is a view like FIGS. 11 and 13, but of still another type of drill bit.

Referring to FIG. 14, the bit 14 shown there is a long quick-change adapter with a single groove 124. This corresponds to value "3" in the shank variable portion of Table III. No margins are shown for such drill, meaning that its feature value would be assigned "2" in accordance with Table III.

As mentioned above, the laser data from the second scanner 44 is a plurality of crosswise diameter measurements taken across the silhouette of each bit 14 as it passes through the scanner. This data is analyzed in a predetermined fashion to identify bit diameter and the three other characteristics shown in Table III.

Three diameter tables are used in the software to generate a hexadecimal value for diameter or size. The particular diameter table used is dependent on the type of drill bit 14, and more specifically, the value of the variable "DRILCODE" which is determined by summation of the shank, feature and length variables as described above. Referring to the software appendix, the skilled person will note that the function "STDSIZE" contains a complete table for standard drill sizes. The "STEPSIZE" function contains a drill size table for double margin drills, and the "ABSIZE" function contains an abridged standard size table. The abridged table is used for drill bit types where small numbers of the bits of that size are stocked, and hence, are refurbished infrequently.

Assignments to the size tables takes place in the "ANALYZE" or "STEPCHECK" functions of the software appendix. The analyze function, whose source file is "ANALYZE.C" in the software, is the key function of the recognition process. Certain global variables are initialized there, and the various recognition subroutines, which are further described below, are also called. Typically, the first thing done is that the first sixty-seven diameters are obtained from the second laser scanner 44 and are loaded into a shank diameter array. Then, four shank identification routines (source files: THREAD SHANK, SHORTQC, LONGQC, and STRAIGHT SHANK) are called, in order, until bit shank is recognized, and a variable value can be assigned for the shank recognized. Once one of these four routines identifies a given shank, the diameters beyond the shank, or in the case of a straight shank, the shank diameters themselves, are examined to establish a starting value for the maximum diameter of the drill.

Diameters are examined by the recognition software until they start to drop off into the first flute valley, indicated at 116a in FIG. 12. Location of the first flute valley is done by simply determining where the diameters of the array go through a minimum. Thereafter, the existence of a first margin is searched for by examining whether or not the diameter values drop off into a constant range after going through a maximum, but within a certain predefined distance from the first flute valley 116a. The maximum diameter found in the shank routine is automatically updated if certain conditions are met. Normally, a margin will represent a slightly larger diameter than would normally be found at the bit's shank 108. If no margin is found during this examination procedure, the same procedure is nevertheless repeated starting with the next flute valley (see, for example, 116b in FIG. 12).

Double margins are identified by analyzing the scanned diameters between the first margin identified (112a in FIG. 11) and the second flute valley (116b in FIG. 11). If the diameters in such region go through a maximum approaching the diameter across the first margin 112a, then it is presumed that a double margin exists.

Helix angle is determined by location of the second flute valley 116b relative to the first. The calculation of the helix angle is based on the tangent of the helix. Comments in the "HELIX.C" portion in the source code of the Appendix explains this particular calculation, and it is further explained below.

Overall length of each bit 14 is done in the "LENCALC" routine of the software. This routine analyzes the diameter array from the second flute valley to the end of the drill, by analyzing the diameters in sequential order. When a diameter of 0.02 inches or less is found, the software presumes that the point end of the bit has been found, and the overall length of the bit is calculated by multiplying the number of diameters, beginning from the first one until the last, by 0.03.

As indicated above, the recognition computer 78 calls certain recognition subroutines for the purpose of identifying shank type, flute characteristics, bit diameter and length. These routines analyze the dimensional data obtained from the second laser scanner as follows: Shank type is determined first, in a manner described below. Then, a starting location is selected along the bit for sequentially analyzing measurements forwardly of such location toward the point end of the drill. An initial present maximum bit diameter is identified at that location. As the remaining data is subsequently analyzed, the present maximum diameter is updated, depending on the content of the data, and the flute characteristics are also determined. Lastly, the bit's length is calculated.

In the case of the various bits refurbished at Boeing, the shank type of such bit is processed or determined by distinguishing between threaded adapter bits, with or without hex; short quick-change adapters; long quick-change adapters, with or without grooves; straight shank bits; and center drills.

In order to recognize a ¼ inch, 28 thread adapter without hex, the recognition computer's software examines two diameters where the threads should be, and one diameter just beyond where the threads should be. If the first two diameters fall within a certain diameter window for such adapter, and the third diameter is a value less than the minimum thread diameter for such bit, then the software recognizes the bit as being a ¼ inch, 28 thread adapter without hex. On the other hand, if the first two diameters fall within the diameter window, but the third diameter is greater than the maximum thread diameter, then the software recognizes the bit as being a ¼ inch, 28 thread adapter with hex. The same procedure is followed in identifying a 5/16th inch, 24 thread adapter with hex, except that a different diameter window is used.

When attempting to recognize short, quick-change adapters, the recognition software examines all crosswise diameter measurements (0.03 inch spacing between each) beginning 0.18 inches from the butt end of the bit, and ending 0.39 inches from the butt end. If at least two diameters within this range are within a window corresponding to such adapter, then the recognition software identifies the bit as such, but recognizes that the bit may also be a long quick-change adapter, a letter N drill shank, or a tanged drill shank. The software therefore checks the crosswise diameters that are 0.96 and 0.99 inches from the butt end. If both of these diameters and the diameter that is located 0.45 inches from the butt end are outside the window for short quick-change adapters, then the software recognizes the bit as being a short quick-change adapter.

When searching for long quick-change adapters with no grooves, the recognition software checks all diameters between 0.85 and 1.05 inches from the bit's butt end. If two or more diameters within such range are within the diameter window for such adapter, and the diameter that is at 1.2 or 1.32 inches from the butt end is outside the window, then the recognition software identifies the bit as a long quick-change adapter.

The same procedure is followed when identifying long quick-changer adapters with either no grooves, or single or double grooves. The recognition software further examines diameters that are between 0.12 to 0.33 inches from the butt end, and looks for any diameters that are less than the minimum of the window specification, followed by a diameter that is within the window. If this occurs once it indicates a single groove, if it occurs twice it indicates a double groove.

Straight shank bits are determined by examining six diameters within the range of 0.36 to 0.90 inches from the butt end. These diameters are averaged, and each one is checked to determine whether or not all are equal to the average plus or minus 0.01 inches. If this test fails, which would probably be the case if the shank is tanged, another set of six diameters is examined, but within the range of 0.6 to 1.5 inches from the butt end. The second set is averaged similarly. If either one of these two tests pass, then the shank qualifies as a straight shank, although the bit could also qualify as a center drill.

In order to distinguish between straight shank bits and center drills, the recognition software first checks the diameter which is 0.72 inches from the butt end. If such diameter is less than 0.22 inches, and the diameter which is 0.06 inches from the butt end is greater than such diameter divided by six, and less than such diameter divided by two, then the bit qualifies as a center drill. If not, the diameter which is 1.02 inches from the butt end is checked. If such diameter is greater than 0.22 inches, and the diameter which is 0.09 inches from the butt end is greater than such diameter divided by seven, and less than such diameter divided by two, then the bit also qualifies as a center drill. If neither test passes, the bit is identified as a straight shank drill.

After the recognition software identifies shank type, it then determines an accurate starting bit diameter for that particular shank. For adapted drills, this is done by scanning several diameters just beyond the termination of the adapter, and looking for any two diameters that are within 0.0005 inches of each other. Two diameters would be that close in value only on a good section of the drill shank, or across drill margins if the flutes happen to start just beyond the end of the adapter. For straight shank drills, the starting maximum diameter is determined by averaging the six diameters that are checked to determine the shank. The starting maximum diameter is updated, in the manner described below, as the remaining portion of the bit is analyzed.

It should be mentioned at this point that it is quite important to determine the maximum diameter of the bit with a high degree of accuracy. Some bit sizes differ in diameter by as little as 0.001 inches. Bits that have backtaper, i.e. are largest in diameter at the cutting point but taper back as much as 0.0009 inches per inch of length, makes the necessity of high accuracy in determining the maximum diameter even more critical.

The recognition software solves accuracy problems in obtaining maximum drill diameter as follows. As the diameter data is scanned forwardly of the starting location, in order to look for flute valleys, drill margins and the end of the drill, the diameter is passed through what is equivalent to a three-diameter shift register. If at any time, two out of three diameters in sequence are within a tolerance value of 0.0003 inches relative to each other, and all are greater than the present maximum diameter, then the present maximum diameter is updated to the highest value of the three. Since each diameter measurement is typically separated by 0.03 inches, the chances of particles being on the drill surface at two of the three locations are very small, which provides a high degree of accuracy.

After locating the starting diameter for the drill, the recognition software analyzes the crosswise measurements toward the point end of the bit, and first looks for the first flute valley of the bit's silhouette. This is done by determining where the array of diameter data goes through a value that is less than 85% of the maximum diameter. The location of such value is flagged by the software (the variable "flutestart"), and is used later to aid in the identification of certain drills. Analysis of the diameters then continues in sequence until they pass through a minimum value. The location of this minimum is flagged as the first flute valley.

Searching for the first flute valley is followed by searching for margins. The recognition software begins at the location of the first flute valley and analyzes toward the point end of the drill a certain distance that is limited in order to avoid descending into a following flute valley. Such distance limit is calculated by dividing the maximum diameter of the bit by 150. For example, if the maximum diameter found up to that point happened to be 0.2470 inches, the search distance would be limited to the next sixteen diameters following the first flute valley (2470+150). As these diameters are analyzed coming up out of the flute valley, they will go through a certain maximum value, and then drop off in value to a lesser value if a margin relief is present. If no margin relief is present, such pattern will not occur, and the recognition software will identify the bit as having "no margins."

In the event the recognition software determines the existence of a first margin or margin relief, a search for a second margin is then performed. The search distance for the second margin is limited in a manner similar to that which was done for the first margin. First, the minimum diameter across the margin relief area is found. Referring to FIG. 12, for example, the margin relief is indicated at 126. The diameters across the relief 126 are relatively constant. After the minimum is determined, however, the diameters within the search limit forward of the minimum are checked in order to see whether or not any diameters are within 0.0007 inches of the first margin, indicated at 114 in FIG. 12. If so, then the flute characteristic of the bit is identified as being "double margin." If no second margin is found, then the bit is presumed to be "single margin" and the software searches for the next or second flute valley.

The location of the second flute valley is determined in the same way that the first flute valley was determined. That is, the diameter data is checked for a minimum. When the second valley is located, the flute helix angle is calculated. In actuality, in accordance with the invention, it is actually the tangent of the helix angle that is calculated according to the following formula: (pi X "drill diameter") divided by (2 X "the distance between the two flute valleys").

After making the above determinations, the recognition software goes on to calculate the overall length of the drill, simply by multiplying the total number of diameter measurements obtained by the second laser 44 times 0.03 inches.

It is to be appreciated that the above-described recognition methodology is dictated by the drill bits that are being sorted or typed. If bits other than those identified are to be sorted, then the recognition software would have to be amended accordingly. The above description is directed to the kinds of bits sorted and refurbished by The Boeing Company. Nevertheless, it is to be appreciated that the scope of patent coverage sought here is not to be limited by the above description. Instead, the scope of patent coverage is to be defined and limited only by the subjoined claims, wherein such claims are to be interpreted in accordance with the well-established doctrines of patent claim interpretation.

SOFTWARE APPENDIX

```
cc startask.r recsystem.r -l=load.r -l=link.r -l=unload.r
  -l=datatransc.r -l=iosub.r -l=makmodule.r -f=/h0/DRS/DRS
  /Startask -n=Startask ttl link to a module
        nam link.a
        psect link.a,0,0,0,0,0
    link:
        move.l d0,a0
        move.w #$0,d0
        OS9 F$Link
        bcc.s lp
        move.l #$0,d0
    lp
        move.l a2,d0
        rts
        ends
        ttl load module from a file
        nam load.a
        psect load.a,0,0,0,0,0
    load:
        move.l d0,a0
        move.b #$0,d0
        OS9 F$Load
        bcc.s lp
        move.l #$0,d0
    lp
        move.l a2,d0
        rts
        ends
```

```
/*------------------------------------------------------------------
        THIS FUNCTION STARTS THE RECOGNITION SYSTEM SOFTWARE
---------------------------------------------------------------------*/
#include <time.h>
include <stdio.h>
#include <message.h>
#include "sorter.h"
IOD *io;                        /* IOD is defined in sorter.h. It is a */
extern int os9forkc();          /* structure type used to create a common */
extern char **environ;          /* data path between multiple processes */
                                /* that use common I/O ports.           */
recsystem(fp)
FILE *fp;
  {
    static char *argv1[]={"orient",0};
    static char *argv2[]={"recognize",0};
    static char *argv3[]={"newbam",0};
    char ch=0,x[12],*message,*mod_link();
    int flg=1,flag,n,r,m,pid1,pid2,pid3,pd;

dbaselink(&message);                /* link to MESSMOD module   */
    ioinit();                           /* initialize I/O           */
    *(message+STARTFLAG)=1;             /* set flag to read         */
    if((pip1() & 0x80)==0)              /* check for bam ready signal */
      {
        transmit(":Downloading Bam program",fp);
        receive(x,fp,&flg,0);
        if((pid1=os9exec(os9forkc,argv3[0],argv3,environ,0,0,0))>0)
          wait(0);
        else
          {
            transmit("can't start <bams> module",fp);
            receive(x,fp,&flg,0);
            quit(fp);
          }
      }
    if((pid2=os9exec(os9forkc,argv1[0],argv1,environ,0,0,0))<=0)
      {
        transmit("can't start <orient> task",fp);
        receive(x,fp,&flg,0);
        *(message+STARTFLAG)=0;
        quit(fp);
      }
    sleep(1);
    if((pid3=os9exec(os9forkc,argv2[0],argv2,environ,0,0,0))<=0)
      {
        transmit("can't start <recognize> task",fp);
        receive(x,fp,&flg,0);
        *(message+STARTFLAG)=0;
        quit(fp);
      }
    wait(0);
    wait(0);
    transmit(":Recognition System has been suspended",fp);
    quit(fp);
  }
/*--------------
    initialize i/o
   --------------*/
  ioinit()
    {
      extern IOD *io;
```

```c
    pioinit();
    }
/*------------
   database link
   ------------*/
 dbaselink(message)
 int *message;
   {
     mod_create(1000,"MESSMOD");
     mod_create(20,"sortmod");
     *message=(int)mod_link("MESSMOD");
     mod_unlink("MESSMOD");
   }
/*------------
   quit routine
   ------------*/
 quit(fp)
 FILE *fp;
    {
      ioinit();
      mod_delete("MESSMOD");
      mod_delete("sortmod");
      return;
    }
/*-------------------------------------------------------------------
   This is the mother task of the Recognition System Software
   -------------------------------------------------------------------*/
#include <time.h>
include <stdio.h>
extern int os9forkc();
extern char **environ;
FILE *g_bamport;
char *g_message;
main()
 {
   FILE *fp;
   char message,flag=0,end[3],input[100],extra[100];
   int n,m;

configure();              /* Start the clock */
    end[0]=0x7f;
    end[1]=extra[0]=0;
    fp=fopen("/t1","w+");
    if(fp==0){printf("can't open port /t1\n"); getout(message,fp);}
    while(1)
      {
        n=receive(input,fp,&flag,0);          /* wait for command */
        if(input[0]==end[0]) {transmit(end,fp);break;}
        else if(input[0]==':')
            {
              ;
            }
        else
            {
              m=strcmp(input,"START");
              if(m==0)
                {
                  transmit(":Recognition System acknowledged ",fp);
                  recsystem(fp);
                }
              else transmit(":Unrecognized Command",fp);
            }
      }
```

```
        getout(&message,fp);    /* abort the system */
  }
/*---------------
    configuration
    -----------*/
configure()
  {
    static char *sh[]={"shell",0};
    struct sgtbuf tm;

tm.t_year=89; tm.t_month=10; tm.t_day=24; tm.t_hour=12;
    tm.t_minute=0; tm.t_second=0;
    setime(&tm);
    os9exec(os9forkc,sh[0],sh,environ,0,0,3);
  }
/*-----
   abort
   -----*/
getout(message,fp)
char *message;
FILE *fp;
  {
    fclose(fp);
    exit(0);
  }
recvrepeat(input,extra,flag,fp)
char *input,*extra;
int *flag;
FILE *fp;
  {
    int i,timeout=2;

i=receive(extra,fp,flag,timeout);
    if(i>0)
      {
        strcat(input,extra);
        recvrepeat(input,extra,flag,fp);
      }
  }
  ttl unload  module from memory
  nam unload.a
  psect unload.a,0,0,0,0,0
unload:
  move.l d0,a0
  move.w #$0,d0
  OS9 F$UnLoad
  rts
  ends
```

— *Orient Process*

```
################################################################
#                                                              #
#       MAKEFILE FOR THE DRILL ORIENTATION PROCESS "ORIENT"    #
#                                                              #
########################################################## orient:  main.r start.r caltime1.r call.r shuttle.r flipper.r \
         gate5.r getdial.r sizechek.r ptorsh.r strait1.r \
         strait2.r looptime.r iosub.r
```

```
cc  main.r start.r caltime1.r call.r shuttle.r flipper.r \
    gate5.r getdial.r sizechek.r ptorsh.r strait1.r \
    strait2.r looptime.r iosub.r -l=makmodule.r \
    -f=/h0/DRS/DRS/orient -t=/r0 -n=Orient
/* CALIBRATION ROUTINE FOR ORIENTATION LASERMIKE */ include "sorter.h"
include <stdio.h>
include "message.h"
#define timer 5                                   /* Time in seconds */
extern IOD *io;

call(message)
char *message;
  {
    extern unsigned char op1,op2,op3,op4;
    int _sec,_tmcount;
    int flag=0;            /* Set when error message is placed in buffer */ sprintf(0xf705a0,"CAL1    ");
    _tmcount=0;
    initimecount(&_sec);
    while(!(pip3() & 0x08))                /* Segment error signal active? */
      {
        if(*(message+STARTFLAG)==0) return;       /* System shutdown ? */
        timecount(&_tmcount,&_sec);
        if(_tmcount>=timer && flag==0)
          {
            pioch1(io->op2 != 0x08);                 /* Turn on air jet */
            strcpy(message+MESSAGEBUF,"Clearing laser slot 1");
            *(message+MESSAGEFLAG)=flag=1;
          }
      }
    *(message+MESSAGEFLAG)=flag=0;
    pioch1(io->op2 &= ~0x08);                        /* Turn off air jet */
    pioch2(io->op3 != 0x04);                         /* Send the CAL signal */
    pioch3(io->op4 &= ~0x10);      /* Take lasermike STOP input high */
    pioch2(io->op3 != 0x08);       /* Take lasermike START input low */
    _tmcount=0;
    initimecount(&_sec);
    while(!(pip3() & 0x01))                /* Check LO CAL request signal */
      {
        if(_tmcount>=5)      /* Once started, don't shut down without */
          if(*(message+STARTFLAG)==0) return;/* finishing calibration. */
        timecount(&_tmcount,&_sec);
        if(_tmcount>=timer && flag==0)
          {
            strcpy(message+MESSAGEBUF,"Waiting for LO CAL request #1");
            *(message+MESSAGEFLAG)=flag=1;
          }
      }
    *(message+MESSAGEFLAG)=flag=0;
    pioch1(io->op2 != 0x01);              /* Activate LO CAL solenoid */
    sleep(1);          /* Allow time for LO CAL pin to get in place */
    _tmcount=0;
    initimecount(&_sec);
    while(!(pip3() & 0x08))                /* Check segment error signal */
      {
        if(_tmcount>=5)
          if(*(message+STARTFLAG)==0) return;
        timecount(&_tmcount,&_sec);
        if(_tmcount>=timer && flag==0)
          {
            strcpy(message+MESSAGEBUF,"LO CAL pin not in laser beam #1");
            *(message+MESSAGEFLAG)=flag=1;
          }
      }
```

```c
*(message+MESSAGEFLAG)=flag=0;
pioch2(io->op3 |= 0x02);                              /* LO CAL ready */
sleep(1);
pioch2(io->op3 &= ~0x02);                /* Remove LO CAL ready signal */
_tmcount=0;
initimecount(&_sec);
while(!(pip3() & 0x02))                  /* Check HI CAL request signal */
  {
  if(_tmcount>=5)
    if(*(message+STARTFLAG)==0) return;
  timecount(&_tmcount,&_sec);
  if(_tmcount>=timer && flag==0)
     {
     pioch1(io->op2 &= ~0x01);  /* Remove LO CAL pin from laser beam */
     strcpy(message+MESSAGEBUF,"Waiting for HI CAL request #1");
     *(message+MESSAGEFLAG)=flag=1;
     }
  }
*(message+MESSAGEFLAG)=flag=0;
pioch1(io->op2 &= ~0x01);     /* Remove LO CAL pin from laser beam */
sleep(1);                                  /* Give it time to get out */
while(!(pip3() & 0x08))                    /* Check segment error signal */
  {
  if(_tmcount>=5)
    if(*(message+STARTFLAG)==0) return;
  timecount(&_tmcount,&_sec);
  if(_tmcount>=timer && flag==0)
     {
     strcpy(message+MESSAGEBUF,"CAL pin in beam or dirt in slot 1");
     pioch1(io->op2 |= 0x08);              /* Turn on slot 1 air jet */
     *(message+MESSAGEFLAG)=flag=1;
     }
  }
*(message+MESSAGEFLAG)=flag=0;
pioch1(io->op2 &= ~0x08);                          /* Turn off air jet */
pioch1(io->op2 |= 0x20);          /* Put HI CAL pin in laser beam */
pioch2(io->op3 &= ~0x04);                  /* Remove CAL request signal */
sleep(1);                           /* Give the pin time to get there */
_tmcount=0;
initimecount(&_sec);
while(!(pip3() & 0x08))                    /* Check segment error signal */
  {
  if(_tmcount>=5)
    if(*(message+STARTFLAG)==0) return;
  timecount(&_tmcount,&_sec);
  if(_tmcount>=timer && flag==0)
     {
     strcpy(message+MESSAGEBUF,"Trying to move HI CAL pin #1");
     *(message+MESSAGEFLAG)=flag=1;
     }
  }
*(message+MESSAGEFLAG)=flag=0;
pioch2(io->op3 |= 0x01);                              /* HI CAL pin ready */
pioch2(io->op3 &= ~0x08);         /* Take lasermike START input high */
pioch3(io->op4 |= 0x10);          /* Take lasermike STOP input low */
sleep(2);
pioch1(io->op2 &= ~0x20);                          /* Remove HI CAL pin */
pioch2(io->op3 &= ~0x01);              /* Remove HI CAL ready signal */
_tmcount=0;
initimecount(&_sec);
while(!(pip3() & 0x08))                    /* Check segment error signal */
  {
  if(_tmcount>=5)
    if(*(message+STARTFLAG)==0) return;
  timecount(&_tmcount,&_sec);
  if(_tmcount>=timer && flag==0)
     {
```

```
        strcpy(message+MESSAGEBUF,"CAL pin in beam or dirt in slot 1");
        piochl(io->op2 != 0x08);              /* Turn on slot 1 air jet */
        *(message+MESSAGEFLAG)=flag=1;
      }
    }
  *(message+MESSAGEFLAG)=flag=0;
  piochl(io->op2 &= ~0x08);                   /* Turn off air jet */
}
/* READS CLOCK, CHECKS ELAPSED TIME, AND CALLS CALIBRATION
   ROUTINE WHEN ELAPSED TIME EXCEEDS THE DEFINED INTERVAL.

Calibration is performed when the program starts initially.
   The second calibration occurs 30 minutes from the start. All
   calibrations following occur in two hour intervals.
*/ include <stdio.h>
include "message.h"
#define interval1 0.5   /* Time from start to second calibration */
define interval2 2.0   /* Time between calibrations, in hours */ struct tt { char t_year,t_month,t_day,t_hour,t_minute,t_second;};

int hour, minute;

caltime1(message)
char *message;
{
  float ctime,min,etime;
  static float lastime = 0.0;
  static int flag=0; /* if true, the .5 hr. calib. has been done */ struct tt b;
  getime(&b);
  hour = b.t_hour;
  minute = b.t_minute;
  min = (float)minute / 60.00;
  ctime = hour + min;
  if((ctime - lastime) < 0)
     etime = ctime + (24 - lastime);
  else
     etime = ctime - lastime;
  if(etime > interval1 && flag < 2)
    {
     flag++;
     lastime = ctime;
     cal1(message);
    }
  else if(etime > interval2)
    {
     lastime = ctime;
     cal1(message);
    }
}
/* LOADS AND ROTATES THE FLIPPER.

Proximity sensor PS8 senses the presence of a drill in the Flipper.
   Sensor PS6 is active when the Flipper is deactived (Gate 3 at the
   top) and PS7 is active when the Flipper is in the activated posi-
   tion (Gate 4 at the top). The Flipper position status flag, "flip-
   stat", is stored in battery backed ram at address F70502 and the
   orientation code of the drill to be placed in the Flipper,
   "orcode", is stored at F70500. This is done to insure correct
```

```
     operation when the system is brought on line. Also, if the drill
     is over about ten inches long, the process is put to sleep for
     about 400 milliseconds before closing the upper Flipper gate to
     prevent trapping the drill there when it bounces off of the lower
     gate. When this is done, a flag is set at address F70504 which will
     be used to indicate that a delay is also required at Gate 5. The
     shank status flag set at address F70506 by the strait1() or
     strait2() function is transferred to address F70508.
*/ include <stdio.h>
include "sorter.h"
#include "message.h"
#define mem(adr) ((unsigned char *)(adr))
                                                    /* Time in seconds */
extern IOD *io;

flipper_load(message)
char *message;
{
  extern int datacount;
  unsigned char flipstat;                           /* Flipper status flag */
  unsigned char orcode;                             /* Drill orientation code */
  int _sec,_tmcount;
  char ssf;                                         /* Drill shank status flag */
  int flag=0;          /* Set when error message is placed in buffer */ sprintf(0xf705a0,"%-20s","FLIPPER");
  *(message+MESSAGEFLAG)=0;
  _tmcount=0;
  initimecount(&_sec);
  while(!(pip0() & 0x02))              /* check PS2 for Shuttle position */
    {
      if(*(message+STARTFLAG)==0) return;/* Check for system shutdown */
      timecount(&_tmcount,&_sec);
      if(_tmcount>=timer && flag==0)
        {
          strcpy(message+MESSAGEBUF,"Shuttle is not in position");
          *(message+MESSAGEFLAG)=flag=1;
        }
    }
  *(message+MESSAGEFLAG)=flag=0;
  _tmcount=0;
  initimecount(&_sec);
  while((!(pip0() & 0x20)) && (!(pip0() & 0x40)))
    {                                    /* check Flipper position */
      if(*(message+STARTFLAG)==0) return;/* Check for system shutdown */
      timecount(&_tmcount,&_sec);
      if(_tmcount>=timer && flag==0)
        {
          strcpy(message+MESSAGEBUF,"Flipper is out of position");
          *(message+MESSAGEFLAG)=flag=1;
        }
    }
  *(message+MESSAGEFLAG)=flag=0;
  if(pip0() & 0x20)
    {                                                /* check PS6 */
      pioch(io->op1 |= 0x40);
    }                                                /* open Gate 3 */
  else
    {
      pioch(io->op1 |= 0x80);
    }                                                /* open Gate 4 */
```

```
pioch(io->op1 != 0x02);                              /* open Gate 2 */
ssf= *mem(0xF70506);         /* Get shank status of Shuttle drill. */
*mem(0xF70508)=ssf;          /* Set shank status of Flipper drill. */
tsleep(1);                   /* Sleep while drill travels to PS8 */
_tmcount=0;
initimecount(&_sec);
while(!(pip0() & 0x80));                   /* Check PS8 for Flipper drill */
  {
   if(*(message+STARTFLAG)==0) return;/* Check for system shutdown */
   timecount(&_tmcount,&_sec);
   if(_tmcount>=timer && flag==0)
     {
      strcpy(message+MESSAGEBUF,"No drill in the Flipper");
      *(message+MESSAGEFLAG)=flag=1;
     }
  }
*(message+MESSAGEFLAG)=flag=0;
pioch(io->op1 &= ~0x02);                             /* close Gate 2 */
*(message+FDRILL)=1;    /* Flag indicates drill placed in Flipper */
if(datacount > 115)
  {
   *mem(0xF70504)=0x01;       /* So debounce will be used at Gate 5 */
   tsleep(40);            /* Delay for drill bounce for 12 inch drills*/
  }
pioch(io->op1 &= ~0xC0);                        /* close Gate 3 and 4 */
orcode = *mem(0xF70500);     /* Get orcode from battery backed ram*/
if(orcode == 0)                        /* If drill is point first... */
  {
   flipstat = *mem(0xF70502);          /* Get flipstat from battery */
   if(flipstat==0)                     /* backed ram               */
     {
      pioch(io->op1 != 0x04);                  /* Activate the Flipper */
      flipstat=1;
      *mem(0xF70502) = 0x01;              /* Put flipstat in battery */
     }                                       /* backed ram             */
   else
     {
      pioch(io->op1 &= ~0x04);                /* Deactivate the Flipper */
      flipstat = 0;
      *mem(0xF70502) = 0x00;              /* Put flipstat in battery */
     }                                       /* backed ram             */
   _tmcount=0;
   initimecount(&_sec);
   if(flipstat==1)                       /* Flipper is being activated */
     {
      while(pip0() & 0x20)         /* Wait until PS6 becomes inactive */
        {
         if(*(message+STARTFLAG)==0) return;   /* System shutdown ? */
         timecount(&_tmcount,&_sec);
         if(_tmcount>=timer && flag==0)
           {
            strcpy(message+MESSAGEBUF,"Trying to rotate the Flipper");
              *(message+MESSAGEFLAG)=flag=1;
           }
        }
     }
   else
     {
      while(pip0() & 0x40)         /* Wait until PS7 becomes inactive */
        {
         if(*(message+STARTFLAG)==0) return;   /* System shutdown ? */
         timecount(&_tmcount,&_sec);
```

```
          if(_tmcount>=timer && flag==0)
            {
              strcpy(message+MESSAGEBUF,"Trying to rotate the Flipper");
              *(message+MESSAGEFLAG)=flag=1;
            }
        }
      }
     *(message+MESSAGEFLAG)=flag=0;
     tsleep(2);                          /* Sleep while flipper is rotating */
    }
   _tmcount=0;
   initimecount(&_sec);
   while(((!(pip0() & 0x20)) && (!(pip0() & 0x40))))
     {
      if(*(message+STARTFLAG)==0) return;        /* System shutdown */
      timecount(&_tmcount,&_sec);
      if(_tmcount>=timer && flag==0)
        {
         strcpy(message+MESSAGEBUF,"Flipper is out of position");
         *(message+MESSAGEFLAG)=flag=1;
        }
     }
   *(message+MESSAGEFLAG)=flag=0;
}
/* PLACES THE ORIENTED DRILL AT GATE 5

A flag is set in the flipper routine if the drill is long
   enough to require a debounce delay to prevent it from being
   trapped by the gate that just released it. If a delay was
   required in the flipper, it will also be required at Gate 5.
   The flag is located at address F70504. The shank status flag
   for the drill in the flipper is located at address F70508.
   This flag is transferred to address F7050A. The shank status
   flag indicates whether or not the drill is a straight shank
   jobber. This flag has a value of one if the drill is not a
   straight shank jobber and a value of two if it is. FDRILL is
   a flag used to indicate the transfer of a drill from Flipper
   to Gate 5 and G5DRILL is a flag used to indicate the transfer
   of a drill from Gate 5 to the Stroker. These flags are
   declared in file message.h.
*/ include <stdio.h>
include "sorter.h"
#include "message.h"
#define mem(adr) ((unsigned char *)(adr))
#define timer 5                          /* Time in seconds */
extern IOD *io;

gate5_load(message)
char *message;
{
  extern unsigned char op1,op2;
  extern int datacount;
  int _sec,_tmcount,flag=0;
  int g5;                         /* Gate 5 open/closed status */
  char ssf;                       /* Drill shank status flag */
  char flipstat;

sprintf(0xf705a0,"%-20s","GATE 5 ");
  *(message+MESSAGEFLAG)=0;
  flipstat=*mem(0xF70502);       /* Flipper position status flag */
  _tmcount=0;                    /* check Flipper position */
```

```
initimecount(&_sec);
while((((!(pip0() & 0x20)) && (!(pip0() & 0x40))) || ((pip0() &
0x20) && flipstat==1) || ((pip0() & 0x40) && flipstat==0))

/* While (PS6 & PS7 not active) or (PS6 active and flipstat=1) o
r (PS7 active and flipstat=0) */
  {
  if(*(message+STARTFLAG)==0) return;   /* System shutdown ? */
  timecount(&_tmcount,&_sec);
  if(_tmcount>=timer && flag==0)
    {
    strcpy(message+MESSAGEBUF,"Flipper is not in correct positi
on");
    *(message+MESSAGEFLAG)=flag=1;
    }
  }
*(message+MESSAGEFLAG)=flag=0;
ssf=*mem(0xF7050B);  /* Get shank status of drill in Flipper */
*mem(0xF7050A)=ssf; /* Set shank status flag for Gate 5 drill */
if(pip0() & 0x20)           /* Check Flipper position, PS6 */
  pioch(io->op1 |= 0x80);                  /* Open Gate 4 */
else
  pioch(io->op1 |= 0x40);                  /* Open Gate 3 */
tsleep(1);          /* Sleep while drill travels to Gate 5 */
_tmcount=0;
initimecount(&_sec);
while(!(pip2() & 0x04))   /* Wait for drill to activate PS16 */
  {
  if(*(message+STARTFLAG)!=1) return;   /* System shutdown ? */
  timecount(&_tmcount,&_sec);
  if(_tmcount>=timer && flag==0)
    {
    strcpy(message+MESSAGEBUF,"No drill at Gate 5");
    *(message+MESSAGEFLAG)=flag=1;
    }
  tsleep(3);
  }
*(message+MESSAGEFLAG)=flag=0;
if(*mem(0xF70504)==1)          /* Is debounce time required? */
  {
  tsleep(40);
  *mem(0xF70504)=0x00;
  *mem(0xF7050C)=0x01;   /* Set so debounce will be used at   */
  }                      /* the decelerator gate.            */
pioch(io->op1 &= ~0xC0);                /* close Gates 3 and 4 */
*(message+FDRILL)=0;              /* Drill taken from Flipper */
*(message+G5DRILL)=1;  /* A drill has been released from the  */
}                       /* Flipper.                            */

/* GETS THE ASCII DATA FROM THE EXTERNAL BUFFER AND CONVERTS IT TO
   INTEGER DIAMETERS. THE DATA WAS PLACED IN THE EXTERNAL BUFFER BY
   A 68008 PROCESSOR WHICH OBTAINED IT FROM THE LASERMIKE. THE
   LASERMIKE SENDS A NULL WHEN IT FINDS THE END OF A DRILL AND A
   9999 IF IT EVER SEES MORE THAN ONE PART AT A TIME IN THE BEAM.
   SOMETIMES THESE SHOW UP AT THE BEGINNING OF THE BUFFER WHICH
   SHIFTS THE DATA OR SCREWS UP THE POINTER. STEPS ARE TAKEN HERE
   TO AVOID THIS PROBLEM. ALSO, A DIRT PARTICULE COULD PASS THRU
   THE BEAM BEFORE THE DRILL ARRIVES AND CAUSE A NULL TO BE SENT
   PREMATURELY, WHICH WOULD CAUSE AN UNNECESSARY REJECT. WE TAKE
   CARE OF THAT TOO.
*/
```

```c
include <stdio.h> getdial()
{
 extern char *datapntr;
 extern int datacount;
 int lastdia,x;
 int count=0;

if(datacount <2)
 {
  x=0;
  while(x<10 && (*datapntr<0x30!!*datapntr>0x39!!*(datapntr+4)!=0x0A))
  {
   datapntr++;
   x++;
  }
  x=0;
  while(x<4 && (atoi(datapntr)==9999))
  {
   datapntr +=5;
   x++;
  }
 }
 while(*datapntr==0 && datacount<10 && count<3 )
 {
  datapntr++;
  count++;/* Must find 3 nulls to really be the end of the drill */
 }
 lastdia = atoi(datapntr);
 datacount++;
 if(*datapntr == 0)
  lastdia = 0;
 datapntr +=5;
 return(lastdia);
}
*(message+MESSAGEFLAG)=flag=0;
ssf=*mem(0xF7050B);   /* Get shank status of drill in Flipper */
*mem(0xF7050A)=ssf;/* Set shank status flag for Gate 5 drill */
if(pip0() & 0x20)                /* Check Flipper position, PS6 */
 pioch(io->op1 != 0x80);                     /* Open Gate 4 */
else
 pioch(io->op1 != 0x40);                     /* Open Gate 3 */
tsleep(1);           /* Sleep while drill travels to Gate 5 */
_tmcount=0;
initimecount(&_sec);
while(!(pip2() & 0x04))    /* Wait for drill to activate PS16 */

{
  if(*(message+STARTFLAG)!=1) return;   /* System shutdown ? */
  timecount(&_tmcount,&_sec);
  if(_tmcount>=timer && flag==0)
   {
    strcpy(message+MESSAGEBUF,"No drill at Gate 5");
    *(message+MESSAGEFLAG)=flag=1;
   }
  tsleep(3);
 }
*(message+MESSAGEFLAG)=flag=0;
if(*mem(0xF70504)==1)              /* Is debounce time required? */
 {
  tsleep(40);
  *mem(0xF70504)=0x00;
```

```c
    *mem(0xF7050C)=0x01;     /* Set so debounce will be used at   */
    }                        /* the decelerator gate.            */
  pioch(io->op1 &= ~0xc0);                   /* close Gates 3 and 4 */
  *(message+FDRILL)=0;                /* Drill taken from Flipper  */
  *(message+G5DRILL)=1;  /* A drill has been released from the     */
  }                        /* Flipper.                            */
  /* TIME FUNCTIONS USED BY ERROR DETECTION LOOPS */ include "message.h"
include <time.h>
include <stdio.h> timecount(_tmct,_sec)
int *_tmct;
char *_sec;
  {
    struct sgtbuf timebuf;
    char _sc,_d;

getime(&timebuf);
    _sc=timebuf.t_second;
    if(*_sec>_sc) _d=60-*_sec+_sc;
    else _d=_sc-*_sec;
    *_tmct=*_tmct+_d;
    *_sec=_sc;
  } initimecount(_sec)
char *_sec;
  {
    struct sgtbuf timebuf;

getime(&timebuf);
    *_sec=timebuf.t_second;
  }
/*------------------------------------------------------------
               DRILL RECOGNITION SYSTEM SOFTWARE
            (c) Copyright 1988 by The Boeing Company
                       All Rights Reserved
--------------------------------------------------------------*/

/* MAIN() IS THE BEGINNING FUNCTION OF THE PROCESS "ORIENT". THIS
   PROCESS TAKES DRILLS PRESENTED TO IT ONE AT A TIME AND DETER-
   MINES THEIR ORIENTATION, WHETHER OR NOT THEY ARE WITHIN CERTAIN
   SIZE LIMITS AND REJECTS THEM IF THEY ARE NOT, AND PLACES THE
   DRILLS ORIENTED SHANK FIRST AT GATE 5. THE PROCESS "RECOGNIZE"
   TAKES THE DRILLS FROM GATE 5 AS NEEDED.
*/ include <stdio.h>
include "sorter.h"
#include "message.h"
#define timer 5                              /* Time in seconds */
#define mem(adr) ((unsigned char *)(adr))

FILE *g_bamport;
IOD *io;

main()
  {
    char *message,*mod_link();
    int x,_sec,_tmcount;
    int flag=0;
```

```c
unsigned char flipstat;                    /* Flipper status flag */
unsigned int *n;
extern IOD *io;

message=mod_link("MESSMOD");
          mod_unlink("MESSMOD");
  *(message+ORIENT)='Y';
  if((n=(unsigned int *)mod_link("sortmod"))!=NULL)
  {
   mod_unlink("sortmod");
   io = (IOD *)n;
   sprintf(0xf705a0,"%-20s","MAIN");
   pioch3(io->op4 != 0x04);  /* Tell 68008 to reset buffer pointer */
   tsleep(2);
   pioch3(io->op4 &= ~0x04);
   pioch3(io->op4 != 0x10);           /* Take lasermike STOP input low */
   while(!(pip1() & 0x80))            /* Wait for BAM ready signal */
     {
      if(*(message+STARTFLAG)==0)
        getout(message);
      sleep(1);
     }
   *(message+MESSAGEFLAG)=0;
   if(pip0() & 0x80)                  /* If drill in Flipper (PS8 active) */
     *(message+FDRILL)=1;
   else
     *(message+FDRILL)=0;
   if(pip2() & 0x04)                  /* If drill at Gate 5 (PS16 active) */
     *(message+G5DRILL)=1;
   else
     *(message+G5DRILL)=0;
   _tmcount=0;                        /* check Flipper position */
   initimecount(&_sec);
   while((!(pip0() & 0x20))&&(!(pip0() & 0x40)))/* Check PS6 & PS7 */
     {
      if(*(message+STARTFLAG)==0)
        getout(message);
      timecount(&_tmcount,&_sec);
      if(_tmcount>timer && flag==0)
        {
         strcpy(message+MESSAGEBUF,"Flipper is not in position");
         *(message+MESSAGEFLAG)=flag=1;
        }
     }
   *(message+MESSAGEFLAG)=flag=0;
   if(pip0() & 0x80)                  /* check PS8 for flipper drill */
   {
    flipstat = *mem(0xF70502);         /* Check flipper status flag */
    if(flipstat == 0x01)
    {
     pioch(io->op1 !=0x04);                  /* activate the Flipper */
     sleep(1);                         /* Let the flipper and drill settle */
    }
   }
   else
     *mem(0xF70502) = 0;/* If no drill, flipper status flag = zero */
   start(message);
  }
  else
     {
      sprintf(message+MESSAGEBUF,"ERROR %d CAN'T CREATE OR LINK DATA MODULE",errno);
      *(message+MESSAGEFLAG)=1;
```

```
    }
  getout(message);
}
/*------------------
   exit the program
   ---------------*/
getout(message)
char *message;
  {
   sprintf(0xf705a0,"GETOUT(%x)=(%d)",message+STARTFLAG,*(message+STARTFLAG));
   *(message+ORIENT)=0;
   exit(0);
  }
/* CHECKS ORIENTATION OF THE DRILL.

The diameters stored in ordia[] are divided in half. Both
    halves are summed. If the sum of the first half is greater
    than the sum of the second half, the drill is shank first.
    If not, the drill is point first.
*/ define mem(adr) ((unsigned char *)(adr))

ptorsh()
  {
   extern int datacount, ordia[300];
   int count, firsthalf, secondhalf;
   char orcode;                              /* Drill orientation code */
   count=1;
   firsthalf=ordia[count];
   secondhalf=0;
   while(count != (datacount -1)/2)
     {
      if(ordia[count] != 9999)
        firsthalf += ordia[count];
      count++;
     }
   while(count != (datacount -1))
     {
      if(ordia[count] != 9999)
        secondhalf += ordia[count];
      count++;
     }
   if(firsthalf > secondhalf)
      orcode=1;                              /* Drill is shank first */
   else
      orcode=0;                              /* Drill is point first */
   *mem(0xF70500)=orcode;                    /* Place in battery backed ram */
   return(orcode);
  }
/* LOADS THE SHUTTLE AND CALLS THE ORIENTATION DATA LOAD AND
   ANALYZING ROUTINES. THE "REJECT" FUNCTION IS LOCATED AT THE
   END OF THIS FILE.

The 68008 data acquisition processor sets a flag "A00A"(hex) at
   address FC1F32 and FC1F33 when it is asleep and waiting for new
   data from the laser. To avoid overwriting good data in the mail-
   box memory (caused by false triggering of the interrupt line), a
   transfer of data from the 68008 on board ram to the mailbox
   will be made only if the flag has been cleared. The flag is
   cleared here just before the 68008 is told that the latest drill
   has passed the laser beam. The 68008 also sets a data byte count
``` at address FC1F20. (The laser sends five bytes per scan.) Also,
OE(hex) is set at address FC1F40 by the 68008 when it has
transferred all data to the mailbox. The byte count and transfer
flag are cleared after the "data done" signal is received.
*/

```c
include <stdio.h>
include "sorter.h"
#include "message.h"
#define mem(adr) ((unsigned char *)(adr))
#define meml(adr) ((unsigned long *)(adr))
#define timer 5                                 /* Time in seconds */
extern IOD *io;

shuttle_load(message)
char *message;
{
  extern int datacount;                         /* Number of diameters */
  int x,drilstat;
  int _sec,_tmcount;
  int flag =0;          /* Set when a message is placed in buffer */
  char orcode;                                  /* Drill orientation code */
  static int rejcount;  /* Number of rejects not sensed by PS5 */ sprintf(0xf705a0,"SHUTTLE");
  pioch3(io->op4 |= 0x04);   /* Tell 68008 to reset buffer pointer */
  tsleep(2);
  pioch3(io->op4 &= ~0x04);
  *(message+MESSAGEFLAG)=0;
  _tmcount=0;
  initimecount(&_sec);
  while(!(pip0() & 0x02))            /* Check PS2 for Shuttle position */
    {
    if(*(message+STARTFLAG)==0) return;
    timecount(&_tmcount,&_sec);
    if(_tmcount>=timer && flag==0)
      {
      strcpy(message+MESSAGEBUF,"Shuttle is not in position");
      *(message+MESSAGEFLAG)=flag=1;
      }
    }
  *(message+MESSAGEFLAG)=flag=0;
  pioch3(io->op4 &= ~0x10);     /* Take lasermike STOP input high   */
  _tmcount=0;
  initimecount(&_sec);
  while(!(pip3() & 0x08))            /* Check the segment error signal */
    {
    if(*(message+STARTFLAG)==0) return;
    timecount(&_tmcount,&_sec);
    if(_tmcount>=timer && flag==0)
      {
      strcpy(message+MESSAGEBUF,"Slot #1 is not clear");
      *(message+MESSAGEFLAG)=flag=1;
      }
    if(_tmcount >=1);
      pioch1(io->op2 |= 0x08);                  /* Turn on air jet */
    tsleep(10);
    }
  *(message+MESSAGEFLAG)=flag=0;
  pioch1(io->op2 &= ~0x08);                     /* Turn off air jet */
  pioch2(io->op3 |= 0x08);   /* Take lasermike START input low   */ pioch(io->op1 |= 0x01);                       /* Open Gate 1 */
```

```c
  tsleep(1);               /* Sleep while drill travels to the shuttle */
  for(x=0; x<10;++x)
  {
    if(pip0() & 0x10)                     /* If drill activates PS5 */
    {
      rejcount=0;
      break;
    }
    else
      tsleep(10);
  }
  if(x>9)          /* If the above for loop counted out, increment */
    rejcount++;    /* the count for rejects that did not activate  */
  if(rejcount>2)   /* PS5. If this happens more than twice tell    */
  {                /* the operator. There may be a jam at Gate 1.  */
    while(!(pip0() & 0x10))   /* While PS5 is not active... A drill */
    {                         /* must be placed at Gate 2 to get    */ if(*(message+STARTFLAG)==0) return;  /* out of this loop. It  */
      if(flag==0)                /* should also go thru the laser beam. */
      {
        strcpy(message+MESSAGEBUF,"Need drill at Gate 2, check Gate 1
");
        *(message+MESSAGEFLAG)=flag=1;
      }
      tsleep(10);
    }
    *(message+MESSAGEFLAG)=flag=0;
    rejcount=0;
  }
  pioch(io->op1 &= ~0x01);                        /* Close Gate 1 */
  _tmcount=0;
  initimecount(&_sec);
  while(!(pip3() & 0x08))          /* Wait for drill to leave the beam */
  {
    if(*(message+STARTFLAG)==0) return;
    timecount(&_tmcount,&_sec);
    if(_tmcount>=2 && flag==0)
    {
      strcpy(message+MESSAGEBUF,"Drill or dirt in slot #1");
      *(message+MESSAGEFLAG)=flag=1;
    }
    pioch1(io->op2 |= 0x08);                      /* Turn on air jet */
  }
  *(message+MESSAGEFLAG)=flag=0;
  pioch2(io->op3 &= ~0x08);      /* Take lasermike START input high */
  pioch3(io->op4 |= 0x10);       /* Take lasermike STOP input low   */
  pioch1(io->op2 &= ~0x08);                      /* Turn off air jet */
  *mem(0xf71f32)=0;       /* Clear ready for data flag set by 68008 */
  *mem(0xf71f33)=0;
  pioch3(io->op4 |= 0x04); /* Tell 68008 that the drill is finished */
  _tmcount=0;
  initimecount(&_sec);
  do{
    if(*(message+STARTFLAG)==0) return;
    timecount(&_tmcount,&_sec);
    if(_tmcount>=timer && flag==0)
    {
      strcpy(message+MESSAGEBUF,"Waiting on Orientation data transfer
");
      *(message+MESSAGEFLAG)=flag=1;
    }
    tsleep(2);
```

```c
    pioch3(io->op4 &= ~0x04);           /* Reset signal to 68008 */
    } while(!(pip2() & 0x01));          /* Wait for data done flag */
*mem1(0xf71f20)=0;                /* Clear the data count set by 68008 */
*mem(0xf71f40)=0;         /* Clear data transfered flag set by 68008 */
drilstat = sizechek();
if(drilstat==0 || drilstat==2)
  {
  reject(message,drilstat);
  return;
  }
if(drilstat == 1)                           /* An acceptable drill */
  {
  orcode = ptorsh();                /* Determine drill orientation */
  if(orcode ==1)                         /* Drill is shank first */
    strait1();                    /* Is it a straight shank drill? */
  else                                   /* Drill is point first */
    strait2();                    /* Is it a straight shank drill? */
  }
_tmcount=0;
initimecount(&_sec);
while(!(pip0() & 0x10))                          /* PS5 active? */
  {
  if(*(message+STARTFLAG)==0) return;
  timecount(&_tmcount,&_sec);
  if(_tmcount>=timer && flag==0)
    {
    strcpy(message+MESSAGEBUF,"Drill did not arrive at the Shuttle"
);
    *(message+MESSAGEFLAG)=flag=1;
    }
  }
*(message+MESSAGEFLAG)=flag=0;
if(drilstat != 1)
  {
  if(datacount > 105)
    tsleep(40);                      /* Debounce time for long drills *
  reject(message,drilstat);
  }
if(drilstat == 1 && datacount < 12)
  {
  tsleep(25);                       /* Make sure the drill has settled. * if(!(pip0() & 0x10))                         /* PS5 not active? *
    {
    drilstat = 0;                  /* The drill must be too short *
    reject(message,drilstat);           /* Reject unacceptable drill *
    }
  }
}

/* THE "REJECT" FUNCTION CONTROLS THE SHUTTLE. THE VARIABLE
   "DRILSTAT" COMES IN SET TO ZERO OR TWO. IF ZERO, THE DRILL IS
   SHUTTLED LEFT; IF TWO, THE DRILL IS SHUTTLED RIGHT.
*/ reject(message,drilstat)
char *message;
int drilstat;
  {
  extern int ordia[300];
  int x,y;
  int flag=0;
  int _tmcount,_sec;
```

```
  *(message+MESSAGEFLAG)=0;
  tsleep(30);                        /* Let the drill or drills settle */
  pioch(io->op1 |= 0x20);            /* Lift Shuttle flip-stop */
  tsleep(30);        /* Give the flip-stop time to get out of the way */
  if(drilstat ==2)           /* More than one drill was in the beam */
   {
    pioch(io->op1 |= 0x10);                        /* Shuttle right */
    _tmcount=0;
    initimecount(&_sec);
    while((!(pip0() & 0x04)) && (!(pip0() & 0x08)))
      {
       if(*(message+STARTFLAG)==0) return;
       timecount(&_tmcount,&_sec);
       if(_tmcount>=timer && flag==0)
         {
          strcpy(message+MESSAGEBUF,"Trying to reject the Shuttle drill ");
          *(message+MESSAGEFLAG)=flag=1;
         }
      }
    *(message+MESSAGEFLAG)=flag=0;
   }
  else
   {
    pioch(io->op1 |= 0x08);                        /* Shuttle left */
    _tmcount=0;
    initimecount(&_sec);
    while((!(pip0() & 0x04)) && (!(pip0() & 0x08)))
      {
       if(*(message+STARTFLAG)==0) return;
       timecount(&_tmcount,&_sec);
       if(_tmcount>=timer && flag==0)
         {
          strcpy(message+MESSAGEBUF,"Trying to reject the Shuttle drill ");
          *(message+MESSAGEFLAG)=flag=1;
         }
      }
    *(message+MESSAGEFLAG)=flag=0;
   }
  tsleep(30);
  pioch(io->op1 &= ~0x18);                   /* Deactivate the Shuttle */
  tsleep(60);
  pioch(io->op1 &= 0xdf);       /* Deactivate the Shuttle flip-stop */
 }
/* CHECKS DIAMETER AND OVERALL LENGTH LIMITS.

The Lasermike sends a 9999 if it detects more than one part in
   the beam at any time. This should happen only if two or more
   drills are passing through the beam at a time. However, it
   could happen if a dirt particle passes through the beam at
   the same time the drill does. Steps are taken here to minimize
   this problem.
*/ include <stdio.h> char *datapntr;
int  ordia[300];            /* Array of integer diameter values */
int  datacount;

sizechek()
 {
  extern char *datapntr;
```

```c
extern int ordia[300],datacount;
int diamax=0;              /* Maximum drill diameter found */
int drilstat=1;            /* Accept/reject status of the drill */
int scanerr=0;/* Number of times a scan value of 9999 is found*/
int lastdia.

datapntr = 0xF71000;   /* Starting address of external buffer */
    datacount=-1;
    do
    {
      lastdia=getdial();
      if(lastdia == 9999)  /* More than one object in the beam.   */
        scanerr++;         /* A particle of dirt could pass thru */
      if(scanerr >2)       /* the beam while the drill is being   */
      {                    /* scanned, so we won't reject the     */
        drilstat=2;        /* drill unless 9999 appears more than */
        return(drilstat);  /* twice.                              */
      }
      if(lastdia > diamax && lastdia !=9999)
        diamax = lastdia;
      if(diamax > 5300 || datacount > 175)
      {                    /* Reject the drill if the diameter is */
        drilstat=0;        /* greater than .530" or if it is much */
        return(drilstat);  /* longer than 12 inches. 1/2" drills  */
      }                    /* can have burrs on the shank.        */
      if(diamax > 4000 && datacount > 125)/* A 1/2" by 12" drill? */
      {
        drilstat=0;
        return(drilstat);
      }
      if(datacount >300)
        break;
      ordia[datacount] = lastdia; /* put good dia. into int. array*/
    } while(lastdia != 0);
    if((diamax >4600&&datacount >42)||(diamax >2600&&datacount >60))
    {
      if((ordia[2]<(diamax/2))&&(ordia[datacount-3]<(diamax/2)))
        drilstat=0;        /* Looks like a heavy center drill */
    }
    if(diamax<900||datacount<12)
      drilstat=0; /* Drill is too small in diameter, too short, or */
    if(*(datapntr + 10)!=0)
      drilstat=2;          /* Two drills end to end but separated */
    return(drilstat);/* possibly more than one drill came through */
}

/* CALLS THE ORIENTATION LASERMIKE CALIBRATION TIME CHECK ROUTINE AND

CHECKS THE DRILL SENSORS TO DETERMINE IF A DRILL IS REQUIRED AT A
   PARTICULAR LOCATION.

There are 5 override swithches located below the drill track
   which allow manual control of the Shuttle, Flipper, Gate 2,
   Gate 3, and Gate 4 to facilitate the unjamming of trapped
   drills or cleaning the track. The status of these switches is
   checked before calling each of the drill transfer routines.
   This is necessary to prevent screwing up the flags that are
   set or transfered with each drill transfer. FDRILL is a flag
   set to indicate the transfer of a drill into the Flipper cleared
   when the drill is released to Gate 5. G5DRILL is a flag set to
   indicate the transfer of a drill to Gate 5 and cleared when the
   drill is released to the Stroker. These flags are declared
   in the file message.h.
*/ include <stdio.h>
include "message.h"
```

```c
start(message)
char *message;
{
  int _tmcount,_sec;
  int flag=0;
  int x;

*(message+MESSAGEFLAG)=0;
  while(*(message+STARTFLAG))
    {
      caltime1(message);
      _tmcount=0;
      initimecount(&_sec);
      while(!(pip2() & 0x10))
        {
          if(*(message+STARTFLAG)==0) return;
          timecount(&_tmcount,&_sec);
          if(_tmcount>=10 && flag==0)
            {
              strcpy(message+MESSAGEBUF,"Check OVERRIDE switches");
              *(message+MESSAGEFLAG)=flag=1;
            }
        }
      *(message+MESSAGEFLAG)=flag=0;
      if((!(pip0() & 0x10))&&(!(pip0() & 0x01)))
                                           /* If PS5 inactive and PS1 active */
          shuttle_load(message);                    /* Load the Shuttle */
      _tmcount=0;
      initimecount(&_sec);
      while(!(pip2() & 0x10))
        {
          if(*(message+STARTFLAG)==0) return;
          timecount(&_tmcount,&_sec);
          if(_tmcount>=10 && flag==0)
            {
              strcpy(message+MESSAGEBUF,"Check OVERRIDE switches");
              *(message+MESSAGEFLAG)=flag=1;
            }
        }
      *(message+MESSAGEFLAG)=flag=0;
      if((pip0() & 0x80) && *(message+FDRILL)==0)
 /* If a drill is in the Flipper but FDRILL says there shouldn't be */
        {
          while(pip0() & 0x80)                /* While PS8 is active */
            {
              if(*(message+STARTFLAG)==0) return;
              if(flag==0)
                {
                  strcpy(message+MESSAGEBUF,"Remove drill in Flipper");
                  *(message+MESSAGEFLAG)=flag=1;
                }
            }
          *(message+MESSAGEFLAG)=flag=0;
        }
      _tmcount=0;
      initimecount(&_sec);
      while(*(message+FDRILL)==1 && !(pip0() & 0x80))
           /* If a drill entered the flipper point first, it will take */
                   /* time to reach the sensor again after flipping. */
        {
          if(*(message+STARTFLAG)==0) return;
```

```
        timecount(&_tmcount,&_sec);
        if(_tmcount>2 && flag==0)
          {
           strcpy(message+MESSAGEBUF,"Check Gates 3 & 4 then place drill
  in Flipper");
           *(message+MESSAGEFLAG)=flag=1;
          }
        }
     *(message+MESSAGEFLAG)=flag=0;
     if((!(pip0() & 0x80))&&(pip0() & 0x10)&& *(message+FDRILL)==0)
            /* If PS8 inactive and PS5 active and previous drill taken */
        flipper_load(message);        /* Load flipper and orient drill */
     _tmcount=0;
     initimecount(&_sec);
     while(!(pip2() & 0x10))
       {
        if(*(message+STARTFLAG)==0) return;
        timecount(&_tmcount,&_sec);
        if(_tmcount>=10 && flag==0)
          {
           strcpy(message+MESSAGEBUF,"Check OVERRIDE switches");
           *(message+MESSAGEFLAG)=flag=1;
          }
        }
     *(message+MESSAGEFLAG)=flag=0;
     if((pip2() & 0x04) && *(message+G5DRILL)==0)
       /* If a drill is at Gate 5 but G5DRILL says there shouldn't be */
       {
        while(pip2() & 0x04)                  /* While PS16 is active */
          {
           if(*(message+STARTFLAG)==0) return;
           if(flag==0)
             {
              strcpy(message+MESSAGEBUF,"Remove drill at Gate 5");
              *(message+MESSAGEFLAG)=flag=1;
             }
          }
        *(message+MESSAGEFLAG)=flag=0;
        }
     if(!(pip2() & 0x04)&&(pip0() & 0x80)&&(*(message+G5DRILL)==0))
           /* If PS16 inactive, PS8 active, and last drill taken */
        gate5_load(message);          /* Place oriented drill at Gate 5 */
    }
  }

/* TEST FOR STRAIGHT SHANK DRILL ORIENTED SHANK FIRST

A test for material alloy is performed at Gate 5. This test is
     required on straight shank drills only. This function deter-
     mines whether or not the drill is a straight shank jobber and
     sets a flag at address F70506. The flag is set in battery backed
     ram so it will not be lost when the system is shut down. If the
     drill is not a straight shank, the flag is set to 1; if it is a
     straight shank, the flag is set to 2. Later, when the drill is
     transfered to the Flipper, the flag value will be transfered to
     address F70508, and when the drill is transfered to Gate 5, the
     flag value will be transfered to address F7050A. Finally, the
     Recognition task will transfer the flag to address FC0508 when
     the drill is placed at the Stroker.
  */ define   mem(adr)  ((unsigned char *)(adr))
```

```
strait1()
{
 extern int ordia[300], datacount;
 int avg1=0;
 int avg2=0;
 int x, y;
 int shankstat=0;

avg1=(ordia[4]+ordia[6]+ordia[8]+ordia[10]+ordia[12]+ordia[14])/6;
 x=avg1 + 100;
 y=avg1 - 100;
 if(x>ordia[4]&&y<ordia[4]&&x>ordia[6]&&y<ordia[6]&&x>ordia[8]&&y<ordi
a[8]&&x>ordia[10]&&y<ordia[10]&&x>ordia[12]&&y<ordia[12]&&x>ordia[14]&
&y<ordia[14])
  {
   if((avg1<2700&&datacount<75)||(avg1>=2700&&datacount>45&&datacount<9
7))
           /* Only jobber length straight shanks need be flagged here */
     shankstat=2;                    /* Looks like a straight shank drill */
  }

/* If it doesn't look like a straight shank drill try one more time */
 /* to be sure. Use the odd diameters this time. A burr on the shank */
 /* could have caused the test to fail.                              */ if(shankstat==0)
  {
   avg2=(ordia[3]+ordia[5]+ordia[7]+ordia[9]+ordia[11]+ordia[13])/6;
   x=avg2 + 100;
   y=avg2 - 100;
   if(x>ordia[3]&&y<ordia[3]&&x>ordia[5]&&y<ordia[5]&&x>ordia[7]&&y<ord
ia[7]&&x>ordia[9]&&y<ordia[9]&&x>ordia[11]&&y<ordia[11]&&x>ordia[13]&&
y<ordia[13])
   {
    if((avg2<2700 && datacount<75)||(avg2>=2700&&datacount>45&&datacoun
t<97))
           /* Only jobber length straight shanks need be flagged here */ shankstat=2;
   }
  }
 if(((ordia[2]<3050&&ordia[2]>2980)||(ordia[3]<3050&&ordia[3]>2980)||(
ordia[4]<3050&&ordia[4]>2980))&&(ordia[26]>3050 || ordia[26]<2980))
     shankstat=1;                    /* Looks like it's a quick change drill */
 if(shankstat==2)
    *mem(0xF70506)=0x02;             /* A straight shank drill */
 else
    *mem(0xF70506)=0x01;             /* Non-straight shank drill */
}
```

/* TEST FOR A STRAIGHT SHANK DRILL ORIENTED POINT FIRST

A test for material alloy is performed at Gate 5. This test is
   required on straight shank drills only. This function deter-
   mines whether or not the drill is a straight shank drill and
   sets a flag at address F70506. The flag is set in battery backed
   ram so it will not be lost when the system is shut down. If the
   drill is not a straight shank, the flag is set to 1; if it is a
   straight shank, the flag is set to 2. Later, when the drill is
   transfered to the Flipper, the flag value will be transfered to address F70508, and when the drill is transfered to Gate 5, the
flag value will be transfered to address F7050A. Finally, the
Recognition task will transfer the flag to address FC0508 when
the drill is placed at the Stroker.
*/

```c
#define  mem(adr) ((unsigned char *)(adr))

strait2()
{
 extern int ordia[300], datacount;
 int avg1=0;
 int avg2=0;
 int x, y;
 int shankstat=0;

avg1=(ordia[datacount-3]+ordia[datacount-5]+ordia[datacount-7]+ordia[
datacount-9]+ordia[datacount-11])/5;
 x=avg1 + 100;
 y=avg1 - 100;
 if(x>ordia[datacount-3]&&y<ordia[datacount-3]&&x>ordia[datacount-5]&&
y<ordia[datacount-5]&&x>ordia[datacount-7]&&y<ordia[datacount-7]&&x>or
dia[datacount-9]&&y<ordia[datacount-9]&&x>ordia[datacount-11]&&y<ordia
[datacount-11])
 {
   if((avg1<2700 && datacount<75)!!(avg1>=2700&&datacount>45&&datacount
<97))
        /* Only jobber length straight shanks need be flagged here. */
    shankstat=2;              /* Looks like a straight shank drill  */
 }

/* If it doesn't look like a straight shank drill try one more time */
/* to be sure. Use the even diameters this time. A burr on the      */
/* shank could have caused the test to fail.                        */ if(shankstat==0)
 {
   avg2=(ordia[datacount-4]+ordia[datacount-6]+ordia[datacount-8]+ordia
[datacount-10]+ordia[datacount-12])/5;
   x=avg2 + 100;
   y=avg2 - 100;
   if(x>ordia[datacount-4]&&y<ordia[datacount-4]&&x>ordia[datacount-6]&
&y<ordia[datacount-6]&&x>ordia[datacount-8]&&y<ordia[datacount-8]&&x>o
rdia[datacount-10]&&y<ordia[datacount-10]&&x>ordia[datacount-12]&&y<or
dia[datacount-12])

{
     if((avg2<2700 && datacount<75)!!(avg2>=2700&&datacount>45&&datacou
t<97))
        /* Only jobber length straight shanks need be flagged here *
      shankstat=2;
   }
 }
 if(((ordia[datacount-2]<3050&&ordia[datacount-2]>2980)!!(ordia[datac
unt-3]<3050&&ordia[datacount-3]>2980)!!(ordia[datacount-4]<3050&&ordi
[datacount-4]>2980))&&(ordia[datacount-24]>3050 !! ordia[datacount-24
<2980))
    shankstat=1;                   /* Looks like it's a quick change drill *,
 if(shankstat==2)
    *mem(0xF70506)=0x02;                        /* Straight shank drill *,
 else
    *mem(0xF70506)=0x01;                        /* Non-straight shank drill *,
}
```

- Recognize Process

```
###############################################################
#                                                              #
#       MAKEFILE FOR THE DRILL RECOGNITION PROCESS "RECOGNIZE" #
#                                                              #
######################################################### recognize: main2.r start2.r caltime2.r cal2.r stroker.r quitcheck.r \
        identify.r analyze.r shankdia.r threadshank.r lentable.r \
        centerdrill.r longQC.r straightshank.r valley1.r margin1.r \
        margin2.r valley2.r helix.r stepsearch.r lencalc.r idout.r \
        typetable.r stdsize.r absize.r stepsize.r stepcheck.r \
        shortQC.r nuconcheck.r pf_drill.r getdia2.r idbuf.r iosub.r \
        datatransc.r chkbam.r cobalt.r reamer.r cc main2.r start2.r caltime2.r cal2.r stroker.r quitcheck.r \
        identify.r analyze.r shankdia.r threadshank.r lentable.r \
        centerdrill.r longQC.r straightshank.r valley1.r margin1.r \
        margin2.r valley2.r helix.r stepsearch.r lencalc.r idout.r \
        typetable.r stdsize.r absize.r stepsize.r stepcheck.r \
        shortQC.r nuconcheck.r pf_drill.r getdia2.r idbuf.r iosub.r \
        datatransc.r chkbam.r cobalt.r reamer.r -l=load.r \
        -l=makmodule.r -t=/r0 -f=/h0/DRS/DRS/recognize -n=Recognize
```

```
/* ABRIDGED STANDARD DRILL SIZE (DIAMETER) TABLE

This table is used by those drill types for which a limited
    number of sizes are stocked. It allows the diameter windows
    to be wider which improves the odds of correctly identifying
    the drill.
*/ absize()
{
  extern int maxdia,drilcode,shank;
  extern float length;
  extern char *size,*driltype;

if(maxdia>=3700 && maxdia<=3850)
    size="53";                                              /* 3/8 */
  else if(maxdia>=3390 && maxdia<=3490)
    size="4E";                                              /* 11/32 */
  else if(maxdia>=3070 && maxdia<=3180)
    size="48";                                              /* 5/16 */
  else if(maxdia>=2920 && maxdia<=3020)
    size="46";                                              /* 19/64 */
  else if(maxdia>=2770 && maxdia<=2860)
    size="43";                                              /* 9/32 */
  else if(maxdia>2615 && maxdia<=2710)
    size="3E";                                              /* 17/64 */
  else if(maxdia>2540 && maxdia<=2615)
    size="3C";                                              /* F */
  else if(maxdia>=2460 && maxdia<=2540)
    size="3A";                                              /* 1/4 */
  else if(maxdia>=2300 && maxdia<=2390)
    size="36";                                              /* 15/64 */
```

```c
        else if(maxdia>=2140 && maxdia<=2240)
          size="32";                                        /* 7/32 */
        else if(maxdia>=2000 && maxdia<=2080)
          size="2D";                                        /* 13/64 */
        else if(maxdia>1950 && maxdia<=1990)
        {
          if(shank==3 || shank==5 || shank==6)
            size="29";                                      /* 10 */
          else
            size="2A";                                      /* 9 */
        }
        else if(maxdia>=1913 && maxdia<=1950)
          size="29";                                        /* 10 */
        else if(maxdia>1895 && maxdia<1913)
        {
          if(shank==5 || shank==6 || shank==7)
            size="29";
          else
            size="28";                                      /* 11 */
        }
        else if(maxdia>=1840 && maxdia<=1895)
          size="26";                                        /* 3/16 */
        else if(maxdia>1770 && maxdia<1840)
          size="23";                                        /* 15 */
        else if(maxdia>=1670 && maxdia<=1770)
          size="20";                                        /* 11/64 */
        else if(maxdia>1590 && maxdia<=1660)
          size="1D";                                        /* 20 */
        else if(maxdia>=1510 && maxdia<=1590)
          size="1A";                                        /* 5/32 */
        else if(maxdia>=1360 && maxdia<=1455)
          size="14";                                        /* 9/64 */
        else if(maxdia>1262 && maxdia<=1330)
        {
          size="11";                                        /* 30 */
          if(drilcode==321 && length>3.5)
            driltype="62";            /* Hi-spiral 4 inch - Type K4 */
        }
        else if(maxdia>=1200 && maxdia<=1262)
        {
          size="10";                                        /* 1/8 */
          if(drilcode==321 && length>3.5)
            driltype="62";            /* Hi-spiral 4 inch - Type K4 */
        }
        else if(maxdia>=1050 && maxdia<=1140)
          size="08";                                        /* 7/64 */
        else if(maxdia>955 && maxdia<=1030)
        {
          size="03";                                        /* 40 */
          if(drilcode==321 && length>3.5)
            driltype="62";            /* Hi-spiral 4 inch - Type K4 */
        }
        else
          size="00";                           /* Unknown or reject */
}
```

```
/*------------------------------------------------------------------
                    DRILL RECOGNITION SOFTWARE
                (c) Copyright 1988 by The Boeing Company
                         All Rights Reserved
------------------------------------------------------------------*/

/* CALLS THE RECOGNITION DATA ANALYSIS ROUTINES */ include <stdio.h>
include "message.h"
#include "variables.h"                    /* Global variable declarations */
#define mem(adr) ((unsigned char *)(adr))

analyze(message,fp,bport)
char *message;
FILE *fp,*bport;
{
 extern int backtaper,dia[67],drilcode,encount,feature,mar2count;
 extern int lastdia,marsearch,maxdia,shank,lencode,minloc,offset;
 extern int margdia1,margdia2,margdia4,maxloc,m4loc;
 extern int flutestart,mar1count;
 extern char *driltype, *size, *datadres;
 extern float length,tangent;
 int x;
 char ssf;
 driltype="00";
 size="00";
 datadres=0xFC1000;
 shank = 0;
 feature = 0;
 lencode=0;
 length = 0.0;
 encount=0;
 marsearch=0;
 mar1count=0;
 mar2count=0;
 maxdia=0;
 backtaper=0;
 margdia1=0;
 margdia2=0;
 margdia4=0;
 maxloc=0;
 minloc=0;
 m4loc=0;
 offset=0;
 tangent=0;
 for(x=0;x<68;x++)
    dia[x] = 0;

shankdia();                         /* Load shank diameter array */
  ssf=*mem(0xFC0508);                 /* Get Shank Status Flag */
  if(ssf==2)                          /* Is it a straight shank jobber? */
    cobalt();                         /* See if it's a cobalt drill */
  threadshank();                      /* check for threaded shank */
   if(shank==15)
   {
    driltype="00";                                        /* Reject */
    idout(message,fp,bport);
    return;
   }
```

```c
if(shank==0)                         /* 5/16-24 threaded shank with hex */
{
 lencalc();
 if(maxdia>3050 && maxdia<3200 && length>2.5 && length<3.6)
 {
   driltype="74";                                          /* 5/16 x 3 */
   size="48";
 }
 else if(maxdia>3700 && maxdia<3850 && length>2.5 && length<3.6)
 {
   driltype="74";                                          /* 3/8 x 3 */
   size="53";
 }
 else
   driltype="00";                                          /*. Reject */
 idout(message,fp,bport);
 return;
}
if(shank==7)                         /* 1/4-28 threaded shank without hex */
{
 stepcheck();
 idout(message,fp,bport);
 return;
}
if(shank==6)                         /* threaded shank with hex */
{
 if(dia[67]<200)
 {
   stepcheck();
   if(lencode==15)
     driltype="7B";                                        /* Short flutes */
   idout(message,fp,bport);
   return;
 }
 else                   /* If the drill is over 1.02 inches long, */
   goto flute;          /* check for one, two, or no margins.     */
}
shortQC();              /* check for short quick change adapter */
if(shank==15)
{
 driltype="00";                                            /* Reject */
 idout(message,fp,bport);
 return;
}
if(shank==5)                         /* short quick change adapter */
{
 if(dia[55] < 200)      /* Don't look for double margins if the */
 {                      /* drill is shorter than 1.64 inches.   */
   stepcheck();
   if(lencode==15)
     driltype="7B"; /* Short flutes */
   idout(message,fp,bport);
   return;
 }
 else                   /* If the drill is over 1.64 inches long, */
   goto flute;          /* check if single or double margins.     */
}
longQC();               /* check for long quick change adapter */
if(shank==14)                        /* Split or otherwise bad adapter */
{
 driltype="7C";
 idout(message,fp,bport);
 return;
```

```
  }
  if(shank==15)
  {
   driltype="OO";                                            /* Reject */
   idout(message,fp,bport);
   return;
  }
  if(shank==2 || shank==3)    /* plain or single grooved QC adapter */
   goto flute;
  if(shank==4)    /* double grooved QC adapter (constant webb drill)*/
  {
   feature=5;
   lencalc();
   lentable();
   drilcode=shank+(feature*16)+(lencode*256);
   typetable();
   stdsize();
   if(lencode==15)
     driltype="7B";                                  /* Short flute length */
   idout(message,fp,bport);
   return;
  }
  straightshank();
  if((shank >1 && shank <10)|| shank==0)/* If not a straight shank */
  {
   if(shank==9)
   {
    centerdrill(message,fp,bport);      /* See if its a centerdrill */
    return;
   }
   else
   {
    driltype= "OO";                                          /* Reject */
    idout(message,fp,bport);
    return;
   }
  }
 flute: valley1();
  if(mindia<.4*maxdia||lastdia<.4*maxdia||(shank==1&&flutestart <33))
  {
   driltype="OO";        /* At this point, the diameter across the    */
   idout(message,fp,bport);/* drill should never be less than 40% of */
   return;               /* it's maximum diameter. Also, the flutes   */
  }                      /* should never start closer than one inch   */
  margin1();             /* from the end of a straight shank drill.   */
  if(marsearch==1)       /* If the first margin search is completed   */
  {                      /* without the drill going out of view, but  */
   valley1();            /* no margin is found, look for the next     */
   if(lastdia<.4*maxdia)                 /* valley and try again.     */
   {                     /* If lastdia is <.4 times maxdia at this    */
    if(encount<88 && shank==1)    /* point, we are probably looking   */
    {                    /* at the point of the drill.                */
     nuconcheck();
     idout(message,fp,bport);
     return;
    }
    else if(shank==6)
    {
     driltype="7A";      /* A threaded shank and no margins means     */
     size="OO";          /* it must be a B5 something-or-other.       */
     idout(message,fp,bport);
     return;
```

```
    )
    else if((shank==1!!shank==3!!shank==6)&&maxdia<3200&&maxdia>950)
      feature=2;        /* Though we can't be absolutely sure this  */
    else               /* is a stoveburner, we will call it one    */
    {                  /* to avoid throwing away a useable drill.  */
      driltype="00";   /* The price paid is that an occasional     */
      idout(message,fp,bport);   /* piece of junk can get thrown in */
      return;          /* with the stoveburners.                   */
    }
  }
  marlcount=0;
  margin1();           /* If the drill is still in view, feature   */
                       /* is still zero at this point.             */
                       /* If no margin was found this time and the */
                       /* drill is still in view, feature was set  */
                       /* to two, indicating a stoveburner drill.  */
                       /* If a margin was found, feature remains   */
                       /* at zero and will be set in the margin2   */
                       /* or helix routine, if possible.           */
  if(lastdia<.4*maxdia)
  {
    if(shank==6 && feature==2)    /* threaded shank & no margins */
    {
      driltype="7A";                                /* B5 drill */
      size="00";
      idout(message,fp,bport);
      return;
    }
    else if((shank==1!!shank==3!!shank==6)&&maxdia<3200&&maxdia>950)
      feature=2;       /* If no margin was found on the second try */
    else              /* we can be relatively sure it is a         */
    {                 /* stoveburner.                              */
      driltype="00";  /* If the shank type and size limits for     */
      idout(message,fp,bport); /* stoveburners are not met, we can */
      return;         /* not identify this object. (It could be    */
    }                 /* an "ST" (B5) drill.)                      */
  }
}
if(shank==6 && feature==2)       /* threaded shank & no margins */
{
  driltype="7A";                                   /* B5 drill */
  size="00";
  idout(message,fp,bport);
  return;
}
if(maxdia<3200 && maxdia>1500 && shank !=3 && feature !=2)
{                                           /* If true, it could */
  margin2();                                /* be a double margin*/
  if(lastdia<.4*maxdia)                     /* drill.            */
  {
    if(marsearch==1)
      feature=2;                 /* Lets assume it's a stoveburner */
    else if(shank==1)
    {
      nuoncheck();
      idout(message,fp,bport);
      return;
    }
  }
}
if(shank==6 && feature==1)   /* Threaded shank & double margin */
{
  lencalc();
```

```c
     if(length > 4.3) /* Maximum length for a threaded adapter drill */
       driltype="00";                                          /* Reject    */
     else
     {
       driltype="7A";                                         /* B5 drill */
       size="00";
     }
     idout(message,fp,bport);
     return;
   }
 }
 if(shank==5)          /* don't need helix angle on short QC drills */
 {
   stepcheck();
   if(lencode==15)
     driltype="7B";
   idout(message,fp,bport);
   return;
 }
 if(shank==6)   /* don't need helix angle on threaded shank drills */
 {
   if(feature==2)
   {
     driltype="7A";
     size="00";
     idout(message,fp,bport);
     return;
   }
   stepcheck();
   if(lencode==15)
     driltype="7B";                                      /* Short flutes *,
   idout(message,fp,bport);
   return;
 }
 valley2();
 if(lastdia < .4*maxdia)
 {
   if(marsearch==1)
     feature=2;
   if(encount <=90 && shank==1)
   {
     nuconcheck();
     idout(message,fp,bport);
     return;
   }
 }
 if(feature !=1 && feature !=2 && lastdia>.4*maxdia)
   helix();         /* Don't need helix angle for double margin or */
                    /* stoveburner(no margin) drills */
 if(shank==1 && feature==6)
 {
   driltype="7A";                                    /* B5 or "ST" drill */
   size="00";
   idout(message,fp,bport);
   return;
 }
 lencalc();
 if(backtaper>15)
 {
   driltype="BB";                                    /* Backtaper Reject */
   size="00";
   idout(message,fp,bport);
   return;
```

```
   )
  lentable();
   if(shank==0 !! feature==0 !! lencode==0)
    {
     driltype="00";                                      /* Reject */
     idout(message,fp,bport);
     return;
    }
   if(lencode==14)
    {
     driltype="7A";                                      /* B5 or "ST" drill */
     size="00";
     idout(message,fp,bport);
     return;
    }
   if(lencode==15)
    {
     driltype="7B";                                      /* Short flute length */
     idout(message,fp,bport);
     return;
    }
     drilcode=shank+(feature*16)+(lencode*256);

/* See typetable() for description of the following codes */ typetable();
     if(drilcode==337 !! drilcode==346 !! drilcode==2897 !! drilcode==3:
   8 !! drilcode==2898 !! drilcode==3393 !! drilcode==3409 !! drilcode==:
   40 !! drilcode==2900 !! drilcode==3377 !! drilcode==4417 !! drilcode==
   3418 !! drilcode==2906)
        stdsize();
     else if(drilcode==273 !! drilcode==2833 !! drilcode==274 !! drilcod
   e==2834)
        stepsize();
     else
        absize();
    idout(message,fp,bport);    /* Send I.D. code to Carousel computer */
 )
/* CALIBRATION ROUTINE FOR RECOGNITION LASERMIKE */ include <stdio.h>
include "sorter.h"
#include "message.h"
#define timer 5                                          /* Time in seconds */
extern IOD *io;

cal2(message,fp,bport)
char *message;
FILE *fp,*bport;
 {
  int _sec,_tmcount;
  int flag=0;
  int x=0;
  char y[10];              /* Array for reply from Carousel computer */
  char fl=0;

piochl(io->op2 != 0x10);  /* Give the slot a 50 msec air blast to */
  tsleep(5);                /* make sure it is clear.               */
  piochl(io->op2 &= ~0x10);                            /* Turn off the air. */
  _tmcount=0;
  initimecount(&_sec);
  while(!(pip3() & 0x80))                    /* Segment error signal active */
```

```
{
 if(_tmcount>7)
    quitcheck(message,fp);
 timecount(&_tmcount,&_sec);
 if(_tmcount>=5 && flag==0)
    {
     transmit("Clearing laser slot 2",fp);
     pioch1(io->op2 |= 0x10);                    /* Turn on air jet */
     flag=1;
     tsleep(5);
     receive(y,fp,&fl,0);
    }
}
flag=0;
pioch1(io->op2 &= ~0x10);                        /* Turn off air jet */
pioch2(io->op3 |= 0x40);                         /* Send the CAL signal */
pioch3(io->op4 &= ~0x20);                        /* Take lasermike STOP input high */
pioch2(io->op3 |= 0x80);                         /* Take lasermike START input low */
while(pip1() & 0x02)                             /* Check PS10 */
 {
  if(_tmcount>7)
     quitcheck(message,fp);
  timecount(&_tmcount,&_sec);
  if(_tmcount>=timer && flag==0)
    {
     transmit("PS10 is active but shouldn't be",fp);
     flag=1;
     tsleep(5);
     receive(y,fp,&fl,0);
    }
 }
flag=0;
pioch3(io->op4 |= 0x40);  /*Strobe BAM to move Stroker for LO CAL */
_tmcount=0;
initimecount(&_sec);
while(!(pip1() & 0x02))            /* Check LO CAL position sensor PS10 */
 {
  if(_tmcount>7)
     quitcheck(message,fp);
  if(x==0)
    x=chkbam(message,fp,bport);                  /* Check for servo error */
  timecount(&_tmcount,&_sec);
  if(_tmcount>=timer && flag==0 && x==0)
    {
     transmit("Trying to move stroker for LO CAL",fp);
     flag=1;
     tsleep(5);
     receive(y,fp,&fl,0);
    }
 }
flag=0;
pioch3(io->op4 &= ~0x40);                        /* Reset the strobe */
_tmcount=0;
initimecount(&_sec);
while(!(pip3() & 0x10))                          /* Check LO CAL request signal */
 {
  if(_tmcount>7)
     quitcheck(message,fp);
  timecount(&_tmcount,&_sec);
  if(_tmcount>=timer && flag==0)
    {
     transmit("Waiting for LO CAL request signal",fp);
```

```
       flag=1;
       tsleep(5);
       receive(y,fp,&fl,0);
      }
   }
flag=0;
pioch2(io->op3 |= 0x20);                         /* LO CAL pin ready */
sleep(1);
pioch2(io->op3 &= ~0x20);                        /* Remove LO CAL ready signal */
_tmcount=0;
initimecount(&_sec);
while(!(pip3() & 0x20))                          /* Check HI CAL request signal */
   {
    if(_tmcount>7)
       quitcheck(message,fp);
    timecount(&_tmcount,&_sec);
    if(_tmcount>=timer && flag==0)
      {
       transmit("Waiting for HI CAL request signal",fp);
       flag=1;
       tsleep(5);
       receive(y,fp,&fl,0);
      }
   }
flag=0;
pioch2(io->op3 &= ~0x40);                        /* Remove CAL signal *
_tmcount=0;
initimecount(&_sec);
while(pip1() & 0x04)
   {
    if(_tmcount>7)
       quitcheck(message,fp);
    timecount(&_tmcount,&_sec);
    if(_tmcount>=timer && flag==0)
      {
       transmit("PS11 is active but, shouldn't be",fp);
       flag=1;
       tsleep(5);
       receive(y,fp,&fl,0);
      }
   }
flag=0;
pioch3(io->op4 |= 0x40); /* Strobe BAM to move stroker for HI CAL *
_tmcount=0;
initimecount(&_sec);
while(!(pip1() & 0x04))            /* Check HI CAL position sensor PS11 *.
   {
    if(_tmcount>7)
       quitcheck(message,fp);
    if(x==0)
     x=chkbam(message,fp,bport);                 /* Check for servo error *.
    timecount(&_tmcount,&_sec);
    if(_tmcount>=timer && flag==0 && x==0)
      {
       transmit("Trying to move stroker for HI CAL",fp);
       flag=1;
       tsleep(5);
       receive(y,fp,&fl,0);
      }
   }
flag=0;
pioch3(io->op4 &= ~0x40);                        /* Reset the BAM strobe */
```

```c
pioch2(io->op3 |= 0x10);                    /* HI CAL pin ready */
sleep(2);
pioch2(io->op3 &= ~0x10);                   /* Remove HI CAL ready signal */
pioch2(io->op3 &= ~0x80);                   /* Take lasermike START input high */
pioch3(io->op4 |= 0x20);                    /* Take lasermike STOP input low */
_tmcount=0;
initimecount(&_sec);
while(pip1() & 0x08)                        /* Check PS12 */
  {
   if(_tmcount>7)
      quitcheck(message,fp);
   timecount(&_tmcount,&_sec);
   if(_tmcount>=timer && flag==0)
     {
      transmit("PS12 is active but shouldn't be",fp);
      flag=1;
      tsleep(5);
      receive(y,fp,&f1,0);
     }
  }
flag=0;
pioch3(io->op4 |= 0x40);                    /* Strobe BAM to home position */
_tmcount=0;
initimecount(&_sec);
while(!(pip1() & 0x08))                     /* Check PS12 */
  {
   if(_tmcount>7)
      quitcheck(message,fp);
   if(x==0)
     x=chkbam(message,fp,bport);            /* Check for servo error */
   timecount(&_tmcount,&_sec);
   if(_tmcount>=timer && flag==0 && x==0)
     {
      transmit("Trying to move the Stroker home",fp);
      flag=1;
      tsleep(5);
      receive(y,fp,&f1,0);
     }
  }
pioch3(io->op4 &= ~0x40);                   /*Reset BAM strobe */
}

/* READS REAL TIME CLOCK AND CALLS CALIBRATION ROUTINE FOR THE
   RECOGNITION LASERMIKE.

Calibration is performed when the program starts initially. A
   second calibration is performed 0.5 hours from the start. All
   calibrations following occur in two hour intervals.
*/ include <stdio.h>
include "message.h"
#define interval1 0.5   /* Time from start to second calibration */
define interval2 2.0   /* Time between calibrations, in hours */ struct tt { char t_year,t_month,t_day,t_hour,t_minute,t_second;};
int hour, minute;

caltime(message,fp,bport)
char *message;
FILE *fp,*bport;
{
 float ctime,min,etime;
```

```
  static float lastime = 0.0;
  static int flag=0;

struct tt b;

getime(&b);
   hour = b.t_hour;
   minute = b.t_minute;
   min = (float)minute / 60.00;
   ctime = hour + min;
  if((ctime - lastime) < 0)
     etime = ctime + (24 - lastime);
   else
     etime = ctime - lastime;
  if(etime > interval1 && flag < 2)
    {
    flag++;
    lastime = ctime;
    cal2(message,fp,bport);
    }
   else if(etime > interval2)
    {
    lastime = ctime;
    cal2(message,fp,bport);
    }
 }
```

/* CENTER DRILL IDENTIFICATION

The center drills are sorted essentially by body diameter and
overall length. The drill portion is so short that we can not
be certain that an accurate diameter has been obtained. However, the diameter that is obtained is checked against a diameter window to help reduce the possibility of accepting junk.
*/

```
#include <stdio.h>
include "message.h"

centerdrill(message,fp,bport)
char *message;
FILE *fp,*bport;
{
 extern int dia[67],maxdia;
 extern char *driltype,*size;
 extern float length;

lencalc();
 if(maxdia>1200 && maxdia<1300 && length>.95 && length<1.4 && dia[2]>300 && dia[2]<650)
   {
    driltype="79";                    /* 3/64 x 1/8 body x 1-1/4 */
    size="10";
   }
  else if(maxdia>1820 && maxdia<1930 && length>1.5 && length<2.0 && dia[2]>300 && dia[2]<1000)
   {
    driltype="79";                    /* 5/64 x 3/16 body x 1-7/8 */
    size="26";
   }
  else if(maxdia>2200 && maxdia<2800 && length>1.7 && length<2.2 && dia[3]>400 && dia[3]<1250)
   {
```

```c
        driltype="79";                    /* 7/64 x 1/4 body x 2 */
        size="3A";
    }
    else if(maxdia>3000 && maxdia<3300 && length>1.8 && length<2.35 &&
dia[3]>400 && dia[3]<1450)
    {
        driltype="79";                    /* 1/8 x 5/16 body x 2-1/8 */
        size="48";
    }
    else if(maxdia>4170 && maxdia<4570 && length>2.3 && length<3.0 && d
ia[4]>600 && dia[4]<2070)
    {
        driltype="79";                    /* 3/16 x 7/16 body x 2-3/4 */
        size="5C";
    }
    else if(maxdia>4800 && maxdia<5200 && length>2.5 && length<3.2 && d
ia[4]>1000 && dia[4]<2380)
    {
        driltype="79";                    /* 7/32 x 1/2 body x 3 */
        size="60";
    }
    else if(maxdia>1820 && maxdia<1930 && length>5.0 && length<6.2 && d
ia[2]>300 && dia[2]<1000)
    {
        driltype="78";                    /* 5/64 x 3/16 body x 6 */
        size="26";
    }
    else if(maxdia>2200 && maxdia<2800 && length>5.0 && length<6.2 && d
ia[3]>400 && dia[3]<1250)
    {
        driltype="78";                    /* 7/64 x 1/4 body x 6 */
        size="3A";
    }
    else if(maxdia>3000 && maxdia<3300 && length>5.0 && length<6.2 && d
ia[3]>400 && dia[3]<1450)
    {
        driltype="78";                    /* 1/8 x 5/16 body x 6 */
        size="48";
    }
    else if(maxdia>3550 && maxdia<3950 && length>5.0 && length<6.2 && d
ia[4]>500 && dia[4]<1600)
    {
        driltype="78";                    /* 9/64 x 3/8 body x 6 */
        size="53";
    }
    else if(maxdia>4170 && maxdia<4570 && length>5.0 && length<6.2 && d
ia[4]>600 && dia[4]<2070)
    {
        driltype="78";                    /* 3/16 x 7/16 body x 6 */
        size="5C";
    }
    else
        driltype="00";
    idout(message,fp,bport);
}

/*-----------------------------------------------------------------
  This function checks the bam port for error messages.
  When error occurs error message is transmitted to CC
  and a non-zero is returned; else a zero is returned.
------------------------------------------------------------------*/
#include <stdio.h>
#include <message.h>
```

```
chkbam(message,cport,bport)
char *message;
FILE *bport,*cport;
  {
    int i,n=0,m;
    char flg=1,mgs[20],y[10];
    SERVOERR *err;
    FILE *fp;

fp=bport;                                    /* bam port pointer */
    err=(SERVOERR *)(message+BAMERRPTR);         /* Make err point to */
                                                 /* Servoerr common data module. */
    mgs[0]=0;
    if(_gs_rdy(fp->_fd) >-1)                     /* check port */
      {
        m=receive(mgs,bport,&flg,15);            /* read error */
        if(m>0)
          {
            transmit(mgs,cport);
            receive(y,cport,&flg,0);
          }
        return(m);
      }
    return(0);
  }

/* CHECKS FOR A COBALTS DRILL

The butt end of a cobalt drill shank is reduced in diameter.
   Unfortuneately there are no specifications on the configuration
   of the reduced diameter area. The length of the reduced area
   varies from approximately .035" to .15" and the diameter across
   the reduced area varies from about 85% to 98% of the true shank
   diameter. There is also the problem of chamfers on drills 0.3"
   or greater in diameter. Both cobalt and non-cobalt drills may
   have a chamfer but it appears that the manufacturers do make
   the reduced area level out or at least change slope to some
   degree before stepping up to the true shank diameter. However,
   the length of the leveled out area is sometimes very short.

The diameters taken on the drills are usually spaced .03" apart.
   If the 'Orient' task has flagged a drill as being a straight
   shank jobber, the encoder pulse divider circuit is switched to
   provide diameters every .006" for the first .096" of the shank.
   Due to the stroker speed and the laser scan rate, the actual
   spacing of the diameters can be anything from .006" to .0085".
   This should, however, allow at least two diameters to be obtained
   on the reduced area on most of the drills but does make it
   impossible to accurately measure chamfer angles. First, the true
   shank diameter is obtained by scanning through several diameters
   well in beyond the reduced area. Also, to avoid having
   centerdrills pass for a cobalt, the reduced diameters must be
   greater than 85% of the true shank diameter. A couple of diameters
   just beyond the reduced area must be greater than the true shank
   diameter -.002" or the drill probably has a tang or missing QC
   adapter.
*/ cobalt()
  {
    extern int maxdia,shank,dia[67];
    int average=0;
    int x,y=0;
```

```c
for(x=20; x<39; x++)                    /* Get the true shank diameter */
 {
  if(dia[x]>(dia[x+1]-4) && dia[x]<(dia[x+1]+4))
   {
    average+=dia[x];
    y++;
   }
 }
if(y > 4)
 maxdia=average/y;
if(maxdia==0)       /* True shank diameter not set in for loop above */
 {                  /* so average 19 shank diameters.                */
  y=0;
  for(x=20; x<39; x++)
   y+=dia[x];
  maxdia=y/19;
 }
y=0;
for(x=18; x<39; x++)
 {
  if(dia[x] <(maxdia-20)||dia[x] >(maxdia+20))
   y++;
 }
if(y>2 &&(dia[43]<2980||dia[43]>3030)&&(dia[45]<2980||dia[45]>3030))
 {
  shank=15;             /* Looks like a damaged shank, reject it */
  return;
 }
for(x=20; x>2; x--)
 {
  if(dia[x]<(maxdia-30) && dia[x-1]<(maxdia-30))
   {
    if(dia[x]>(.7 * maxdia) && dia[x-1]>(.7 * maxdia))
     {
      if(dia[x]<(dia[x-1]+50) && dia[x-1]<(dia[x-2]+50))
       {
        if(maxdia>1640 && dia[19]>(maxdia-30) && dia[21]>(maxdia-30))
         {
          shank=10;
          break;
         }
        else if(maxdia<=1640&&dia[15]>(maxdia-30)&&dia[17]>(maxdia-30))
         {
          shank=10;
          break;
         }
       }
     }
   }
 }
if(shank==0 && maxdia < 1300)
 {
  for(x=17; x>1; x--)
   {
    if(dia[x]<(maxdia-20) && dia[x-1]<(maxdia-20))
     {
      if(dia[x]>(.7 * maxdia) && dia[x-1]>(.7 * maxdia))
       {
        if(dia[x] < (dia[x-1]+120))
         {
          if(dia[15]>(maxdia-20)&& dia[17]>(maxdia-20))
           {
```

```
              shank=10;
              break;
             }
            }
           }
          }
         }
        }
 dia[1]=dia[5];              /* Shift the diameters to where   */
 dia[2]=dia[10];             /* they would be if all data had  */
 dia[3]=dia[15];             /* been taken spaced every .03".  */
 for(y=17; y<68; y++)
   dia[y-13]=dia[y];
 maxdia=0;
}

/* GETS THE ASCII DIAMETER DATA FROM THE EXTERNAL DATA BUFFER AND
   CONVERTS IT TO INTEGER DIAMETERS.

The data was placed in the buffer by a 68008 processor which
   obtained it from the lasermike. Each scan consists of four
   characters plus a line feed. The lasermike sends a null when
   it finds the end of a drill and it sends a 9999 if it ever
   sees more than one part in the beam at one time. Sometimes
   these show up at the beginning of the buffer which either
   shifts the data or screws up the pointer. Steps are taken to
   eliminate this problem. Also, due to drill bounce at the
   Stroker, a null could show up after a scan or two has been
   received. We take care of that also.
*/ include <stdio.h> getdia2()
{
 extern char *datadres;
 extern int lastdia, encount, offset;
 int count=0.

if(encount ==0)
  {
   while(offset<6 && (*datadres<0x30 || *datadres>0x39 || *(datadres+4)
!=0x0A))
    {
     datadres++;
     offset++;
    }
   while(offset<17 && (atoi(datadres)==9999))
    {
     datadres +=5;
     offset +=5;
    }
  }
 while(*datadres==0 && count<3)
  {
   datadres++;
   count++;
  }
 lastdia=atoi(datadres);
 encount++;
 if(*datadres ==0)
   lastdia=0;
 datadres +=5;
}
```

```c
/* CALCULATES THE FLUTE HELIX ANGLE */

/* Actually, the helix angle tangent is calculated */ helix()
{
 extern int maxdia,encount,minloc,shank,feature,mcount;
 extern float tangent;
 float x,y;

x=314*maxdia;              /* helix angle = (pi times the drill */
 y=3*((encount-1)-minloc);  /* diameter) divided by 2 times the  */
 tangent=(x/y)/20000;       /* distance between consecutive flute */
                            /* valleys.                           */
 if(tangent<.28 || tangent>1.2)         /* 15.6 and 50.2 degrees */
   feature=0;
 else if(tangent<.4)                    /* 21.8 degrees */
 {
  if(maxdia>3800 || maxdia < 1200)
    feature=5;                                    /* medium spiral */
  else
    feature=3;                                    /* lo-spiral */
 }
 else if(tangent>.64)                   /* 32.6 degrees */
 {
  if(shank==2 || shank==3 || shank==8 || shank==10)
    feature=5;                                    /* medium spiral */
  else if((shank==1)&&((maxdia>3800 && mcount>8)||(maxdia<=3800 && mcount>6)))
    feature=6;                                    /* Hi-spiral stoveburner */
  else
    feature=4;                                    /* hi-spiral */
 }
 else if(tangent<.46 && (shank==1 || shank==3) && maxdia>2700)
   feature=3;                                     /* lo-spiral */
 else if(maxdia<1620 && tangent>.577 && shank !=10 && feature !=2
&& feature !=10)
   feature=4;    /* Standard small dia. drills should never have */ else           /* a helix angle over 30 degrees.                */
 {
  if(feature != 2)                       /* If its no a stoveburner */
    feature=5;                           /* medium spiral */
 }
}

/* PUTS KEY VARIABLES INTO BATTERY BACKED RAM

The variable names and values start at address FC0900 while
   the drill diameter data starts at address FC1000. The
   variables are stored for two purposes. First, to help when
   determining why a particular drill was misidentified, and
   second, to save the identity of the last drill analyzed
   before system shutdown. When the system boots, the O.K. to
   index signal is checked in the function main(). If it is
   active, the code for the last drill is sent to the Carousel
   computer.
*/ include <stdio.h> idbuf()
{
 extern char *driltype, *size;
```

```
extern int shank, feature, lencode, encount, flutestart;
extern int maxdia, maxloc, backtaper,marsearch;
extern int mar1count, mar2count, minloc;
extern float tangent,length;
int x;
char *ram;

ram=0xfc0900;
for(x=0; x<0xff; x++)
  {
   *ram++=0;
  } sprintf(0xfc0900,"driltype=%s",driltype);
sprintf(0xfc0910,"size=%s",size);
sprintf(0xfc0920,"shank=%d",shank);
sprintf(0xfc0930,"feature=%d",feature);
sprintf(0xfc0940,"lencode=%d",lencode);
sprintf(0xfc0950,"encount=%d",encount);
sprintf(0xfc0960,"maxdia=%d",maxdia);
sprintf(0xfc0970,"maxloc=%d",maxloc);
sprintf(0xfc0980,"flutestart=%d",flutestart);
sprintf(0xfc0990,"backtaper=%d",backtaper);
sprintf(0xfc09a0,"tangent=%5.4f",tangent);
sprintf(0xfc09b0,"length=%4.2f",length);
sprintf(0xfc09c0,"marsearch=%d",marsearch);
sprintf(0xfc09d0,"mar1count=%d",mar1count);
sprintf(0xfc09e0,"mar2count=%d",mar2count);
sprintf(0xfc09f0,"minloc=%d",minloc);
}

/* MOVES THE STROKER and STARTS THE RECOGNITION ANALYSIS

During data analysis, the RECOGNIZE process priority is changed
   from 128 to 1024. The machine cycle time is improved by this.
   A dedicated signal is used to tell the BAM servo controller to
   start the Stroker moving down, however, the same signal which
   takes the Lasermike start input high also signals the BAM to
   return the Stroker to its home position. If there is a drill at
   gate 5 when the decision to release the stroker drill has been
   made, it is released to the decelerator gate to help reduce
   average cycle time. The flag G5DRILL is set to a value of 2 to
   tell the stroker_load function that this has been done. It is
   not set to zero so that the orient process will not try to place
   another drill at gate 5 yet.

The 68008 data acquisition processor sets a flag "A00A"(hex) at
   address FC1F32 and FC1F33 when it is asleep and waiting for new
   data from the laser. To avoid overwriting good data in the
   mailbox memory (caused by false triggering of the interrupt
   line), a transfer of data from the 68008 on board ram to the
   mailbox will be made only if the flag has been cleared. The flag
   is cleared here just before the 68008 is told that the latest
   drill has pasted through the laser beam. The 68008 also sets
   data byte count at address FC1F20. (The laser sends five bytes
   per scan.) Also, 0E(hex) is set at address FC1F40 by the 68008
   when it has transferred all data to the mailbox. The byte count
   and transfer flag are cleared after the "data done" signal is
   received.
*/ include <stdio.h>
include "sorter.h"
#include "message.h"
#define  mem(adr) ((unsigned char *)(adr))
#define  mem1(adr) ((unsigned int *) (adr))
```

```c
#define timer 5                                    /* Time in seconds */
extern IOD *io;

identify(message,fp,bport)
char *message;
FILE *fp,*bport;
{
  extern int recpid;                               /* Recognition process I.D. */
  int _sec,_tmcount,flag=0;
  int ssf,x=0,fl=0;
  char y[10];                 /* Array for reply from Carousel computer */ quitcheck(message,fp);
  pioch3(io->op4 != 0x08);     /* Tell 68008 to reset data pointer */
  pioch3(io->op4 &= ~0x08);    /* Take 68008 reset signal high */
  x=chkbam(message,fp,bport);                   /* Check for servo error */
  _tmcount=0;
  initimecount(&_sec);
  while(!(pip1() & 0x80)!! x)/* Servo not ready or error detected */
    {
      quitcheck(message,fp);
      timecount(&_tmcount,&_sec);
      if(_tmcount>=timer && flag==0 && x==0)
        {
          quitcheck(message,fp);
          transmit("Waiting for BAM ready signal",fp);
          flag=1;
          tsleep(5);
          receive(y,fp,&fl,0);
        }
      tsleep(2);
    }
  flag=0;
  ssf=*mem(0xFC0508);                         /* Get shank status of drill */
  pioch1(io->op2 != 0x10); /* Turn on air jet to clear laser slot */
  tsleep(5);        /* 50 msec. debounce time for drill at stroker */
  pioch1(io->op2 &= ~0x10);                    /* Turn off air jet */
  if(ssf==2)                      /* If it's a straight shank jobber */
    pioch1(io->op2 != 0x80);    /* Set Scan Mark circuit for .006" */
  pioch3(io->op4 &= ~0x20);       /* Take lasermike STOP input high */
  pioch2(io->op3 != 0x80);        /* Take lasermike START input low */
  pioch3(io->op4 != 0x80);        /* Tell BAM to start down stroke */
  _tmcount=0;
  initimecount(&_sec);
  while(pip1() & 0x01)                     /* Wait until drill clears PS9 */
    {
      quitcheck(message,fp);
      if(x==0)
        x=chkbam(message,fp,bport);         /* Check for servo error */
      timecount(&_tmcount,&_sec);
      if(_tmcount>=timer && flag==0 && x==0)
        {
          quitcheck(message,fp);
          transmit("Waiting for drill to clear PS9",fp);
          flag=1;
          tsleep(5);
          receive(y,fp,&fl,0);
        }
      tsleep(2);
    }
  flag=0;
  pioch1(io->op2 &= ~0x80); /* Set Scan Mark circuit back to .03" */
  tsleep(10); /* Small short QC or THD drills may leave PS9 early */
  for(x=0; x<15; x++)              /* Allow the drill to pass the slot */
    {
      if(pip3() & 0x80)                            /* If segment error */
        break;
      else
        tsleep(3);
```

```c
)
   piochl3(io->op4 |= 0x20);       /* Take lasermike STOP input low    */
   *mem(0xfc1f32)=0; /* Clear ready for new data flag set by 68000 */
   *mem(0xfc1f33)=0;
   piochl3(io->op4 |= 0x08);       /* Tell 68008 that drill is finished */
   _tmcount=0;                     /* Check if Carousel is ready */
   initimecount(&_sec);
   while((!(pip2() & 0x40))|| pip2() & 0x08) /* O.K. to load drill */
   {                               /* in Carousel tube and transmit code? */
      quitcheck(message,fp);
      timecount(&_tmcount,&_sec);
      if(_tmcount>=timer && flag==0)
      {
         quitcheck(message,fp);
         transmit("Waiting on the Carousel",fp);
         flag=1;
         tsleep(5);
         receive(y,fp,&fl,0);
      }
   }
   flag=0;
   piochl1(io->op2 |= 0x04);                          /* Open Gate 6 */
   if((pip2() & 0x04) && *(message+G5DRILL)==1)/* Drill at Gate 5? */
   {
      piochl1(io->op2 |= 0x42);     /* Close decel gate & open Gate 5 */
      *(message+G5DRILL)=2;         /* Indicates drill released here */
   }
   tsleep(3);                       /* Allow time for the gate to raise */
   piochl2(io->op3 &= ~0x80);       /* Take lasermike START input high */
   piochl3(io->op4 &= ~0x80);       /* Reset BEM start signal */
   _tmcount=0;
   initimecount(&_sec);
   while(!(pip3() & 0x80))          /* Segment error signal indicate */
   {                                /* something is still in the beam? */
      quitcheck(message,fp);
      timecount(&_tmcount,&_sec);
      piochl1(io->op2 |=0x10);                       /* Turn on air jet */
      if(_tmcount>=timer && flag==0)
      {
         quitcheck(message,fp);
         transmit("Clearing laser slot 2",fp);
         flag=1;
         tsleep(5);
         receive(y,fp,&fl,0);
      }
   }
   piochl1(io->op2 &= ~0x10);                        /* Turn off air jet */
   flag=0;
   _tmcount=0;
   initimecount(&_sec);
   do{
      quitcheck(message,fp);
      timecount(&_tmcount,&_sec);
      if(_tmcount>=timer && flag==0)
      {
         quitcheck(message,fp);
         transmit("Waiting on 68008 recognition data transfer",fp);
         flag=1;
         tsleep(5);
         receive(y,fp,&fl,0);
      }
      tsleep(2);
      piochl3(io->op4 &= ~0x08);   /* Bring drill finished sig. high */
   } while(!(pip2() & 0x02));      /* Wait for data done flag */
   *mem1(0xfc1f20)=0;              /* Clear the data count set by 68008 */
   *mem(0xfc1f40)=0;    /* Clear data transfered flag set by 68008 */
   flag=0;
```

```c
    setpr(recpid,1024);        /* Increase Recognition task Priority */
    analyze(message,fp,bport);              /* Identify the drill */
    setpr(recpid,128);  /* Set priority back to it's original value */
    tsleep(5);                          /* Give Gate 6 time to close */
    _tmcount=0;
    initimecount(&_sec);
    while(pipl() & 0x01)            /* Try releasing the drill     */
     {                              /* until it clears sensor PS9 */
      quitcheck(message,fp);
      timecount(&_tmcount,&_sec);
      piochl(io->op2 != 0x04);                      /* Open Gate 6 */
      sleep(1);                                     /* Wait 1 second */
      piochl(io->op2 &= ~0x04);                     /* Close Gate 6 */
      sleep(1);
      if(_tmcount>=timer && flag==0)
       {
        quitcheck(message,fp);
        transmit("Waiting for drill to clear PS9",fp);
        flag=1;
        tsleep(5);
        receive(y,fp,&fl,0);
       }
     }
    flag=0;
    }

/* TRANSMITS THE DRILL IDENTIFICATION AND ERROR MESSAGES TO THE
   CAROUSEL COMPUTER.

The Recognition task priority was set high in the identify
   function so that the analysis would not be interrupted. Ordin-
   arily the task priority is returned to its original value in the
   same function when the analysis and code transmittal is finished.
   However, should any error detection loop in this (idout) function
   time out, the priority is returned to its original value. This is
   to prevent any solenoid controlled by the Orient task from
   remaining 'on' and overheating.
*/ include <stdio.h>
include "message.h"
#include "sorter.h"
#define mem(adr) ((unsigned char *)(adr))
#define mem2(adr) ((unsigned int *)(adr))
extern IOD *io;

idout(message,fp,bport)
char *message;
FILE *fp,*bport;
 {
   char cuttercode[5];
   char y[150];
   char ssf,dflg;
   extern char *driltype,*size;
   extern int recpid;                   /* Recognition process I.D. */
   extern int maxdia, shank, encount, minloc;
   int _m,_n,sl,x=0;
   int _tmcount,_sec;
   int flag=0;
   int fl=0;
   static int flag00,flag7B,flag7C;

sl=strlen(driltype);
   if(sl >2)
     driltype="00";
   sl=strlen(size);
   if(sl >2)
     size="00";
   if(strcmp(driltype,"7B")==0)        /* Rejected for overall length */
    {
```

```c
    if(flag7B==0)              /* There are two pans in the Carousel  */
     {                         /* for length rejects. The drills      */
      size="00";               /* are placed in the pans alternately. */
      flag7B=1;                /* The same is true for Q.C. adapter   */
     }                         /* rejects and unidentified rejects.   */
    else                       /* A drill can fail the length test    */
     {                         /* for many reasons such as short      */
      size="01";               /* flutes, a missing adapter, or be-   */
      flag7B=0;                /* cause an adapter was put on the     */
     }                         /* drill without first removing the    */
   }                           /* appropriate amount of the shank.    */
  else if(strcmp(driltype,"7C")==0)          /* Bad quick change */
   {                                          /* adapter reject.  */
    if(flag7C==0)
     {
      size="00";
      flag7C=1;
     }
    else
     {
      size="01";
      flag7C=0;
     }
   }
  else if(strcmp(driltype,"7A")==0)          /* A B5 drill ? */
    size="00";
  if(strcmp(driltype,"00")==0 || strcmp(size,"00")==0 || (shank==6 &
& encount>64 && minloc>(encount-12)))
   {
    reamer();                  /* See if this might be a reamer */
    if(strcmp(driltype,"7A")!=0 && strcmp(driltype,"7B")!=0 && strc
mp(driltype ,"7C")!=0 && strcmp(driltype,"AB")!=0 && strcmp(driltype
,"7D")!=0)
     {
      driltype="00";
      if(flag00==0)
       {
        size="00";
        flag00=1;
       }
      else
       {
        size="01";
        flag00=0;
       }
      *(message+REJCOUNT) +=1;
      if(maxdia==9999)
        *(message+DIRTCOUNT) +=1;
      else if(maxdia <900 || maxdia >5100)
        *(message+SIZECOUNT) +=1;
     }
   }
  else
    *(message+REJCOUNT)=*(message+DIRTCOUNT)=*(message+SIZECOUNT)=0;
  if(maxdia >=4560 && maxdia <4600)
   {
    if(strcmp(driltype,"41")==0 || strcmp(driltype,"51")==0)
     {
      driltype="FF";  /* B1-2707-4567, an oddball diameter tanged */
      size="F2";      /* drill used by Boeing of Portland.        */
     }
   }
  idbuf();           /* Put key variable values in battery backed ram */
  strcpy(cuttercode,driltype);
  strcat(cuttercode,size);

_tmcount=0;
  initimecount(&_sec);
  while(!(pip1() & 0x08))      /* Wait for Stroker to return home */
```

```c
{
  quitcheck(message,fp);
  if(x==0)
    x=chkbam(message,fp,bport);      /* Check for servo error */
  timecount(&_tmcount,&_sec);
  if(_tmcount>=5 && flag==0 && x==0)
    {
      setpr(recpid,128);
      transmit("Waiting for Stroker to return home",fp);
      flag=1;
      tsleep(5);
      receive(y,fp,&fl,0);
    }
  tsleep(2);
}
flag=0;
if(encount > 598 && maxdia == 0)
  {
    quitcheck(message,fp);
    if(flag==0)
      {
        transmit(":Bad or no data from Laser No.2",fp);
        flag=1;
        tsleep(5);
        receive(y,fp,&fl,0);
      }
  }
if(encount < 52)
  tsleep(25);   /* Delay so rejects and very short drills don't */
                /* get trapped by the Stroker gate (Gate 6)     */
                /* when it closes.                              */ transmit(cuttercode,fp);
piochl(io->op2 &= ~0x04);                  /* Close Gate 6 */
y[0]=0;
receive(y,fp,&fl,0);
}
/* FINDS THE END OF THE DRILL AND CALCULATES OVERALL LENGTH AND
   BACKTAPER.

To minimize the effects of dirt on the margins, a sort of three
   diameter shift register is used. The three diameters making up
   this register are tempdia1, tempdia2, and lastdia. The maximum
   diameter (maxdia) and it's location (maxloc) will be updated if
   at any time two out of the three diameter values are within
   .0003 inches of each other and equal to or greater than the
   current maximum diameter value. The smaller of the two values
   is used to update the maximum diameter to further reduce the
   possibility of oversizing the drill due to dirt on the margins.
   When the end of the drill is found, backtaper and overall
   length are calculated.
*/ define incdist .03    /* Distance between diameter measurements */ lencalc()
{
 extern int lastdia,maxdia,maxloc,margdia4,m4loc;
 extern int feature,tangent,encount,backtaper;
 extern float length;
 int tempdia1,tempdia2;

if(lastdia > 200)
   {
     tempdia1=lastdia;
     getdia2();
     tempdia2=lastdia;
```

```
   while(lastdia > 200)
     {
      getdia2();
      if(tempdia1>=maxdia || tempdia2>=maxdia || lastdia>=maxdia)
        {
         if(lastdia>=(tempdia1-3) && lastdia<=(tempdia1+3))
           {
            if(lastdia<(maxdia+30)&&lastdia>=maxdia&&lastdia<=tempdia1)
              {
               maxdia=lastdia;
               maxloc=encount;
              }
            else if(tempdia1<(maxdia+30) && tempdia1>=maxdia)
              {
               maxdia=tempdia1;
               maxloc=encount-2;
              }
           }
         if(lastdia>=(tempdia2-3) && lastdia<=(tempdia2+3))
           {
            if(lastdia<(maxdia+30)&&lastdia>=maxdia&&lastdia<=tempdia2)
              {
               maxdia=lastdia;
               maxloc=encount;
              }
            else if(tempdia2<(maxdia+30) && tempdia2>=maxdia)
              {
               maxdia=tempdia2;
               maxloc=encount-1;
              }
           }
         if(tempdia1>=(tempdia2-3) && tempdia1<=(tempdia2+3))
           {
            if(tempdia1<(maxdia+30)&&tempdia1>=maxdia&&tempdia1<=tempdia2
              {
               maxdia=tempdia1;
               maxloc=encount-2;
              }
            else if(tempdia2<(maxdia+30) && tempdia2>=maxdia)
              {
               maxdia=tempdia2;
               maxloc=encount-1;
              }
           }
        }
      tempdia1=tempdia2;
      tempdia2=lastdia;
     }
    if(m4loc >= 10 && maxloc - m4loc >15)
      backtaper=(maxdia-margdia4)*100/((maxloc-m4loc)*(incdist*100));
   }
  length=encount * incdist;
  if(length >10.0)         /* Some large diameter 12 inchers may get */
   {                       /* feature set incorrectly in the helix routine */
    if(feature==3 && tangent >.4 && maxdia >2700)
      feature=5;
   }
 }

/* GENERATES THE DRILL LENGTH CODE

Determines the length category for a drill based mainly on it's
   shank and feature types and it's overall length. The location of
``` the start of the flutes is used in some cases to help differentiate between jobber and six inch lengths. Also, in some cases, once the basic length category is determined, a further check of overall length is made to eliminate drills which may have an unacceptable flute length. This test is made based strictly on the NAS 907 flute length specification for new drills. The drill type designations given here are in no way related to those given in NAS 907.
*/

```c
lentable()
{
 extern int shank,feature,flutestart,maxdia,lencode;
 extern float length,tangent;
 float minlen,maxlen;

if(shank==4 && feature==5)              /* CONSTANT WEB QUICK CHANGE */
 {                                       /* TYPE T */
  if(length>1.50 && length<4.42)
  {
   if(maxdia < 1570)
   {
    maxlen=3.51;            /* Per drawing ST10-907-K, as of 9/28/88 */
    minlen=(.00086 * maxdia)+.96;         /* 40% of the flute used */
   }
   else if(maxdia < 2000)
   {
    maxlen=(.00132 * maxdia)+1.4;
    minlen=(.00086 * maxdia)+.96;         /* 40% of the flute used */
   }
   else
   {
    maxlen=(.00078 * maxdia)+2.3;
    minlen=(.00052 * maxdia)+1.58;        /* 40% of the flute used */
   }
   if(length <= minlen || length > maxlen)
    lencode=15;
   else
    lencode=1;                                        /* JOBBER */
  }
  else if(length>=4.42 && length<7.2)
  {
   if(maxdia < 2000)
    minlen=5.87 - (.00045 * maxdia);      /* 40% of the flute used */
   else
    minlen=5.6 - (.00029 * maxdia);       /* 40% of the flute used */
   if(length <= minlen || length > 6.3)
    lencode=15;
   else
    lencode=11;                                       /* 6 INCH */
  }
  else if(length>10.00 && length<13.00)
  {
   if(maxdia < 2000)
    minlen=11.9 - (.00045 * maxdia);      /* 40% Of the flute used */
   else
    minlen=11.75 - (.00029 * maxdia);     /* 40% of the flute used */
   if(length <= minlen)
    lencode=15;
   else
    lencode=12;                                       /* 12 INCH */
  }
 }
 else if(shank==2 && feature==5)         /* STANDARD QUICK CHANGE */
 {                                       /* TYPE B */
```

```c
if(length>1.80 && length<5.00)
{
 if(maxdia < 1570)
 {
  maxlen=3.51;              /* Per drawing ST10-907-K, as of 9/28/88 */
  minlen=(.001 * maxdia)+1.02;           /* 25% of the flute used */
 }
 else if(maxdia < 2000)
 {
  maxlen=(.00132 * maxdia)+1.4;
  minlen=(.001 * maxdia)+1.02;           /* 25% of the flute used */
 }
 else
 {
  maxlen=(.00078 * maxdia)+2.3;
  minlen=(.00062 * maxdia)+1.75;         /* 25% of the flute used */
 }
 if(length <= minlen || length > maxlen)
  lencode=15;
 else
  lencode=1;                             /* JOBBER */
}
else if(length>=5.00 && length<7.2)
{
 if(maxdia < 2000)
  minlen=5.9 - (.00028 * maxdia);        /* 25% of the flute used */
 else
  minlen=5.75 - (.00018 * maxdia);       /* 25% of the flute used */
 if(length <= minlen || length > 6.3)
  lencode=15;
 else
  lencode=11;                            /* 6 INCH */
}
else if(length>10.00 && length<13.00)
{
 if(maxdia < 2000)
  minlen=11.9 - (.00028 * maxdia);       /* 25% Of the flute used */
 else
  minlen=11.75 - (.00018 * maxdia);      /* 25% of the flute used */
 if(length <= minlen)
  lencode=15;
  else
   lencode=12;                           /* 12 INCH */
 }
}
else if(shank==2 && feature==1)    /* DOUBLE MARGIN QUICK CHANGE */
{                                  /* TYPE P */
 if(length>=4.90 && length<7.2 && flutestart>90)
 {
  if(maxdia < 2000)
   minlen=5.9 - (.00028 * maxdia);       /* 25% of the flute used */
  else
   minlen=5.75 - (.00018 * maxdia);      /* 25% of the flute used */
  if(length <=minlen || length >6.3 ||(maxdia<3110 && maxdia>=3050))
   lencode=15;
  else
   lencode=11;                           /* 6 INCH */
 }
 else if(length>2.50 && length<4.90)
 {
  if(maxdia < 2000)
  {
   maxlen=(.00132 * maxdia)+1.4;
   minlen=(.001 * maxdia)+1.02;          /* 25% of the flute used */
  }
```

```c
  else
  {
   maxlen=(.00078 * maxdia)+2.3;
   minlen=(.00062 * maxdia)+1.75;          /* 25% of the flute used */
  }
  if(length <= minlen || length > maxlen)
   lencode=15;
  else                                     .
   lencode=1;                              /* JOBBER */
 }
}
else if((shank==1 || shank==10) && feature==5)   /* STRAIGHT SHANK */
                                                 /* TYPES A, E, & M */
{
 if(maxdia>1855 && maxdia<1880 && length>4.15 && length<5.9 && flute
start>50 && flutestart<85 && tangent>.51 && tangent<.62)
      lencode=13;         /* Looks like a 3/16 cobalt taper length drill */
  else if(maxdia>2000 && maxdia<2700 && length>5.75 && length<6.3 &&
flutestart>70 && flutestart<105 && tangent<.43)
  {
   feature=3;
   lencode=13;           /* Looks like a carbide tip taper length drill */
  }
  else if(length>4.9 && length<6.30 && maxdia<4100 && flutestart>82)
  {
   if(maxdia < 2000)
    minlen=5.9 - (.00028 * maxdia);         /* 25% of the flute used */
   else
    minlen=5.75 -(.00018 * maxdia);         /* 25% of the flute used */
   if(length <= minlen)
    lencode=15;
   else
    lencode=11;                             /* 6 INCH */
  }
  else if(length>10.00 && length<13.00)
  {
   if(maxdia < 2000)
    minlen=11.9 - (.00028 * maxdia);        /* 25% of the flute used */
   else
    minlen=11.75 - (.00018 * maxdia);       /* 25% of the flute used */
   if(length <= minlen)
    lencode=15;
   else
    lencode=12;                             /* 12 INCH */
  }
  else if(length>3.5 && length<4.25 && maxdia<1665 && tangent>.55)
  {
   feature=4;
   lencode=10;                              /* 4 inch hi-spiral */
  }
  else if(length>1.75 && length<6.30)
  {
   if(maxdia < 2000)
   {
    maxlen=(.00132 * maxdia)+1.4;
    minlen=(.001 * maxdia)+1.02;            /* 25% of the flute used */
   }
   else
   {
    maxlen=(.00078 * maxdia)+2.35;
    minlen=(.00062 * maxdia)+1.75;          /* 25% of the flute used */
   }
   if(length <= minlen || length > maxlen)
    lencode=15;
```

```c
    else
      lencode=1;                                                /* JOBBER */
  }
  else if(length>6.30 && length<8.00 && maxdia>2990)
    lencode=13;                                                 /* TAPER LENGTH */
}
else if(shank==6 && feature==5)             /* THREADED SHANK w/hex */
{                                           /* TYPE D */
  if(length>=1.12 && length<1.44)
    lencode=4;                                                  /* 1 INCH */
  else if(length>=1.77 && length<2.58)
    lencode=6;                                                  /* 2 1/8 INCH */
  else if(length>=2.76 && length<3.43)
    lencode=8;
  else if(length>=3.48 && length<3.93)                          /* 3 INCH */
    lencode=9;
  else if(length>=4.05 && length<4.47)                          /* 3 1/2 INCH */
    lencode=10;                                                 /* 4 INCH */
  else
    lencode=15; /* Probably has short flutes */
}
else if(shank==7 && feature==5)             /* THREADED SHANK no hex */
{                                           /* TYPE D */
  if(length>.50 && length<.80)
    lencode=2;                                                  /* 1/2 INCH */
  else if(length>=.80 && length<1.05)
    lencode=3;                                                  /* 3/4 INCH */
  else if(length>=1.05 && length<1.36)
    lencode=4;                                                  /* 1 INCH */
}
else if(shank==5 && feature==5)     /* STANDARD SHORT QUICK CHANGE */
{                                   /* TYPE C */
  if(length>.80 && length<1.20)
    lencode=4;                                                  /* 1 INCH */
  else if(length>=1.50 && length<2.25)
    lencode=6;                                                  /* 2 1/8 INCH */
  else if(length>=2.50 && length<3.20)
    lencode=8;                                                  /* 3 INCH */
  else if(length>=3.50 && length<4.30)
    lencode=10;                                                 /* 4 INCH */
  else
    lencode=15; /* Probably has short flutes */
}
else if(shank==5 && feature==1)/* DOUBLE MARGIN SHORT QUICK CHANGE*/
                                /* TYPE Q */
  if(length>.50 && length<1.25)
    lencode=4;                                                  /* 1 INCH */
  else if(length>=1.25 && length<1.70)
    lencode=5;                                                  /* 1 1/2 INCH */
  else if(length>1.85 && length<2.45)
    lencode=7;                                                  /* 2 1/4 INCH */
  else if(length>2.65 && length<3.38)
    lencode=8;                                                  /* 3 INCH */
}
else if(shank==1 && feature==1)     /* DOUBLE MARGIN STRAIGHT SHANK */
{                                   /* TYPE N */
  if(length>2.50 && length<4.90)
  {
    if(maxdia < 2000)
    {
      maxlen=(.00132 * maxdia)+1.4;
      minlen=(.001 * maxdia)+1.02;                              /* 25% of the flute used */
    }
```

```c
    else
    {
      maxlen=(.00078 * maxdia)+2.3;
      minlen=(.00062 * maxdia)+1.75;        /* 25% of the flute used */
    }
    if(length <= minlen || length > maxlen)
      lencode=15;
    else
      lencode=1;                                                    /* JOBBER */
  }
  else if(length>=4.90 && length<6.30)
  {
    if(maxdia < 2000)
      minlen=5.9 - (.00028 * maxdia);      /* 25% of the flute used */
    else
      minlen=5.75 - (.00018 * maxdia);     /* 25% of the flute used */
    if(length <= minlen)
      lencode=15;
    else
      lencode=11;                                                   /* 6 INCH */
  }
}
else if(shank==3 && feature==5)      /* COBALT QUICK CHANGE -TYPE F */
{
  if(maxdia < 2000)
    minlen=(.001 * maxdia)+1.02;         /* 25% of the flute used */
  else
    minlen=(.00062 * maxdia)+1.75;       /* 25% of the flute used */
  if(length <= minlen)
    lencode=15;
  else if(length > 5.25 && length < 6.3)
  {
    shank=4;    /* Maybe we missed an adapter groove. Take a chance. */
    lencode=11;
  }
  else
    lencode=1;                                                    /* JOBBER */
}
else if(shank==1 && feature==3)      /* CARBIDE TIP STAIGHT SHANK */
{                                    /* TYPE G */
  if(length>1.75 && length<5.25)
    lencode=1;                                                    /* JOBBER */
  else if(length>5.50 && length<6.30 && maxdia<1700)
    lencode=11;                                                   /* 6 INCH */
  else if(length>=5.75 && length<8.0 && maxdia>2000 && tangent<=.425)
    lencode=13;                                              /* TAPER LENGTH */
  else if(length>=5.75 && length<8.0 && maxdia>2990 && tangent>.425)
  {
    lencode=13;
    feature=5;
  }
}
else if((shank==2 || shank==3) && feature==3) /* CARBIDE TIP Q.C. */
{                                    /* TYPE H */
  if(length>1.80 && length<=5.50)
    lencode=1;                                                    /* JOBBER */
  else if(length>5.50 && length<6.30)
    lencode=11;                                                   /* 6 INCH */
}
else if(shank==1 && feature==2)      /* STOVEBURNER STRAIGHT SHANK */
{                                    /* TYPE I */
  if(length>1.50 && length<4.26)
  {
    if(maxdia < 2000)
```

```
  minlen=(.00086 * maxdia)+.96;           /* 40% of the flute used *
 else
  minlen=(.00052 * maxdia)+1.58;          /* 40% of the flute used *
 if(length <= minlen)
  lencode=15;
 else
    lencode=1;                                                           /* JOBBER */
 }
 else if(length>=4.26 && length<6.30)
 {
  if(maxdia < 2000)
   minlen=5.87 - (.00045 * maxdia);       /* 40% of the flute used */
  else
   minlen=5.6 - (.00029 *maxdia);         /* 40% of the flute used */
  if(length <= minlen)
   lencode=15;
  else if(flutestart < 100)
   lencode=14;                                                           /* BS or "ST" drill */
  else
   lencode=11;                                                           /* 6 INCH */
 }
)
else if(shank==3 && feature==2)           /* STOVEBURNER QUICK CHANGE */
{                                         /* TYPE J */
 if(length>1.50 && length<4.26)
 {
  if(maxdia < 1570)
  {
   maxlen=3.51;             /* Per drawing ST10-907-K, as of 9/28/88 */
   minlen=(.00086 * maxdia)+.96;          /* 40% of the flute used *
  }
  else if(maxdia < 2000)
  {
   maxlen=(.00132 * maxdia)+1.4;
   minlen=(.00086 * maxdia)+.96;          /* 40% of the flute used */
  }
  else
  {
   maxlen=(.00078 * maxdia)+2.3;
   minlen=(.00052 * maxdia)+1.58;         /* 40% of the flute used */
  }
  if(length <= minlen || length > maxlen)
    lencode=15;
  else
    lencode=1;                                                           /* JOBBER */
 }
 else if(length>=4.26 && length<7.2)
 {
  if(maxdia < 2000)
   minlen=5.87 - (.00045 * maxdia);       /* 40% of the flute used */
  else
   minlen=5.6 - (.00029 * maxdia);        /* 40% of the flute used */
  if(length <= minlen || length > 6.3)
    lencode=15;
  else
    lencode=11;                                                          /* 6 INCH */
 }
}
else if(shank==1 && feature==4) /* HI-SPIRAL & NUCON STRAIGHT SHANK*/
{                               /* TYPES K & L */
 if(length>1.50 && length<2.70)

lencode=13;                                                          /* NUCON *
  else if(length>3.5 && length<4.25 && maxdia<1665)                      /* 4 INCH *
```

```
  lencode=10;
 else if(length>=2.70 && length<4.80 && maxdia<=2700)
 {
  if(maxdia < 2000)
  {
   maxlen=(.00132 * maxdia)+1.4;
   minlen=(.001 * maxdia)+1.02;           /* 25% of the flute used *
  }
  else
  {
   maxlen=(.00078 * maxdia)+2.3;
   minlen=(.00062 * maxdia)+1.75;         /* 25% of the flute used *
  }
  if(length <= minlen || length > maxlen)
    lencode=15;
  else
    lencode=1;                            /* JOBBER *
 }
 else if(length>=2.70 && length<4.80 && maxdia>2700)
    lencode=0;                            /* Who knows? May be an "ST" drill. *
 else if(length>=4.80 && length<8.0)
 {
   if(maxdia<2700 or flutestart>130 or length<6.10.
   {
    if(maxdia < 2000)
      minlen=5.9 - (.00028 * maxdia);     /* 25% of the flute used *.
    else
      minlen=5.75 - (.00018 * maxdia);    /* 25% of the flute used *.
    if(length <= minlen)
      lencode=15;
    else
      lencode=11;                         /* 6 INCH *,
   }
   else if(maxdia>1700&&flutestart>45&&flutestart<110&&tangent>.66)
     pf_drill();                          /* PARABOLIC FLUTE TAPER LENGTH *,
 }
 }
 else
    lencode=0;
}
/* CHECKS FOR LONG QUICK CHANGE ADAPTER The array dia[67] contains the decimal shank diameter values.
    Multiplying the array tag number times .03 inches will give the
    distance, from the end of the drill, at which the diameter was
    taken. Dia[41] through dia[55] are checked for two consecutive
    diameter values within .0004 inches of each other. If found, the
    average of the two is used for the starting value of the maximum
    diameter, maxdia. Actually, maxdia will be set to the largest
    average found. If this test fails, maxdia will be set to the
    largest diameter found. This procedure is required because the
    drill flutes may be present just beyond the adapter. Next, all
    consecutive diameters within .0004 inches of each other are
    averaged until the first flute valley is found. Then, if certain
    criteria is met, maxdia will be updated to the new average
    diameter. Also, a test for a cracked or tapered adapter is
    performed here. If the adapter is cracked or if the adapter is
    pressed on the drill after final grind, the drill end of the
    adapter will be larger than the butt end of the adapter.
*/ define mem(adr) ((unsigned char *)(adr))

lengQC1)
{
```

```
extern int maxdia,maxloc,mindia,minloc,shank,encount,lastdia;
extern char *datadres;
extern int dia[67],offset;
int average=0;
int count=1;
int adapter1=0;          /* diameter of the butt end of the adapter */
int adapter2=0;          /* diameter of the drill end of the adapter */
int adapdiff=0;   /* drill end diameter minus the butt end diameter */
int tempdia,ssf,x,y;

/* The nominal adapter diameter is .301 to .302 inches. A + or -
   .003 inch tolerance is allowed here. */ y=0;
for(x=28; x<35; x++)
  {
   if(dia[x] > 2980 && dia[x] < 3050)
     y++;
  }
if(y>1&&((dia[40]<2980!!dia[40]>3050)!!(dia[44]<2980!!dia[44]>3050)))
   {
    if(dia[40]<500 !! dia[40]>3300)       /* No adapted drill outside */
      {                                   /* these size limits.      */
       shank=15;                                              /* Reject */
       return;
      }
    for(x=41; x<56; x++)
      {
       if(dia[x]>(dia[x+1]-4) && dia[x]<(dia[x+1]+4))
         {
          average=(dia[x] + dia[x+1])/2;
          if(average > maxdia)
            {
             maxdia=average;
             maxloc=x;
             encount=x;
            }
         }
      }
    if(maxdia < 300)         /* That is, maxdia has not been set yet */
      {
       y=0;   /* Indicates the largest diameter was used for maxdia */
       maxdia=dia[41];
       for(x=41; x<56; x++)
         {
          if(maxdia < dia[x])
            {
             maxdia=dia[x];
             maxloc=x;
             encount=x;
            }
         }
      }
   }
lastdia=maxdia;
average=maxdia;
tempdia=maxdia;
datadres=0xFC1000 + (encount *5) + offset;
ssf=*mem(0xFC0508);
if(ssf==2)    /* Mistaken for a straight shank jobber by laser !? */
  datadres+=65;       /* If so, offset data pointer to compensate */

/* Look for first flute valley */ while(lastdia>(.88 * maxdia) && lastdia>200)
  {
   getdia2();
   if(lastdia>(tempdia-5) && lastdia<(tempdia+5))
```

```c
      {
        average=average + lastdia;
        count++;
      }
      tempdia=lastdia;
    }
  if(count >1)
    {
      average=average/count;
      if(y==0 && average > (.95 * maxdia))
        {
          maxdia=average;
          maxloc=encount-2;
        }
      else if(count >10 && average > (.95 * maxdia))
        {
          maxdia=average;
          maxloc=encount-2;
        }
    }
  if(lastdia<200)                              /* Diameter below limit? */
    {
      shank=15;                                                /* reject */
      minloc=encount;   /* This will help determine if it is a reamer */
      return;
    }
  mindia=lastdia;
  minloc=encount;

/* The following is done primarily to catch cracked adapters, but also
   finds out of tolerance adapters. It is designed to reduce the
   possibility of rejecting good drills due to dirt particles on the
   surface of the drills (we're talkin' about small stuff here). The
   diameter limits set here are shifted to favor the low side because
   the adapters seem to be biased in that direction and too many would
   be rejected. Actual diameters obtained from the Lasermike should
   always be verified running precision pins thru the sorter. Use the
   debug command. Diameter data starts at FC1000.
*/
  for(x=35; x>32; x--)       /* Get diameter of drill end of adapter */
    {
      if((dia[x]>(dia[x-1]-4))&&(dia[x]<(dia[x-1]+4))&&dia[x]<3050)
        {
          average=(dia[x]+dia[x-1])/2;
          if(average > adapter2)
            adapter2=average;
        }
    }
  if(adapter2 > 2980)  /* That is, adapter2 was set in the for loop */
    {
      for(x=5; x>2; x--)   /* Get diameter of butt end of the adapter */
        {
          if((dia[x]>(dia[x-1]-4))&&(dia[x]<(dia[x-1]+4)) && dia[x]>2980)
            {
              average=(dia[x]+dia[x-1])/2;
              if(average > adapter1)
                adapter1=average;
            }
        }
      if(adapter1 > 2980)/* That is, adapter1 was set in the for loop */
        {
          adapdiff=adapter2 - adapter1;
          x=atoi(0xFC0A06);
          x++;                /* Increment the total adapted drill count */
          sprintf(0xFC0A00,"TOTAL=%d",x);
          if(adapter2>3023)
            {
```

```
            x=atoi(0xFC0A25);
            x++;
            sprintf(0xFC0A20,"HIGH=%d",x);
            shank=14;       /* Adapter is split, tapered, or out of tol. */
              return;
            }
          else if(adapter1<3002)
            {
              x=atoi(0xFC0A14);
              x++;
              sprintf(0xFC0A10,"LOW=%d",x);
              shank=14;
              return;
            }
          else if(adapdiff >8)
            {
              x=atoi(0xFC0A36);
              x++;
              sprintf(0xFC0A30,"TAPER=%d",x);
              shank=14;
              return;
            }
          }
        }

/* Look for adapter grooves by looking for a diameter less than
   .2980 followed by a diameter greater than .2990. Due to the
   possibility of catching a diameter on the edge of the groove,
   two diameters after the groove diameter must be checked. This
   means that a wide groove could look like two grooves, so use
   only the last of consecutive groove diameters. */ y=0;
      for(x=4; x<11; x++)
        {
          if((dia[x]<2980&&dia[x+1]>=2980)&&(dia[x+1]>2990||dia[x+2]>2990))
            y++;
        }
      if(y==2)
        shank=4;                                /* Double groove */
      else if(y==1)
        shank=3;                                /* Single groove */
      else
        shank=2;                                /* No groove */
    }
}

/*-----------------------------------------------------------------
            DRILL RECOGNITION SYSTEM SOFTWARE
           (c) Copyright 1988 by The Boeing Company
                    All Rights Reserved
-------------------------------------------------------------------*/

/* MAIN() IS THE BEGINNING FUNCTION OF THE PROCESS ."RECOGNIZE".
   THIS PROCESS TAKES A DRILL WHICH WAS PLACED SHANK FIRST AT GATE
   5 BY THE PROCESS "ORIENT" AND DETERMINES IT'S IDENTITY.
*/
#include "message.h"
include <stdio.h>
include "sorter.h"
#define timer 20                                /* Time in seconds */
#define mem(adr) ((unsigned char *)(adr))
#define mem2(adr) ((unsigned int *)(adr))
IOD *io;  /* IOD is defined in sorter.h it is a structure type used */
          /* to create a common data path between multiple processes*/
          /* that use the same input/output ports                   */
```

```c
FILE *g_bamport;
char *g_att;
char *g_message;

main()

FILE *fp,*bport,*fopen();                              /* Structure */ extern IOD *io;                          /* Pointer to common I/O register */
    extern recpid;                           /* Recognition process I.D. number */
    unsigned int *n,*mod_link();
    char buffer[60],*message;
    char ssf;                                              /* Shank Status Flag */
    int atr;                                               /* Alloy Test Result */
    int _sec,_tmcount;
    int flag=0,x;
    int fl=0;
    char y[100];                   /* Array for reply from Carousel computer */
    char cuttercode[5];

g_att=attach("t1",0xef);
    y[0]=0;
    fp=fopen("/t1","w+");                            /* communication port */
    bport=fopen("/p","w+");              /* open bam port               */
    g_bamport=bport;
    message=(char *)mod_link("MESSMOD"); mod_unlink("MESSMOD");
    g_message=message;
    if((n=mod_link("sortmod"))==0) exit(0);
    else mod_unlink("sortmod");
    *(message+RECOGNIZE)='Y';
    if(*(message+ORIENT)=='Y')
      {
        transmit(":Orient Task is running",fp);
        receive(y,fp,&fl,0);
        transmit(":Recognize Task is running",fp);
        receive(y,fp,&fl,0);
      }
    io = (IOD *)n;           /* Force io to point to structure in sortmod */
    recpid = getpid();                            /* Get the process I.D. */
    pioch3(io->op4 |= 0x08);        /* Tell 68008 to reset buffer pointer */
    pioch3(io->op4 &= ~0x08);
    pioch3(io->op4 |= 0x20);              /* Take lasermike STOP input low */
    if(pip2() & 0x04)              /* If a drill is at Gate 5 (PS16 active) */
      *(message+G5DRILL)=1;
    else
      *(message+G5DRILL)=0;
    x=chkbam(message,fp,bport);                   /* Check for servo error */
    _tmcount=0;
    initimecount(&_sec);
    while(!(pip1() & 0x80) || x)
      {
        quitcheck(message,fp);
        timecount(&_tmcount,&_sec);
        if(_tmcount>=timer && flag==0 && x==0)
          {
            transmit("Waiting for BAM ready signal",fp);
            flag=1;
            tsleep(5);
            receive(y,fp,&fl,0);
          }
      }
    flag=0;
    pioch3(io->op4 |= 0x01);                      /* Enable Bam RESET switch. */
```

```
if(pip2() & 0x80)           /* Check "O.K. to index Carousel" signal. *
{                           /* If it is active, there must be a drill *
  strcpy(cuttercode,0xFC0909);               /* in the Carousel tube. *
  strcat(cuttercode,0xFC0915);
  if(strlen(cuttercode)==4)
  {
    transmit(cuttercode,fp);                 /* Get the code and send it. *
    receive(y,fp,&fl,0);
  }
}
 start(message,fp,bport);
 getout(message,fp,bport);                   /* exit the program *
}
```

/* SEARCHES FOR THE FIRST MARGIN

Mindia comes in set to the minimum diameter found in the first
   flute valley. The diameters are now examined as they rise up
   out of the valley toward to drill land. Mindia is updated as
   long as the last diameter is greater than the current value of
   mindia. This continues until a diameter less than mindia minus
   .002 inches is found or until the search distance limit is
   exceeded. If the search limit is exceeded, the drill is assumed
   to have no margin and is tagged as a stoveburner. Otherwise the
   drill is assumed to have a margin but is not tagged as such in
   this routine. So, there are four ways out of this routine: the
   drill goes out of view, a margin is found, the next flute valley
   is encountered, or the search limit is exceeded. A count is kept
   of the number of diameters found during the search which are
   equal to the maximum diameter +/- .001 inches. This count is
   later used in the helix routine to help identify hi-spiral
   stoveburners.
*/

```
margin1()
{
 extern int maxdia,maxloc,mindia,lastdia,margdia1,mcount;
 extern int margdia4,m4loc,feature,encount,marlcount,marsearch;
 mcount=0;  /* Number of diameters at first margin equal to maxdia */ if(lastdia<200)
  return;
 while(lastdia>=mindia-20)     /* false when margin relief is found */
 {
  if(lastdia <= maxdia + 15)
   mindia=lastdia;
  getdia2();
  marlcount++;
  if(lastdia < maxdia+10 && lastdia > maxdia-10)
   mcount++;
  if(lastdia<200)                 /* has drill gone out of view? */
   return;
  if(lastdia<mindia+20 && lastdia>mindia-20)/* true when land found*/
  {
   margdia1=lastdia;
   getdia2();
   marlcount++;
   if(lastdia < maxdia+10 && lastdia > maxdia-10)
    mcount++;
   if(lastdia<200)                /* has drill gone out of view */
    return;
```

/* The following is done to minimize the effects of dirt. Two out
of three diameters(mindia, margdia1, and lastdia) across the margins must be within .0002 inches of each other before the maximum
diameter is updated. They also must be equal to the current max.
diameter but not greater than max. diameter + .0015. Otherwise,
the maximum diameter remains at the value given it in the shank
routine. */

```
    if(mindia>=margdia1-2 && mindia<=margdia1+2)
    {
      if((mindia<maxdia+15 && mindia>=maxdia)||(margdia1<maxdia+15 &&
argdia1>=maxdia))
      {
        if(mindia < margdia1)
          maxdia=mindia;
        else
          maxdia=margdia1;
        maxloc=encount;            /* location of the maximum diameter. *
        margdia4=margdia1;   /* used for backtaper calc. in lencalc(). * m4loc=encount-1;                  /* the location of margdia4. *
      }
    }
    if(lastdia>=margdia1-2 && lastdia<=margdia1+2)
    {
      if((lastdia<maxdia+15 && lastdia>=maxdia)||(margdia1<maxdia+15 &
margdia1>=maxdia))
      {
        if(lastdia < margdia1)
          maxdia=lastdia;
        else
          maxdia=margdia1;
        maxloc=encount;
        margdia4=margdia1;
        m4loc=encount-1;
      }
    }
    if(lastdia>=mindia-2 && lastdia<=mindia+2)
    {
      if((lastdia<maxdia+15 && lastdia>=maxdia)||(mindia<maxdia+15 &&
india>=maxdia))
      {
        if(lastdia < mindia)
          maxdia=lastdia;
        else
          maxdia=mindia;
        maxloc=encount;
        margdia4=lastdia;
        m4loc=encount-1;
      }
    }
    if(marlcount>=maxdia/150)/* Reached the search distance limit ? */
    {                        /* Marsearch is a flag set if no margin */
      if(marsearch==0)                /* is found on the first try. */
      {
        marsearch++;          /* Flag it as a possible stoveburner */
        return;
      }
      else if(maxdia>3200 || maxdia<950)   /* stoveburner size limits */
        feature=0;
      else
        feature=2;                        /* A stoveburner drill */ mindia=lastdia;
      return;
```

```
        )
       )
      )
     mindia=lastdia;
     margdia1=maxdia;
    )

/* SEARCHES FOR A POSSIBLE SECOND MARGIN

The number of diameters used for the search (i.e. the search
        distance) is limited by dividing the maximum diameter of the
        drill by 200. Also the search is ended if the diameter de-
        creases to 85% or less of the maximum diameter, which indicates
        the start of the second flute valley or possibly the end of the
        drill. The diameters are tracked until the minimum across the
        margin relief is found. Then the diameters are passed through
        a sort of three diameter shift register made of tempdia,
        margdia2, and lastdia. If any one of these three values be-
        comes >= the diameter across the first margin minus .0007
        inches and if, at the same time, any two of the three are
        within .001 inches of each other, a second margin has been
        found. This is done to avoid incorrect identification due to
        foreign material which may be on the surface of the drill.
    */ margin2()
    {
     extern int maxdia,mindia,margdia1,margdia2,lastdia,mar2count;
     extern int feature;
     int tempdia=0;

if(lastdia<200)
       return;
     margdia2=0;
     mar2count=1;                          /* Search distance counter */
     while(mar2count < maxdia/200 && lastdia>=.85 * maxdia)
     {
      getdia2();
      if(lastdia<200)
        return;
      else if(lastdia <= mindia)
        mindia=lastdia;
      else
      {
       tempdia=lastdia;
       break;
      }
      mar2count++;
     }
     if(mar2count >= maxdia/200 !! lastdia < .85 * maxdia)
     {
      mindia=lastdia;
      return;
     }
     getdia2();
     mar2count++;
     if(lastdia<200)
       return;
     margdia2=lastdia;
     while(mar2count < maxdia/200 && lastdia >= .85 * maxdia)
     {
      getdia2();
```

```
   if(lastdia<200)
    return;
   if(tempdia>=margdia1-7 !! margdia2>=margdia1-7 !! lastdia>= marg
dia1-7)
    {
     if((tempdia>=margdia2-10 && tempdia<=margdia2+10)!!(tempdia>=la
stdia-10 && tempdia<=lastdia+10)!!(margdia2>=lastdia-10 && margdia
2<=lastdia+10))
      {
       feature=1;
       break;
      }
    }
   tempdia=margdia2;
   margdia2=lastdia;
   mar2count++;
  }
 mindia=lastdia;
 }
/* IS IT A "NUCON" DRILL?

Nucon drills are short (less than 2.6 inches), hi-spiral,
   straightshank drills. If the item has a straight shank, a
   flute valley at least 1.2 inches from the shank end, and
   is shorter than 2.64 inches, it's probably a nucon.
*/ define incdist .03   /* Distance between diameter measurements */ nuconcheck()
{
 extern int drilcode,shank,feature,lencode,minloc,encount;
 extern float length;
 extern char *driltype;

if(encount<90 && shank==1 && minloc>40) /* minloc marks the    */
  {                                      /* location of the first */
   feature=4;                            /* flute valley. */
   length=encount*incdist;
   lentable();
   drilcode=shank+(feature*16)+(lencode*256);
   typetable();
   stosize();
  }
 else
   driltype="00";                                        /* Reject */
}

/* PARABOLIC FLUTE DRILL SIZE TABLE

This table helps in the separation of parabolic flute drills
   and standard hi-spiral six inchers.
*/ include <stdio.h> pf_drill()
 {
  extern int maxdia, lencode;

if(maxdia >= 4900 && maxdia <= 5050)                /* 1/2 */
    lencode=17;
```

```
    else if(maxdia >= 4300 && maxdia <= 4430)          /* 7/16 */
        lencode=17;
    else if(maxdia >= 4140 && maxdia <= 4290)          /* 27/64 */
        lencode=17;
    else if(maxdia >= 3700 && maxdia <= 3820)          /* 3/8 */
        lencode=17;
    else if(maxdia >= 3500 && maxdia <= 3670)          /* 23/64 */
        lencode=17;
    else if(maxdia >= 33.. && maxdia <= ....)          /* 11/32 */
        lencode=17;
    else if(maxdia >= 3070 && maxdia <= 3180)          /* 5/16 */
        lencode=17;
    else if(maxdia >= 2300 && maxdia <= 2390)          /* 15/64 */
        lencode=17;
    else if(maxdia >= 2000 && maxdia <= 2080)          /* 13/64 */
        lencode=17;
    else if(maxdia >= 1730 && maxdia <= 1790)          /* No.16 */
        lencode=17;
    else if(maxdia < 2700)
        lencode=11;                                    /* Hi-Spiral x 6" */
}

/* CHECKS FOR SHUTDOWN AND PERFORMS FINAL SHUTDOWN TASKS */ include "message.h"
include <stdio.h>
include "sorter.h"
extern IOD *io;
extern FILE *g_bamport;
#define mem(adr) ((unsigned char *)(adr))
#define mem2(adr) ((unsigned int *)(adr))

quitcheck(message,fp)
char *message;
FILE *fp;
{
  int m,n;
  char y[100],fl=0;

y[0]=0;
    if((m=_gs_rdy(fp->_fd)) !=-1)
      {
        receive(y,fp,&fl,10);
        if((n=strcmp(y,"QUIT"))==0)
          {
            *(message+STARTFLAG)=0;
            getout(message,fp,g_bamport);
          }
      }
} getout(message,fp,bport)
FILE *fp,*bport;
char *message;
{
  int atr;
  int x;
  extern char *g_att;
  extern int recpid;

setpr(recpid,128);
  piochl(io->op2 &= ~0x04);/* Gate 6 may not be closed. Close it */
  fclose(bport);
  detach(g_att);
  *(message+STARTFLAG)=*(message+RECOGNIZE)=0;
  sprintf(0xfc05c0,"STARTFLAG(%x)=(%d)",message+STARTFLAG,*(message+ST
```

```
ARTFLAG));
  tsleep(50);
  fclose(fp);
  exit(0);
}
/* This function does a rough check on all objects which failed to be
   identified during the recognition analysis to determine if they
   "might" be a reamer. Due to their geometry, the orientation system
   will not always orient reamers shank first. Also, the maximum
   diameter will in most cases not be seen by the lasers, so sorting
   to actual size is not possible.
*/ reamer()
 {
  extern int maxdia,minloc,encount,shank;
  extern char *driltype, *size;
  extern float length;
  int x=0;

if(length==0)
   lencalc();
  if(shank==6 && minloc>(encount - 12))                    /* ST1861B */
   {
    if(length>1.43 && length<1.57 && maxdia>1620 && maxdia<3900)
     x=1;
    else if(length>1.94 && length<2.07 && maxdia>1620 && maxdia<3800)
     x=1;
    else if(length>2.43 && length<2.57 && maxdia>1620 && maxdia<3800)
     x=1;
    else if(length>2.93 && length<3.07 && maxdia>1390 && maxdia<3750)
     x=1;
   }
  else if(shank !=6 && shank !=0 && minloc >(encount - 12))
   {
    if(length>2.9 && length<3.1 && maxdia>800 && maxdia<950)
     x=1;
    else if(length>3.4 && length<3.6 && maxdia>900 && maxdia<1300)
     x=1;
    else if(length>3.9 && length<4.1 && maxdia>1200 && maxdia<1580)
     x=1;
    else if(length>4.4 && length<4.6 && maxdia>1500 && maxdia<1900)
     x=1;
    else if(length>4.9 && length<5.1 && maxdia>1800 && maxdia<2195)
     x=1;
    else if(length>5.9 && length<6.1 && maxdia>2100 && maxdia<3450)
     x=1;
    else if(length>6.9 && length<7.1 && maxdia>3050 && maxdia<4750)
     x=1;
    else if(length>7.9 && length<8.1 && maxdia>4300 && maxdia<5100)
     x=1;
   }
  if(x==1 && (strcmp(driltype,"7A")!=0))
   {
    driltype="7d";
    size="00";
   }
 }
/* LOADS THE SHANK DIAMETER ARRAY "DIA" */ shankdia()
 {
  extern char *datadres;
  extern int lastdia,encount,dia[67];

encount=0;
  while(encount<68)
```

```
    {
      getdia2();
      dia[encount]=lastdia;
    }
  }

/* CHECKS FOR A SHORT QUICK CHANGE ADAPTER

The array dia[67] contains the decimal shank diameter values.
   Multiplying the array tag number times .03 inches will give the
   distance, from the end of the drill, at which the diameter was
   taken. If an adapter is identified, two consecutive diameters
   values within +/- .0003 inches of each other are searched for
   to use as the starting maximum diameter. If this test fails,
   the largest diameter found between dia[17] and dia[40] is used.

The nominal diameter of the adapter is .301 to .302 inches. A +
   or - .003 inch tolerance is allowed here. A tanged drill oriented
   just right could look like an adapted drill. Most tangs are .5
   inches in length, however, some are not. No drill over 4 inches
   in length should have a quick change adapter so the diameter 4.26
   inches from the butt end is checked. Adapters are .4 inches in
   length, so dia[15] and dia[20], .45 and .6 inches in from the end
   of the adapter respectively, are included in the test which is
   made if it looks like the drill is shorter than 4.26 inches.
*/ shortQC()
{
  extern int maxdia,maxloc,mindia,minloc;
  extern int lastdia,shank,encount,offset;
  extern char *datadres;
  extern int dia[67];
  int average=0;
  int x,y;

lastdia=atoi(0xFC12C6 + offset);    /* Check dia. 4.26" from end */
  if(lastdia > 200)     /* No short quick change over 4 inches long */
    return;
  y=0;
  for(x=6; x<14; x++)
    {
      if(dia[x] > 2970 && dia[x] < 3050)
        y++;
    }
  if(y>1 &&((dia[32]<2980 || dia[32]>3050)&&(dia[33]<2980 || dia[33]>
  3050))&&((dia[15]<2970 || dia[15]>3050)||(dia[20]<2970 && dia[20]>30
  50))&&dia[54]<3850)
    {
      for(x=17; x<40; x++)
        {
          if(dia[x]>(dia[x+1]-4) && dia[x]<(dia[x+1]+4) && dia[x+1]>300)
            {
              average=(dia[x] + dia[x+1])/2;
              if(average > maxdia)
                {
                  maxdia=average;
                  maxloc=x+1;
                  encount=x+1;
                }
            }
        }
    }
  if(maxdia <=300)          /* That is, maxdia did not get set yet */
    {
```

```
    maxdia=dia[17];
    for(x=18; x<40; x++)
      {
      if(maxdia < dia[x])
        {
        maxdia=dia[x];
        maxloc=x;
        encount=x;
        }
      }
    }
    lastdia=maxdia;
    datadres=0xFC1000 + (encount * 5) + offset;
    while(lastdia>(.88*maxdia) && lastdia>200)
      getdia2();              /* Look for start of first flute valley */
    mindia=lastdia;
    minloc=encount;
    if(maxdia > 3300 || maxdia < 300 || lastdia < 200)
      shank=15;                                              /* Reject */
    else
      shank=5;                             /* Short Quick Change Adapter */
  }
}
/* CALLS THE RECOGNITION LASERMIKE CALIBRATION ROUTINE AND CHECKS
   TO SEE IF A DRILL IS REQUIRED AT THE STROKER.

If the Recognition task is started with no drill at Gate 5, it
   will wait for the Orient task to place a drill at Gate 5. When
   the Orient task releases a drill from the Flipper, a flag,
   G5DRILL, is set. If the flag is set, and a drill does not arrive
   at Gate 5 within 5 seconds, an error message is generated.
   The Orient task places a flag at address F7050A to indicate the
   status of the drill it has placed at Gate 5. If the flag is 2,
   the drill is a straight shank jobber and diameters will be taken
   every .006" over the first .09" of the drill shank to help
   determine if it is a cobalt drill. If the flag is 1, no cobalt
   test is required. If it is something else, something is wrong!
   When a drill is passed on to the Stroker, the flag is
   transferred to address FC0508. During the recognition data
   analysis, the flag will be tested and the appropriate analysis
   performed.
*/ include <stdio.h>
include "message.h"
#include "sorter.h"
#define  mem(adr) ((unsigned char *)(adr))
extern IOD *io;

start(message,fp,bport)
char *message;
FILE *fp,*bport;
  {
  int _m,_n;
  int flag=0;
  int fl=0,x;
  int count=0;
  int _sec, _tmcount;
  char errorflag,flg=1,y[100];

while(*(message+STARTFLAG))
    {
    x=chkbam(message,fp,bport);       /* check for servo error */
    while(x)
      quitcheck(message,fp);
    errorflag=1;
```

```
while(1)
 {
   quitcheck(message,fp);
   if((*(message+MESSAGEFLAG)==1 && errorflag==1)
    {
      transmit(message+MESSAGEBUF,fp);
      receive(y,fp,&flg,0);
      errorflag=0;
     }
    else if(*(message+MESSAGEFLAG)==0 !! *(message+STARTFLAG)==0)
      break;
 }
caltime(message,fp,bport);
if(*(message+G5DRILL)==1)  /* Drill has been placed at Gate 5 */
 {
   if((pip2() & 0x04)&&(!(pip1() & 0x40))&&(!(pip1() & 0x01)))

/* Drill at Gate 5, PS13 not active, and no drill at Stroker*/
     {
       count=0;
       stroker_load(message,fp);
     }
    else if(!(pip2() & 0x04))           /* If no drill at Gate 5 */
     {
       count++;
       while(count > 300 && (!(pip2() & 0x04)))
          /* No drill has been at Gate 5 for at least 6 seconds */
         {
          quitcheck(message,fp);
          if(flag==0)
            {
             transmit("No drill at Gate 5",fp);
             flag=1;
             tsleep(5);
             receive(y,fp,&fl,0);
            }
         }
       tsleep(2);
       flag=0;
      }
 }
else if(*(message+G5DRILL)==2)              /* See identify() */
 {
   _tmcount=0;
   initimecount(&_sec);
   while(!(pip1() & 0x40))            /* While PS13 is not active */
    {
      quitcheck(message,fp);
      timecount(&_tmcount,&_sec);
      if(_tmcount>5 && flag==0)
        {
         quitcheck(message,fp);
         transmit("Drill did not reach Gate 7",fp);
         flag=1;
         tsleep(5);
         receive(y,fp,&fl,0);
        }
     }
   flag=0;
   if((pip1() & 0x40) && (!(pip1() & 0x01)))

/* Drill at decelerator gate and no drill at Stroker */
    {
      count=0;
      stroker_load(message,fp);
     }
 }
```

```c
    if((pip1() & 0x01))        /* If a drill is at the Stroker..... */
      identify(message,fp,bport);
      while(*(message+REJCOUNT) >=10)
      {
        quitcheck(message,fp);
        if(flag==0)
        {
          piochl(io->op2 &= ~0x42);   /* Gate 5 and 7 solenoids may */
          tsleep(10);    /* be energized, so remove power from them. */
          *(message+G5DRILL)=0;          /* Drill taken from Gate 5 */
          if(*(message+DIRTCOUNT)>3)           /* Maxdia equaled 9999 */
            transmit("Too many unidentified drills - Shutdown, Clean l
aser slot 2",fp);
          else if(*(message+SIZECOUNT)>8)   /* Maxdia out of range */
            transmit("Too many unidentified drills - Shutdown, Check l
aser 2",fp);
          else
            transmit("Too many unidentified drills",fp);
          flag=1;
        }
        tsleep(30);
        receive(y,fp,&f1,0);
      }
    }
  }
}

/* STANDARD DRILL SIZE (DIAMETER) TABLE */ stdsize()
{
  extern int maxdia,shank;
  extern float length;
  extern char *size;

if(maxdia<=5050 && maxdia>=4940)
    size="60";                                          /* 1/2 */
  else if(maxdia<=4900 && maxdia>=4790)
    size="5F";                                          /* 31/64 */
  else if(maxdia<=4750 && maxdia>=4600)
    size="5E";                                          /* 15/32 */
  else if(maxdia<4600 && maxdia>=4450)
    size="5D";                                          /* 29/64 */
  else if(maxdia<4450 && maxdia>=4300)
    size="5C";                                          /* 7/16 */
  else if(maxdia<4300 && maxdia>=4150)
    size="5B";                                          /* 27/64 */
  else if(maxdia<4150 && maxdia>=4090)
    size="5A";                                          /* Z */
  else if(maxdia<4090 && maxdia>=4045)
    size="59";                                          /* 13/32 */
  else if(maxdia<4045 && maxdia>=3990)
    size="58";                                          /* Y */
  else if(maxdia<3990 && maxdia>=3930)
    size="57";                                          /* X */
  else if(maxdia<3930 && maxdia>=3867)
    size="56";                                          /* 25/64 */
  else if(maxdia<3867 && maxdia>=3800)
    size="55";                                          /* W */
  else if(maxdia<3800 && maxdia>=3757)
    size="54";                                          /* V */
  else if(maxdia<3757 && maxdia>=3700)
    size="53";                                          /* 3/8 */
  else if(maxdia<3700 && maxdia>=3630)
    size="52";                                          /* U */
```

```
else if(maxdia<3630 && maxdia>=3580)
  size="51";                                    /* 23/64 */
else if(maxdia<3580 && maxdia>=3530)
  size="50";                                    /* T */
else if(maxdia<3530 && maxdia>=3450)
  size="4F";                                    /* S */
else if(maxdia<3450 && maxdia>=3400)
  size="4E";                                    /* 11/32 */
else if(maxdia<3400 && maxdia>=3340)
  size="4D";                                    /* R */
else if(maxdia<3340 && maxdia>=3300)
  size="4C";                                    /* Q */
else if(maxdia<3300 && maxdia>=3240)
  size="4B";                                    /* 21/64 */
else if(maxdia<3240 && maxdia>=3190)
  size="4A";                                    /* P */
else if(maxdia<3190 && maxdia>=3135)
  size="49";                                    /* O */
else if(maxdia<3135 && maxdia>=3050)
  size="48";                                    /* 5/16 */
else if(maxdia<3050 && maxdia>=2990)
  size="47";                                    /* N */
else if(maxdia<2990 && maxdia>=2950)
  size="46";                                    /* 19/64 */
else if(maxdia<2950 && maxdia>=2910)
  size="45";                                    /* M */
else if(maxdia<2910 && maxdia>=2850)
  size="44";                                    /* L */
else if(maxdia<2850 && maxdia>=2780)
  size="43";                                    /* 9/32 */
else if(maxdia<2780 && maxdia>=2740)
  size="41";                                    /* J */ else if(maxdia<2740 && maxdia>=2680)
  size="40";                                    /* I */
else if(maxdia<2680 && maxdia>=2620)
  size="3E";                                    /* 17/64 */
else if(maxdia<2620 && maxdia>=2590)
  size="3D";                                    /* G */
else if(maxdia<2590 && maxdia>=2530)
  size="3C";                                    /* F */
else if(maxdia<2530 && maxdia>=2465)
  size="3A";                                    /* 1/4 */
else if(maxdia<2465 && maxdia>=2430)
  size="39";                                    /* D */
else if(maxdia<2430 && maxdia>=2390)
  size="38";                                    /* C */
else if(maxdia<2390 && maxdia>=2355)
  size="37";                                    /* B */
else if(maxdia<2355 && maxdia>=2335)
  size="36";                                    /* 15/64 */
else if(maxdia<2335 && maxdia>=2300)
{
  if(length>4.5)
    size="36";                                  /* 15/64 */
  else
    size="35";                                  /* A */
}
else if(maxdia<2300 && maxdia>=2230)
  size="34";                                    /* 1 */
else if(maxdia<2230 && maxdia>=2195)
  size="33";                                    /* 2 */
else if(maxdia<2195 && maxdia>=2150)
  size="32";                                    /* 7/32 */
```

```
else if(maxdia<2150 && maxdia>=2100)
    size="31";                                  /* 3 */
else if(maxdia<2100 && maxdia>=2065)
    size="30";                                  /* 4 */
else if(maxdia<2065 && maxdia>=2045)
    size="2F";                                  /* 5 */
else if(maxdia<2045 && maxdia>=2035)
    size="2E";                                  /* 6 */
else if(maxdia<2035 && maxdia>=2013)
    size="2D";                                  /* 13/64 */
else if(maxdia<2013 && maxdia>=1993)
    size="2C";                                  /* 7 */ else if(maxdia<1993 && maxdia>=1970)
    size="2B";                                  /* 8 */
else if(maxdia<1970 && maxdia>=1945)
    size="2A";                                  /* 9 */
else if(maxdia<1945 && maxdia>=1915)
    size="29";                                  /* 10 */
else if(maxdia<1915 && maxdia>=1893)
    size="28";                                  /* 11 */
else if(maxdia<1893 && maxdia>=1880)
    size="27";                                  /* 12 */
else if(maxdia<1880 && maxdia>=1855)
    size="26";                                  /* 3/16 */
else if(maxdia<1855 && maxdia>=1825)
    size="25";                                  /* 13 */
else if(maxdia<1825 && maxdia>=1805)
    size="24";                                  /* 14 */
else if(maxdia<1805 && maxdia>=1775)
    size="23";                                  /* 15 */
else if(maxdia<1775 && maxdia>=1740)
    size="22";                                  /* 16 */
else if(maxdia<1740 && maxdia>=1723)
    size="21";                                  /* 17 */
else if(maxdia<1723 && maxdia>=1700)
    size="20";                                  /* 11/64 */
else if(maxdia<1700 && maxdia>=1670)
    size="1F";                                  /* 18 */
else if(maxdia<1670 && maxdia>=1630)
    size="1E";                                  /* 19 */
else if(maxdia<1630 && maxdia>=1593)
    size="1D";                                  /* 20 */
else if(maxdia<1593 && maxdia>=1573)
    size="1C";                                  /* 21 */
else if(maxdia<1573 && maxdia>=1566)
    size="1B";                                  /* 22 */
else if(maxdia<1566 && maxdia>=1545)
    size="1A";                                  /* 5/32 */
else if(maxdia<1545 && maxdia>=1525)
    size="19";                                  /* 23 */
else if(maxdia<1525 && maxdia>=1500)
    size="18";                                  /* 24 */
else if(maxdia<1500 && maxdia>=1475)
    size="17";                                  /* 25 */
else if(maxdia<1475 && maxdia>=1445)
    size="16";                                  /* 26 */
else if(maxdia<1445 && maxdia>=1420)
    size="15";                                  /* 27 */
else if(maxdia<1420 && maxdia>=1370)
    size="14";                                  /* 9/64 */
else if(maxdia<1370 && maxdia>=1320)
    size="12";                                  /* 29 */
```

```
   else if(maxdia<1320 && maxdia>=1260)
     size="11";                                    /* 30 */
   else if(maxdia<1260 && maxdia>=1220)
     size="10";                                    /* 1/8 */
   else if(maxdia<1220 && maxdia>=1170)
     size="0F";                                    /* 31 */
   else if(maxdia<1170 && maxdia>=1140)
     size="0E";                                    /* 32 */
   else if(maxdia<1140 && maxdia>=1115)
     size="0D";                                    /* 33 */
   else if(maxdia<1115 && maxdia>=1100)
     size="0B";                                    /* 34 */
   else if(maxdia<1100 && maxdia>=1070)
     size="0B";                                    /* 7/64 */
   else if(maxdia<1070 && maxdia>=1045)
     size="07";                                    /* 36 */
   else if(maxdia<1045 && maxdia>=1020)
     size="06";                                    /* 37 */
   else if(maxdia<1020 && maxdia>=1000)
     size="05";                                    /* 38 */
   else if(maxdia<1000 && maxdia>=987)
     size="04";                                    /* 39 */
   else if(maxdia<987 && maxdia>=963)
     size="03";                                    /* 40 */
   else if(maxdia<963 && maxdia>=945)
     size="02";                                    /* 41 */
   else if(maxdia<945 && maxdia>=920)
     size="01";                                    /* 3/32 */
   else
     size="00";                   /* Unknown or reject */
}

/* CALLS ROUTINES FOR DRILLS WHICH MAY HAVE A PILOT

Used only on short quick change and threaded shank drills.
*/ stepcheck()
{
 extern int drilcode,shank,feature,lencode;

stepsearch();
 lencalc();
 lentable();
 drilcode=shank+(feature*16)+(lencode*256);
 typetable();
 if(feature==1)
    stepsize();
 else
    absize();
}

/* LOOKS FOR A REDUCED DIAMETER (A PILOT) AT END OF DRILL

Depending on the shank type and maximum diameter, a number
   (stepcount) of consecutive diameters between 30% and 80% of
   the maximum (major) diameter is searched for. The search
   continues until the end of the drill is found. This function
   is used for drills which may be to short to search for
   double margins.
*/ stepsearch()
{
```

```c
extern int lastdia,maxdia,maxloc,shank,feature,encount;
int stepcount=0;      /* Step checking distance counter */ while(lastdia !=0)
{
  getdia2();
  if((shank==5 &&(maxdia>1820 && maxdia<1882))||(shank==6 &&(maxdia>1820 && maxdia<1905)))
  {
    if(lastdia>=maxdia &&lastdia<=(maxdia+3))
    {
     maxdia=lastdia;
     maxloc=encount;
    }
    else if(lastdia<=(.8*maxdia) &&lastdia>(.3*maxdia))
    {
     stepcount++;
      if(stepcount==5)
       { feature=1;break;}
    }
    else
      stepcount=0;
  }
  else if((shank==5 &&(maxdia>2410 && maxdia<3200))||(shank==6 &&((maxdia>2410 &&maxdia<2514)||(maxdia>3110 &&maxdia<3150))))
  {
    if(lastdia>=maxdia &&lastdia<=(maxdia+5))
    {
     maxdia=lastdia;
     maxloc=encount;
    }
    else if(lastdia<=(.8*maxdia) &&lastdia>(.3*maxdia))
    {
     stepcount++;
     if(stepcount==7)
      { feature=1; break;}
    }
    else
        stepcount=0;
  }
  else if(shank==7 && (lastdia>=maxdia && lastdia<=maxdia + 150))
      maxdia=lastdia;
} if(feature !=1)
    feature=5;
}

/* STEP DRILL (DOUBLE MARGIN) SIZE (DIAMETER) TABLE */ stepsize()
{
 extern int maxdia,shank;
 extern char *size;
 if(maxdia<3170 && maxdia>=3140)
   size="89";                                        /* .315 */
 else if(maxdia<3140 && maxdia>=3110)
   size="88";                                        /* .313 */
 else if(maxdia<3110 && maxdia>=3050)
   size="87";                                        /* .310 */
 else if(maxdia<2920 && maxdia>=2850)
   size="86";                                        /* .290 */
 else if(maxdia<2810 && maxdia>=2760)
   size="85";                                        /* .279 */
```

```
    else if(maxdia<2760 && maxdia>=2690)
      size="84";                                    /* .274 */
    else if(maxdia<2640 && maxdia>=2570)
      size="83";                                    /* .262 */
    else if(maxdia<2550 && maxdia>=2515)
      size="82";                                    /* .253 */
    else if(maxdia<2515 && maxdia>=2502)
    {
      if(shank==5)
        size="80";                                  /* .250 */
      else
        size="81";                                  /* .251 */
    }
    else if(maxdia<2502 && maxdia>=2485)
      size="80";                                    /* .250 */
    else if(maxdia<2485 && maxdia>=2465)
      size="7F";                                    /* .248 */
    else if(maxdia<2465 && maxdia>=2410)
      size="7E";                                    /* .246 */
    else if(maxdia<2360 && maxdia>=2310)
      size="7D";                                    /* .234 */
    else if(maxdia<2310 && maxdia>=2285)
      size="7C";                                    /* .230 */
    else if(maxdia<2285 && maxdia>=2230)
      size="7B";                                    /* .228 */
    else if(maxdia<2210 && maxdia>=2150)
      size="7A";                                    /* .2188 */
    else if(maxdia<2150 && maxdia>=2110)
      size="79";                                    /* .214 */
    else if(maxdia<2110 && maxdia>=2050)
      size="78";                                    /* .210 */
    else if(maxdia<1940 && maxdia>=1905)
      size="77";                                    /* .192 */
    else if(maxdia<1905 && maxdia>=1871)
    {
      if(shank==6)
        size="75";                                  /* .189 */
      else
        size="76";                                  /* .190 */
    }
    else if(maxdia<1891 && maxdia>=1881)
      size="75";                                    /* .189 */
    else if(maxdia<1881 && maxdia>=1871)
    {
      if(shank==5)
        size="73";                                  /* .187 */
      else
        size="74";                                  /* .188 */
    }
    else if(maxdia<1871 && maxdia>=1820)
      size="73";                                    /* .187 */
    else if(maxdia<1620 && maxdia>=1591)
      size="72";                                    /* .160 */
    else if(maxdia<1591 && maxdia>=1570)
      size="71";                                    /* .159 */
    else if(maxdia<1570 && maxdia>=1510)
      size="70";                                    /* .156 */
    else
      size="00";                    /* Unknown or reject */
}

/* CHECKS FOR A STRAIGHT SHANK AND A CENTER DRILL

The array dia[67] contains the shank diameter values. For jobber
    length drills, diameters are spaced every .006 inches (nominal -
``` actual spacing is .006 to .0085 inches when the drill is passing
through the laser beam at a rate of one inch per second)
for the first .09 inches of the shank and every .03 inches
thereafter. After checking for cobalt, see the file cobalt.c,
the diameters in the array are shifted to where they would be if
diameters had been taken every .03 inches only. However, the raw
data still contains the 12 extra diameters and this must be
taken into acount when setting the starting point for the rest
of the drill analysis.

Multiplying the array tag number times .03 inches will give the
distance from the end of the drill at which the diameter was
taken. Starting .36 inches from the end of the shank (to avoid
problems due to twisted off adapters), the function looks for
six diameters in the first 0.9 inches of length which are within
.010 inches of their average. If this test fails, six different
diameters are used for the test. If both of these tests fail,
the same thing is done starting further in from the end of the
end of the drill shank. The second set of diameters starts 0.6
inches from the end of the shank and ends 1.5 inches from the
end of the shank. A tanged shank could fail the first test but
should pass the second. The flutes may start as close
as one inch from the shank end of a non-tanged drill, but
normally start at least 1.5 inches from the end on tanged drills.
A center drill test is made at the end of this function.

```
*/
define mem(adr) ((unsigned char *)(adr))

straightshank()
{
 extern int maxdia,maxloc,mindia,minloc,shank,encount,lastdia;
 extern char *datadres;                  /* Drill diameter data pointer */
 extern int dia[67],offset;
 char ssf;                                              /* Shank status flag */
 int average=0;
 int count=1;
 int tempdia,x,y;
 int z=0;

average=(dia[12]+ dia[15]+ dia[16]+ dia[19]+ dia[24]+ dia[30])/6;
 x=average + 100;
 y=average - 100;
 if(x>dia[12] && y<dia[12] && x>dia[15] && y<dia[15] && x>dia[16] &&
y<dia[16] && x>dia[19] && y<dia[19] && x>dia[24] && y<dia[24] && x>di
a[30] && y<dia[30])
  {
  y=1;
  if(shank !=10)                                 /* If not a cobalt drill */
   shank=1;                                      /* A straight shank drill */
  for(x=12; x<31; x++)   /* Find the best starting value for maxdia */
   {
   if(dia[x]>(dia[x+1]-4) && dia[x]<(dia[x+1]+4))
    {
    average+=dia[x];
    y++;
    }
   }
  if(y > 2)
   {
   maxdia=average/y;
   encount=30;
   z=1;
   }
  }
 if(z==0)
```

```
{
 average=(dia[13]+ dia[17]+ dia[18]+ dia[21]+ dia[26]+ dia[31])/6;
 x=average + 100;
 y=average - 100;
 if(x>dia[13] && y<dia[13] && x>dia[17] && y<dia[17] && x>dia[18] &&
y<dia[18] && x>dia[21] && y<dia[21] && x>dia[26] && y<dia[26] && x>d
ia[31] && y<dia[31])

y=1;
   if(shank !=10)
    shank=1;
   for(x=13; x<32; x++) /* Find the best starting value for maxdia */
   {
    if(dia[x]>(dia[x+1]-4) && dia[x]<(dia[x+1]+4))
    {
     average+=dia[x];
     y++;
    }
   }
   if(y > 2)
   {
    maxdia=average/y;
    encount=31;
    z=1;
   }
 }
}
if(z==0)
{
 average=(dia[20]+dia[26]+dia[32]+dia[38]+dia[44]+dia[50])/6;
 x=average + 100;
 y=average - 100;
 if(x>dia[20] && y<dia[20] && x>dia[26] && y<dia[26] && x>dia[32] &&
y<dia[32] && x>dia[38] && y<dia[38] && x>dia[44] && y<dia[44] && x>d
ia[50] && y<dia[50])
 {
   y=1;
   if(shank !=10)
    shank=1;
   for(x=20; x<51; x++) /* Find the best starting value for maxdia */
   {
    if(dia[x]>(dia[x+1]-4) && dia[x]<(dia[x+1]+4))
    {
     average+=dia[x];
     y++;
    }
   }
   if(y > 2)
   {
    maxdia=average/y;
    encount=50;
    z=1;
   }
 }
}
if(z==0)
{
 average=(dia[21]+ dia[28]+ dia[34]+ dia[40]+ dia[42]+ dia[49])/6;
 x=average + 100;
 y=average - 100;
 if(x>dia[21] && y<dia[21] && x>dia[28] && y<dia[28] && x>dia[34] &&
y<dia[34] && x>dia[40] && y<dia[40] && x>dia[42] && y<dia[42] && x>d
ia[49] && y<dia[49])
 {
   y=1;
   if(shank !=10)
    shank=1;
```

```c
for(x=21; x<50; x++) /* Find the best starting value for maxdia */
{
 if(dia[x]>(dia[x+1]-4) && dia[x]<(dia[x+1]+4))
 {
  average+=dia[x];
  y++;
 }
}
if(y > 2)
{
 maxdia=average/y;
 encount=49;
}
}
}
if(maxdia < 880)                        /* It's too small, throw it back */
{
 shank=15;
 return;
}
lastdia=maxdia;
tempdia=maxdia;
average=maxdia;
ssf=*mem(0xFC0508);                     /* See if this is a jobber drill */
datadres=0xFC1000 + (encount *5) + offset;
if(ssf==2)
 datadres+=65;  /* Offset the data pointer for 13 extra diameters */

/* Look for the first flute valley */
 while(lastdia>(.88 * maxdia) && lastdia>200)
 {
  getdia2();
  if(lastdia>(tempdia-4) && lastdia<(tempdia+4))
  {
   x=(lastdia+tempdia)/2;
   average+=x;
   count++;
  }
 }
 maxdia=average/count;
 maxloc=encount - 2;
 mindia=lastdia;
 minloc=encount;

/* Check for centerdrills */ if((dia[24]<2200) && (dia[2]>dia[24]/6) && (dia[2]<dia[24]/2))
{
 if(ssf==2)
  z=0xFC12DA + offset;
 else
  z=0xFC1299 + offset;
 lastdia=atoi(z);     /* Get the diameter 3.99" from the butt end */
 if(lastdia > 200)    /* Something other than a short centerdrill? */
 {
  y=0;
  for(x=0; x<25; x++) /* Check for flutes between 3.99" and 4.71" */
  {
   if((lastdia<dia[24]+150)&&(lastdia>dia[24]-150))
    y++;
   z+=5;
   lastdia=atoi(z);
  }
  if(y<23)
   return;
```

```
  shank=9;                                      /* Probably a small centerdrill */
  maxdia=(dia[22]+dia[23]+dia[24])/3;
  lastdia=maxdia;
  encount=24;
  datadres=0xFC1078 + offset;
  if(ssf==2)
   datadres+=65;
 }
 else if((dia[34]>2200) && (dia[3]>dia[34]/7) && (dia[3]<dia[34]/2))
 {
  if(ssf==2)
   z=0xFC12DA + offset;
  else
   z=0xFC1299 + offset;
  lastdia=atoi(z);    /* Get the diameter 3.99" from the butt end */
  if(lastdia > 200)   /* Something other than a short centerdrill? */
  {
    y=0;
    for(x=0; x<25; x++) /* Check for flutes between 3.99" and 4.71" */
    {
     if((lastdia<dia[24]+150)&&(lastdia>dia[24]-150))
       y++;
     z+=5;
     lastdia=atoi(z);
    }
    if(y<23)
     return;
  }
  shank=9;                                      /* Probably a large centerdrill */
  maxdia=(dia[33]+dia[34]+dia[35])/3;
  lastdia=maxdia;
  encount=34;
  datadres=0xFC10AA + offset;
  if(ssf==2)
   datadres+=65;
 }
}

/* PLACES A DRILL AT THE STROKER

When a drill is placed at the Stroker, the shank status flag
   for that drill, located at address F7050A, is transferred to
   address FC0508. The Decelerator Gate is located a few inches
   before the Stroker. It saves wear and tare on the Stroker.
   A flag, GSDRILL, is set by the Orient task when it releases
   a drill from the Flipper. The flag is reset here when the
   drill has been released from Gate 5 and the gate has been
   closed.
   */ include <stdio.h>
include "message.h"
#include "sorter.h"
#define   mem(adr) ((unsigned char *)(adr))
#define   mem2(adr) ((unsigned int *)(adr))
#define   timer  5                              /* Time in seconds */
extern IOD *io;

stroker_load(message,fp)
char *message;
FILE *fp;
{
 int _sec,_tmcount;
 int flag=0;
 int f1=0;
```

```c
char ssf;                                      /* ssf=Shank Status Flag */
char y[10];

quitcheck(message,fp);
ssf=*mem(0xF7050A);/* Get shank status flag for drill at Gate 5 */
*mem(0xF7050A)=1;    /* Set to 1 in case double drills at Gate 5 */
*mem(0xFC0508)=ssf;          /* Set shank status for Stroker drill */
_tmcount=0;
initimecount(&_sec);
if(*(message+G5DRILL)!=2)
  piochl(io->op2 != 0x42);   /* Close decel gate and open Gate 5 */
while(pip2() & 0x04)                /* Wait for drill to clear PS16 */
{
 quitcheck(message,fp);
 timecount(&_tmcount,&_sec);
 if(_tmcount>timer && flag==0)
 {
  quitcheck(message,fp);
  transmit("Drill did not leave Gate 5",fp);
  flag=1;
  tsleep(5);
  receive(y,fp,&fl,0);
 }
} flag=0;
_tmcount=0;
 initimecount(&_sec);
 while(!(pip1() & 0x40))                       /* PS13 active? */
 {
  quitcheck(message,fp);
  timecount(&_tmcount,&_sec);
  if(_tmcount>timer && flag==0)
  {
   quitcheck(message,fp);
   transmit("Drill did not reach Gate 7",fp);
   flag=1;
   tsleep(5);
   receive(y,fp,&fl,0);
  }
 }
piochl(io->op2 &= ~0x40);              /* Open the decelerator gate. */
flag=0;
piochl(io->op2 &= ~0x02);                         /* Close Gate 5 */
_tmcount=0;
initimecount(&_sec);
while(!(pip1() & 0x01))        /* Check PS9 for drill at Stroker */
{
 quitcheck(message,fp);
 timecount(&_tmcount,&_sec);
 if(_tmcount>timer && flag==0)
 {
  quitcheck(message,fp);
  transmit("No drill at the Stroker",fp);
  flag=1;
  tsleep(5);
  receive(y,fp,&fl,0);
 }
}
*(message+G5DRILL)=0;       /* Drill has been taken from Gate 5 */
}

/* CHECKS FOR A THREADED SHANK OR THREADED ADAPTER

The array dia[67] contains the decimal shank diameter values.
    Multiplying the array tag number times .03 inches will give the
    distance from the end of the drill at which the diameter was
``` taken. If a 1/4-28 adapter with hex is identified, two consecutive diameters within +/- .0003 inches of each other are searched for to use as the starting maximum diameter. This should only occur on a good portion of the shank or across the margins. If this test fails, the largest diameter found within a defined area just beyond the adapter is used for the starting maximum diameter. This second technique is the only one used for all other threaded adapter drills.
*/

```c
threadshank()
{
 extern int maxdia,maxloc,mindia,minloc,shank,encount;
 extern char *datadres;
 extern int dia[67],offset;
 extern int lastdia;
 int average,x;

/* Threaded adapter without hex. Largest stocked size is a No. 10  */ if(dia[4]>2000 && dia[4]<2480 && dia[6]>2000 && dia[6]<2480 && dia[12]<2000)
  {
  maxdia=dia[12];
  encount=12;
  for(x=13; x<24; x++)    /* Set maxdia to the largest diameter */
   {
    if(maxdia < dia[x])
     {
     maxdia=dia[x];
     maxloc=x;
     encount=x;
     }
   }
  if(maxloc==0)
   maxloc=encount;
  lastdia=maxdia;
  datadres=0xFC1000 + (encount *5) + offset;
  shank=7;                       /* 1/4-28 threads without hex */
  }

/* 1/4-28 threaded adapter with hex */ else if(dia[3]>2000 && dia[3]<2480 && dia[5]>2000 && dia[5]<2480 &&
(dia[12]>2490 !! dia[10]>2490))
  {
  for(x=23; x<56; x++)
   {
   if(dia[x]>(dia[x+1]-4) && dia[x]<(dia[x+1]+4) && dia[x+1]>300)
    {
    average=(dia[x] + dia[x+1])/2;
    if(average > maxdia)
     {
     maxdia=average;
     maxloc=x+1;
     encount=x+1;
     }
    }
   }
  }
 if(maxdia >3300) /* May be an ST1861B, which has longer adapter */
   {
   for(x=28; x<56; x++)
      {
       if(dia[x]>(dia[x+1]-4) && dia[x]<(dia[x+1]+4) && dia[x+1]>300)
         {
          average=(dia[x] + dia[x+1])/2;
          if(average > maxdia)
            {
             maxdia=average;
```

```c
        maxloc=x+1;
        encount=x+1;
      }
    }
  }
}
if(maxdia <=300)            /* That is, maxdia did not get set yet */
{
 maxdia=dia[25];
 for(x=26; x<40; x++)
  {
   if(maxdia < dia[x])
    {
     maxdia=dia[x];
     maxloc=x;
     encount=x;
    }
  }
}
lastdia=maxdia;
datadres=0xFC1000 + (encount * 5) + offset;
while(lastdia>(.88*maxdia) && lastdia>200)
  getdia2();
mindia=lastdia;
minloc=encount;
if(maxdia >3900 || maxdia <300)            /* Reject */
  shank=15;
else                           /* 1/4-28 threaded adapter with hex */
  shank=6;
}
else if(dia[3]>2500 && dia[3]<3100 && dia[7]>2500 && dia[7]<3100 &&
(dia[11]>3110 || dia[12]>3110 || dia[13]>3110) && ((dia[27]>3050 &&
dia[27]<3870) || (dia[30]>3050 && dia[30]<3870)))
{
 maxdia=dia[27];
 encount=27;
   for(x=27; x<40; x++)       /* Set maxdia to the largest diameter */
    {
     if(maxdia < dia[x])
      {
       maxdia=dia[x];
       maxloc=x;
       encount=x;
      }
    }
   if(maxloc==0)
     maxloc=encount;
   lastdia=maxdia;
   datadres=0xFC1000 + (encount *5) + offset;
   shank=8;                   /* 5/16-24 threaded adapter */
 }
}

/* GENERATES HEXADECIMAL DRILL TYPE CODE FROM NUMERIC CODE

The numeric drill type codes are generated in the function
  "analyze" using the shank, feature, and length codes. The alpha-
  numeric type designations used here are in no way related to
  those used in the NAS907 specification. At the present time,
  constant web drills (types TJ, T6 & T12) are NOT separated from
  standard quick change drills (types BJ, B6 & B12). If separation
  is ever required, type TJ should be given a "driltype" value
  of "70" and type T6 a "driltype" of "71". Of course, the
  codes and pan assignments must be entered in the storage
  Carousel pan assignment table.

*/
```

```c
typetable()
{
 extern int drilcode;
 extern char *driltype;

if(drilcode <5000)
  switch(drilcode)
  {
   case 337: driltype="41";       /* Straight shank jobber */
    break;                          /* TYPE "AJ" */
   case 346: driltype="51";       /* Straight shank cobalt jobber */
    break;                          /* TYPE "EJ" */
   case 2897: driltype="42";      /* Straight shank 6 inch */
    break;                          /* TYPE "A6" */
   case 2906: driltype="73";      /* Cobalt straight shank 6 inch */
    break;                          /* TYPE "E6" */
   case 338: driltype="43";       /* Quick change jobber */
    break;                          /* TYPE "BJ" */
   case 2898: driltype="44";      /* Quick change 6 inch */
    break;                          /* TYPE "B6" */
   case 3393: driltype="64";      /* Nucon */
    break;                          /* TYPE "LJ" */
   case 3409: driltype="65";      /* Taper length */
    break;                          /* TYPE "MJ" */
   case 3418: driltype="72";      /* Cobalt Taper length */
    break;                          /* TYPE "EM" */
   case 3377: driltype="76";      /* Carbide tip Taper length */
    break;                          /* TYPE "GM" */
   case 340: driltype="43";       /* Constant web quick change jobber */
    break;                          /* TYPE "TJ" */
   case 2900: driltype="44";      /* Constant web quick change 6 inch */
    break;                          /* TYPE "T6" */
   case 3156: driltype="6F";      /* Constant web quick change 12 inch */
    break;                          /* TYPE "T12" */
   case 273: driltype="66";       /* Double margin straight shank jobber */
    break;                          /* TYPE "NJ" */
   case 2833: driltype="67";      /* Double margin straight shank 6 inch */
    break;                          /* TYPE "N6" */
   case 274: driltype="68";       /* Double margin quick change jobber */
    break;                          /* TYPE "PJ" */
   case 2834: driltype="69";      /* Double margin quick change 6 inch */
    break;                          /* TYPE "P6" */
   case 1045: driltype="6A";      /* D.M. short quick change 1 inch */
    break;                          /* TYPE "Q1" */
   case 1301: driltype="6B";      /* D.M. short quick change 1-1/2 inch */
    break;                          /* TYPE "Q1-1/2" */
   case 1813: driltype="6C";      /* D.M. short quick change 2-1/4 inch */
    break;                          /* TYPE "Q2-1/4" */
   case 2069: driltype="6D";      /* D.M. short quick change 3 inch */
    break;                          /* TYPE "Q3" */
   case 3153: driltype="6E";      /* Straight shank 12 inch */
    break;                          /* TYPE "A12" */
   case 3154: driltype="6F";      /* Quick change 12 inch */
    break;                          /* TYPE "B12" */
   case 1109: driltype="45";      /* Short quick change 1 inch */
    break;                          /* TYPE "C1" */
   case 1621: driltype="46";      /* Short quick change 2-1/8 inch */
    break;                          /* TYPE "C2-1/8" */
   case 2133: driltype="47";      /* Short quick change 3 inch */
    break;                          /* TYPE "C3" */
   case 2645: driltype="48";      /* Short quick change 4 inch */
    break;                          /* TYPE "C4" */
   case 599: driltype="49";       /* Threaded shank w/o hex 1/2 inch */
    break;                          /* TYPE "D 1/2" */
   case 855: driltype="4A";       /* Threaded shank w/o hex 3/4 inch */
    break;                          /* TYPE "D 3/4" */
```

```
       case 1111: driltype="4B";      /* Threaded shank w/o hex 1 inch */
         break;                                    /* TYPE "D1nh" */
       case 1110: driltype="4C";      /* Threaded shank 1 inch */
         break;                                    /* TYPE "D1" */
       case 1622: driltype="4D";      /* Threaded shank 2-1/8 inch */
         break;                                    /* TYPE "D2-1/8" */
       case 2134: driltype="4E";      /* Threaded shank 3 inch */
         break;                                    /* TYPE "D3" */
       case 2390: driltype="4F";      /* Threaded shank 3-1/2 inch */
         break;                                    /* TYPE "D3-1/2" */
       case 2646: driltype="50";      /* Threaded shank 4 inch */
         break;                                    /* TYPE "D4" */
       case 339: driltype="52";       /* Quick change cobalt jobber */
         break;                                    /* TYPE "FJ" */
       case 305: driltype="53";       /* Straight shank carbide tip jobber */
         break;                                    /* TYPE "GJ" */
       case 306: driltype="55";       /* Quick change carbide tip jobber */
         break;                                    /* TYPE "HJ" */
       case 307: driltype="55";       /* Quick change carbide tip jobber */
         break;                                    /* TYPE "HJ" */
       case 2865: driltype="54";      /* Straight shank carbide tip 6 inch */
         break;                                    /* TYPE "G6" */
       case 2867: driltype="56";      /* Quick change carbide tip 6 inch */
         break;                                    /* TYPE "H6" */
       case 289: driltype="57";       /* Straight shank stoveburner jobber */
         break;                                    /* TYPE "IJ" */
       case 2849: driltype="58";      /* Straight shank stoveburner 6 inch */
         break;                                    /* TYPE "I6" */
       case 291: driltype="59";       /* Quick change stoveburner jobber */
         break;                                    /* TYPE "JJ" */
       case 2851: driltype="5A";      /* Quick change stoveburner 6 inch */
         break;                                    /* TYPE "J6" */
       case 321: driltype="61";       /* Straight shank hi-spiral jobber */
         break;                                    /* TYPE "KJ" */
       case 2625: driltype="62";      /* Straight shank hi-spiral 4 inch */
         break;                                    /* TYPE "K4" */
       case 2881: driltype="63";      /* Straight shank hi-spiral 6 inch */
         break;                                    /* TYPE "K6" */
       case 4417: driltype="77";      /* Parabolic flute taper length */
         break;
       case 22: driltype="7A";                     /* "BS" drills */
         break;
       case 3617: driltype="7A";
         break;
       case 3633: driltype="7A";
         break;
       default: driltype="00";        /* Unknown or rejected drills */
         break;
    }
  else
   driltype="00";
 }

/* SEARCHES FOR THE FIRST FLUTE VALLEY

Mindia comes in set to the value of the last diameter obtained
   in the preceeding shank routine. Flutestart is used in the
   lentable function to help differentiate between certain 6 inch
   and jobber length drills. Upon exiting this function, minlcc
   will mark the location of the flute valley and will be used in
   the helix function to calculate the flute helix angle.
   Margdia4 gets set here to the value of the maximum diameter
   found to this point. If possible, it will be updated in the
   margin1 function. It will be used later in the lencalc function
   to calculate backtaper.
*/
```

```
valley1()
{
 extern int mindia,minloc,lastdia,encount,flutestart,m4loc,margdia4;
 extern int maxdia,marsearch;

if(lastdia<.4 * maxdia)
  return;
 if(marsearch==0)               /* If first time thru this routine... */
  flutestart=(enc ount-..      /* Flag the beginning of the ..... */
  m4loc=encount - 2;            /* Location margdia4                  */
  margdia4=maxdia;
 while(lastdia<=mindia+50 && encount < 600)
  {                             /* Determine where the diameter goes */
                                /* thru a minimum. A threshold of    */
                                /* .0050 inches is used to reduce    */
   getdia2();                   /* the effects of grind irregulari-  */
   if(lastdia<.4 * maxdia)      /* ties and/or dirt.                 */
    return;
   if(lastdia<=mindia)
    {
     mindia=lastdia;
     minloc=encount;
    }
  }
}

/* SEARCHES FOR SECOND FLUTE VALLEY

After the start of a flute valley is found, mindia is updated
   until a minimum dimension is found. A threshold of .0075 inches
   is used to reduce the effects of grind irregularities or dirt.
   When the valley is found, the variable "encount" will mark its
   location and be used to calculate helix angle if required.
*/ valley2()
{
 extern int maxdia,mindia,lastdia,encount;

if(lastdia<200)
  return;
 while(mindia>.88*maxdia)       /* The recessed land behind the first */
  {                             /* margin sometimes slopes up. This   */
   getdia2();                   /* test reduces the possibility of    */
   if(lastdia<200)              /* mistaking this for a flute valley. */
    return;
   mindia=lastdia;
  }
 while(lastdia<mindia+75)
  {
   getdia2();
   if(lastdia<200)
    return;
   if(lastdia<mindia)
    mindia=lastdia;
  }
}

/* variables.h */
        /* declaration of global variables */ int backtaper;      /* amount of drill backtaper */
char *datadres;     /* data pointer */
int dia[67];        /* converted drill data used by shank routines */
int drilcode;       /* drill type code number */
```

```
char *driltype;       /* alpha-numeric drill type designation */
int encount;          /* drill feed distance encoder pulse counter*/
int feature;          /* drill feature code */
int flutestart;       /* flag set to mark start of flutes */
int lastdia;          /* current diameter data point */
int lencode;          /* nominal overall length code number */
float length;         /* overall drill length in inches */
int mcount;           /* count of diameters on first margin = to maxdia */
int mar1count;        /* first margin search distance counter */
int mar2count;        /* second margin search distance counter */
int margdia1;         /* diameter at first margin */
int margdia2;         /* diameter at second margin */
int margdia4;         /* first diameter in backtaper calc. */
int marsearch;        /* flag set if margin not found on first try*/
int maxdia;           /* maximum diameter of drill */
int maxloc;           /* location of maximum diameter */
int mindia;           /* minimum diameter (second flute valley) */
int minloc;           /* location of first flute valley */
int m4loc;            /* location of margdia4 */
int offset;           /* number of nulls at start of data buffer */
int recpid;           /* recognition process I.D. number */
int shank;            /* drill shank type code number */
char *size;           /* alpha-numeric drill size designation */
float tangent;        /* tangent of flute helix angle */
```

- *Data Acquisition Files*

```
rom08: vector08.r srtmod08.r
    l68 -r=ec000 -o=rom08 vector08.r srtmod08.r vector08.r: vector08.a
    r68 vector08.a -o=vector08.r srtmod08.r: srtmod08.a
    r68 srtmod08.a -o=srtmod08.r

* version 15 6/13/88 last version 14 6/13/88
  OPT g
RamVect  equ 8
Buffend  equ $aff
Buffsrt  equ $f1000
IntRam   equ $1400
IntRam2  equ $1500
PortAdr  equ $ffff0
Bytcnt   equ $f1f20
mpntr    equ $f1fc0
apntr    equ $f1f10
flpntr   equ $f1f30
donepntr equ $f1f40

* register usage
* a0 - pointer to common buffer area
* a1 - pointer used with a5 to transfer from internal ram to common ram
* a2 - pointer to store initial data
* a3 - pointer to input/output ports
* a4 - pointer to onboard memmory address buffer
* a5 - pointer used to copy from internal ram to common buffer
* a6 - temporary buffer
* d1 - not used
* d2 - not used
* d3 - byte counter for memory indexing
*
* This is a program written to grab the data from the laser mikes. The
* program first initializes the stack and copies some of the vectors
* from rom in the lowest locations in memory. Once the vectors are
```

* loaded the parallel port is initialized and the strobe lines are set
* and interrupts are enabled in in the parallel chip. Next the on board
* memory buffer and common flag area are cleared.
*
* The processor is then shutdown and waits for an interrupt from the
* laser mike to occur. The interrupt section must be kept very short or
* the laser mike will transfer the data faster than it can be recieved,
* this will cause SYSTEM FAILURE. So add to the interrupt section with
* great care.
*
* Two types of interrupts can occur. Both of them come from the sy6522a.
* One of the interrupts is the strobe line from the Laser mikes the
* other is a signal from the 68000 that the drill has finished the
* data collection stage.  When this signal is recieved the memory
* location defined by flpntr is check to see if it is zero.  Nonzero
* means that the data done interrupt was a mistake. The processor then
* resets the pointers and waits for new data to come in.
*
* When the laser mic interrupt is complete the buffer pointer is checked
* to see if it is at the end of the buffer. If so, it is reposition
* to the last byte minus one of the buffer.  While in the interrupt
* routine the data done interrupt is checked to see if all the data has
* been collected. If so it sets a flag in the upper byte of d0 which
* is returned from the interrupt.  If the flag is not set
* the processor is put to sleep while it waits for another byte of data.
*
* Once it has been determined that the data is complete the data in the
* internal buffer is copied into a common memory accessed by both the
* 68000 and the 68008. After the data has been transfer a port bit is
* toggle that tells 68000 that data can now be read from the common
* buffer.
*
* Exceptions have be added for some the the vectors so that if an
* problem occurs they will be flagged the system will reset itself.
*
*
************* parallel port definitions ***************************
*     signal name        pia pin name         direction
*     strobe             ca1                  input
*     busy               ca2                  output
*     data1              pa0                  input
*     data2              pa1                  input
*     data3              pa2                  input
*     data4              pa3                  input
*     data5              pa4                  input
*     data6              pa5                  input
*     data7              pa6                  input
*     data8              pa7                  input
*     datadone           cb1                  input
*     data ready         pb0                  output
*

```
 psect srtmod_08,$101,0,0,0,Start
Start: move.w #$2700,sr  disable all interrupts
 lea RamVect,a0 copy vector table into ram
 movea.l #RomVect+8,a1 start address of ram vectors
 move.w #33,d0  the number of vectors we will copy
CopVect move.l (a1)+,(a0)+ copy done here
 dbra d0,CopVect continue until all copied
expstart
 movea.l #PortAdr,a3 get the port address
 move.b #$0f,d0 make lower nibble output
 move.b d0,2(a3) store in data direction reg
 clr.b 3(a3) porta data direction register (input)
 move.b #$cc,$c(a3) set busy line low (cb1)
```

```
  move.b #$92,$e(a3) enable interrupt (ca1 & cb1)
  movea.l #IntRam,a4 point to common addr area
  move.l #Buffsrt,apntr this is start of ram buffer
  move.l #IntRam2,0(a4) initialize onboard data pointer
  move.b 1(a3),d0 clear any interrupts on a port
  move.l #IntRam2,a5   point to internal data buffer
  move.l #Buffend-1,d3 get total number of bytes
clp clr.b (a5)+         get busy clearing data
  dbra d3,clp
  move.l #$a00a,flpntr  set flag waiting for data
waitlp stop #$2400 enable interrupt above level 4
  cmpa.l #(IntRam2+Buffend-1),a2 check for end of buffer
  ble.s nextchk
  move.l #(IntRam2+Buffend-1),0(a4)   stay at the end of buffer
nextchk move.l #$0a000000,d1
  cmp.l d1,d0 d0 set in the interrupt routine
  bne.s waitlp
  move.l flpntr,d0 make sure our flag is cleared
  bne.s herewegoagain
  move.l #IntRam2,a1 get the start of internal buffer
  movea.l #Buffsrt,a5 get start address address
  move.l #Buffend,d3
  clr.b (a2)+ write out zero
loopagain
  move.b (a1)+,d0 start transfer
  move.b d0,(a5)+ store in external buffer
  dbra d3,loopagain
donetrans
  move.b #$0e,d0
  move.b d0,0(a3) signal data transfer complete
  move.b d0,donepntr
herewegoagain
  bra expstart
***********************************************
*
* Interrupt service routine
*
*
LsrInt: btst.b #$1,13(a3)
  beq.s transdone
  move.b #$ce,12(a3) set the busy line high
  move.l 0(a4),a2 get the buffer pointer
  move.b 1(a3),(a2) clear the interrupt and store data
  addq.l #1,0(a4) inc byte pointer
  move.b #$cc,12(a3) clear busy line
  bra.s outside
transdone move.b #1,0(a3) clear interrupt clear data transfer flag
  move.l #$0a000000,d0
outside addq.w #1,Bytcnt
  rte
***********************************************
*
* Error trap routine
*
msg dc.b "exception error occurred "
msg1 dc.b "bus exception error occurred "
msg2 dc.b "addr exception error occurred "
  align
Etrap: move.w #$2700,sr    *this routine is executed if strange error
  movea.l #mpntr,a5        *occurs. it prints a message that can be
  lea msg(pcr),a0          * read by the system.....
  move.l #25,d0
loopex move.b (a0)+,(a5)+
  dbra d0,loopex
  move.l #$1000,a7 reset stack pointer
  bra expstart
```

```
*************************** bus error ***************************
Btrap: move.w #$2700,sr   * this routine is executed if an bus error
 move.l #mpntr,a5         * occurs
 lea msg1(pcr),a0
 move.l #29,d0
loopex1 move.b (a0)+,(a5)+  * write out message
 dbra d0,loopex1
 lea 14(sp),a0
 move.l #14,d0
loopex11 move.b (a0)+,(a5)+  * write out address of bus error
 dbra d0,loopex11
 move.l #$1000,a7 reset stack pointer
 bra expstart
*************************** address error ***************************
Atrap: move.w #$2700,sr   * address error
 move.l #mpntr,a5
 lea msg2(pcr),a0
 move.l #30,d0
loopex2 move.b (a0)+,(a5)+  * write message to memory
 dbra d0,loopex2
 move.l #$1000,a7 reset stack pointer
 bra expstart
stay3
*version 10
 btst.b #$1,13(a3)
 bne.s stay3
 bra expstart
*version 10 end
 ends
* the following is the vector table for the 68008 processors.
* it must be asmbled and merged at the beginning of the srtmod08 file
 nam 68008 vector table
 psect vector_08,0,0,0,0,0
RomVect: dc.l $1000 *initial stack pointer
 dc.l Start   *inital starting address
 dc.l Btrap   *error trap vectors
 dc.l Atrap   *bus error
 dc.l Etrap   *address error
 dc.l Etrap   *illegal instruction
 dc.l Etrap   *zero divide
 dc.l Etrap   *chk instruction
 dc.l Etrap   *trapv instruction
 dc.l Etrap   *privilege Violation
 dc.l Etrap   *trace
 dc.l Etrap   *line 1010 em
 dc.l Etrap   *line 1111 em
 dc.l 0
 dc.l 0
 dc.l 0
 dc.l 0
 dc.l 0    *reserved vectors
 dc.l 0
 dc.l 0
 dc.l 0
 dc.l 0
 dc.l 0
 dc.l Etrap
 dc.l 0 autovect 1
 dc.l 0 autovect 2
 dc.l 0 autovect 3
 dc.l 0 autovect 4
 dc.l LsrInt  autovect 5
 dc.l 0 autovect 6
 dc.l Etrap  autovect 7
 dz.l 200
 ends
```

- *Multiple Process Files*

```c
#include "message.h"
include <time.h>
include <stdio.h>
extern FILE *g_bamport;
extern char *g_message;
int receive(_x,_fp,_flag,_tmout)
FILE *_fp;
char *_x,*_flag;

int _tmout;
  {
    MMBB *st;
    int _d=0,_r=0,_tmct=0,tdelay=5;
    char _sec,*message;

message=g_message;
    st=(MMBB *)(0xFC0540);
    if(_tmout==0)
      {
        while(1)
          {
            if((_d=_gs_rdy(_fp->_fd))!=-1)
              {
                while(1)
                  {
                    if((_d=_gs_rdy(_fp->_fd))!=-1)
                      {
                        read(_fp->_fd,_x+_r,1);
                        if(*(_x+_r)==0xd || *(_x+_r)==0xa)
                          {
                            *(_x+_r)=0; strcpy(st->recm,_x);
                            if(strcmp(_x,"QUIT")==0 || strcmp(_x,"UIT")==0)
                              {
                                getout(message,_fp,g_bamport);
                              }
                            return(_r);
                          }
                        else _r++;
                      }
                  }
              }
            if(*_flag=='Y') break;
          }
        strcpy(st->recm,_x);
        return(_r);
      }
    else
      {
        initimecount(&_sec);
        while(1)
          {
            timecount(&_tmct,&_sec);
            if((_d=_gs_rdy(_fp->_fd))!=-1)
              {
                while(1)
                  {
                    if((_d=_gs_rdy(_fp->_fd))!=-1)
                      {
                        read(_fp->_fd,_x+_r,1);
                        if(*(_x+_r)==0xd || *(_x+_r)==0xa)
                          {
                            *(_x+_r)=0; strcpy(st->recm,_x);
                            if(strcmp(_x,"QUIT")==0 || strcmp(_x,"UIT")==0)
                              {
```

```c
            getout(message,_fp,g_bamport);
         }
         return(_r);
      }
         else _r++;
      }
   }
  }
  if(*_flag=='Y' || _tmct>=_tmout){ break;}
  }
  strcpy(st->recm,_x);
  return(_r);
} transmit(_x,_fp)
FILE *_fp;
char *_x;
  {
   MMBB *st;
   int _i,_w;
   char _y[100],_lf[2];

st=(MMBB *)(0xFC0540);
     _lf[0]=0x0a; _lf[1]=0;
     strcpy(st->tranm,_x);
     strcpy(_y,_x);
     strcat(_y,_lf);
     _i=strlen(_y);
     _w=write(_fp->_fd,_y,_i);
     fflush(_fp);
     return(_w);
  } timecount(_tmct,_sec)
int *_tmct;
char *_sec;
  {
     struct sgtbuf timebuf;
     char _sc,_d;

getime(&timebuf);
     _sc=timebuf.t_second;
     if(*_sec>_sc) _d=60-*_sec+_sc;
     else _d=_sc-*_sec;
     *_tmct=*_tmct+_d;

*_sec=_sc;
  } initimecount(_sec)
char *_sec;
  {
     struct sgtbuf timebuf;

getime(&timebuf);
     *_sec=timebuf.t_second;
  }

/*-------------------------------------------------
SYNOPSIS:
include <stdio.h>
int receive(message,port_pointer,flag,timeout)
char *message,*flag;
FILE *port_poiter;
int timeout;
```

DESCRIPTION:
This function will read a message from a serial port pointed to
by "port_pointer" (port_pointer can be obtained using "fopen()").
The number of bytes read is returned. "flag" is a character pointer.
When flag='Y' the receive function is terminated. "timeout" is the
time in seconds to wait for data. If "timeout=0" the function will
wait indefinitely until data becomes available. It returns 0 if
timeout is encountered, else it returns the number of bytes read.
-----------------------------------------------

SYNOPSIS:
include <stdio.h>
int transmit(message,port_pointer)
char *message;
FILE *port_pointer;

DESCRIPTION:
This function writes a message to a serial port pointed to
by "port_pointer" ("port_pointer" is obtained by using "fopen()").
The number of bytes written is returned.
-----------------------------------------------*/

```c
#define mem(adr) ((unsigned char *)(adr))
#define mem1(adr) ((unsigned short *)(adr))
#define addr 0xFFED00

/* The following initializes the pia chips to handle the appropiate
input and output. In this initialization the control byte of the pia
is set to zero so the data direction registers can be set to outputs.
Once the direction of the outputs are set the control byte is set
so that data can be written out. An hex ff is written because the
output is inversed therefore ff == 00 on the outputs.
*/ pioinit()
{
 *mem(0xffe801) = 0x00;
 *mem(0xffe803) = 0x00; /* access set for data direction registers */
 *mem(0xffc701) = 0x00;
 *mem(0xffc703) = 0x00;
 *mem(0xffe800) = 0xff;
 *mem(0xffe802) = 0xff;                /* set port direction to output */
 *mem(0xffc700) = 0xff;
 *mem(0xffc702) = 0xff;
 *mem(0xffe801) = 0x04;                /* set bit for data port on pia */
 *mem(0xffe803) = 0x04;
 *mem(0xffc701) = 0x04;
 *mem(0xffc703) = 0x04;
 *mem(0xffe800) = 0xff;
 *mem(0xffe802) = 0xff;                /* zero the output ports */
 *mem(0xffc700) = 0xff;
 *mem(0xffc702) = 0xff;
} pioch(output)
char output;
{
    *mem(0xffe800) = ~(output);
} piochl(output)
char output;
{
    *mem(0xffe802) = ~(output);
}
```

```c
pioch2(output)
char output;
{
    *mem(0xffc700) = ~(output);
} och3(output)
  ·ar output;

*mem(0xffc702) = ~(output);
}
/* The following few line are for the parallel input ports (pip).
Due to the inversing caused by the opto isolators the inputs are
inverted so the active high signal will be true.(If you know what
I mean).
*/ char pip0()
{
    char input;
    return(input = ~(*mem(0xffe880)));
} char pip1()
{
    char input;
    return(input = ~(*mem(0xffe881)));
} char pip2()
{
    char input;
    return(input = ~(*mem(0xffe882)));
} char pip3()
{
    char input;
    return(input = ~(*mem(0xffe883)));
}
```

```
    ttl load data block pointer
    nam makmodule.a
    psect makmodule.a,0,0,0,0,0
mod_link:
    move.l d0,a0
    move.w #$0400,d0
    OS9 F$Link
    bcc.s lp
    move.l #0,d0
lp
    move.l a1,d0
    rts mod_unlink:
    move.l d0,a0
    move.w #$0400,d0
    OS9 F$UnLoad
    rts mod_delete:
    move.l d0,a0
    move.w #$0400,d0
    OS9 F$UnLoad
    rts
```

```
mod_create:
 move.l d1,-(sp)
 move.w #$8000,d1
 move.w #$ffff,d2
 move.l (sp),a0
 OS9 F$DatMod
 move.l a1,d0
 move.l (sp)+,d1
 rts
 ends
```

/* OFFSETS FROM "MESSMOD" COMMON DATA MODULE */

/* All the defined flags are 1 byte long, unless otherwise noted. */

```c
#define MESSAGEFLAG 0    /* This flag is set (1) when error occurs */
                         /* in Orient task.   1 byte                */
#define STARTFLAG 2      /* Flag for starting Recognition System.   */
                         /* This flag is set (1) when the recog-    */
                         /* ition system is ready to start.         */
#define FDRILL 4         /* Set when drill enters Flipper.          */
                         /* Cleared when drill taken from Flipper.  */
#define G5DRILL 6        /* Set when drill leaves the Flipper.      */
                         /* Cleared when drill leaves Gate 5.       */
#define ORIENT 7         /* Set to Y if orient task is running.     */
#define RECOGNIZE 8      /* Set to Y if recognize task is running.  */
#define REJCOUNT 10      /* No. of consecutive unidentified drills  */
#define DIRTCOUNT 16     /* No. of refects for which maxdia=9999    */
#define SIZECOUNT 20     /* No. of rejects with maxdia out of range */
define MESSAGEBUF 100   /* For Orient task error message.          */ typedef struct mmbb { char tranm[80],recm[20];}MMBB;
typedef struct iostuff
    {
    unsigned char op1;
    unsigned char op2;
    unsigned char op3;
    unsigned char op4;
    }IOD;
```

- *Servo Controller Files*

```
cc bam0.r bam1.r bam2.r bam3.r bam4.r -l=../datatransc.r
 -l=libfile -f=newbam -n=Newbam include <stdio.h>
define BUFSIZE 512     /* I/O BUFFER SIZE */
#define BUFHALF 256     /* HALF OF BUFSIZE */
#define YES 1
#define NO  0
define ACK 6           /* Acknowledge character */ int txack =0;
FILE *ofp,*g_bamport;
char *g_message;
main()
{
char mess[10],x[80];
int n,a,d=0,fl=0;
extern FILE *ofp;
FILE *fp;
/*system("Xmode /p noecho nopause reprint=0 quit=0");
   system("iniz p");   */
```

```
ofp=g_bamport = fopen("/p","w+");
fp=fopen("/t1","w+");
if(ofp == 0)
    {
     transmit(";BAM:can't open p port",fp);
     receive(x,fp,&f1,30);
     getout("bye bye !",fp,g_bamport);
    }
n = bamcom(fp);
switch(n)
    {
    case 1:
        transmit(":BAM:communication established",fp);
        receive(x,fp,&f1,30);
        a = download("Newpar.bam",fp);
        if(!a)
            {
            bamcom(fp);
            a = download("Newpar.bam",fp);
            if(!a)
                {
                 transmit("Unable to download BAM data",fp);
                 receive(x,fp,&f1,30);
                }
            }
        break;
    case 0:
        transmit("Unable to communcate with bam",fp);
        receive(x,fp,&f1,30);
        break;
    case -1:
        transmit("BAM fault was detected consult factory",fp);
        receive(x,fp,&f1,30);
        break;
    default:
        transmit("Fatal BAM Error 105",fp);
        receive(x,fp,&f1,30);
            break;
        }
      getout("bye bye!",fp,g_bamport);
    } getout(mess,fp,bamport)
    char *mess;
    FILE *fp,*bamport;
    {
       extern FILE *ofp;
       fclose(fp);
       fclose(bamport);
    /*system("deiniz p"); */
       exit(0);
    }
#include <stdio.h>
#define BUFSIZE 512                        /* I/O BUFFER SIZE */
#define BUFHALF 256                        /* HALF OF BUFSIZE */
#define YES 1
#define NO  0
define ACK 6                              /* Acknowledge character */ struct buffer
    {
    char buff[BUFSIZE + 2];                /* character buffer */
    int nc;                    /* Number of characters in the buffer */
```

```c
        char *pold;                   /* Pointer to oldest char in buffer  */
        char *pnew;                   /* Pointer to location newest char +1 */
        char *pend;                            /* Pointer to end of buffer  */
        int bsize;                                      /* buffer size */
        };
extern int txack;

bamcom(fp)
FILE *fp;
{
char *prbuf, rbuf[80];
int i,j,c,nchar;

rbuf[0] = 0;                                   /* clear message buffer */
prbuf = rbuf;
nchar = 0;
txack = NO;                      /* Reset the transmit acknowledge flag. */
for(i = 1; i <= 10; i++)
    {
    r_out('\r');
    sleep(1);
    r_out('\r');
    sleep(1);
    r_out('\r');
    sleep(1);
    for(j=5000; 0 < j; j--)
      {
      c= r_in();
             /* sort through the characters returned by the bam. */
      if(txack)
        {
        txack = NO;
                    /* Confvig the bam communiction mode to :       */
        wr("\r 2 Stty\r");                        /* Bam prompt off */
        wr("6 Stty\r"); /* Half duplex with acknowledge each line */
        wr("11 Stty\r");         /* output control using xon-xoff */
              /* wait for bam to complete echoing Stty commands */
        dumpbuf(fp);
        return(1);
        }
      else if((c=='\r') || (c == '\n') || (nchar > 3))
        {
        if(!strncmp("ERR",rbuf,3))
          return(-1);
        else if(c == '\r')
          {
          dumpbuf(fp);
          wr("\r 2 Stty\r");                    /* Bam prompt off */
          wr("6 Stty\r");    /* Half duplex acknowledge each line */
          wr("11 Stty\r");        /* output control using xon-xoff */
              /* wait for bam to complete echoing Stty commands */
          dumpbuf(fp);
          return(1);
          }
        else
          {
          prbuf = rbuf;
          rbuf[0] = 0;
          nchar = 0;
          }
        }
      else if(c)
        {
```

```c
        *(prbuf++) = c;
        nchar++;
        }
    }
 return(0);
}
#include <stdio.h>
#define BUFSIZE 512                         /* I/O BUFFER SIZE */
#define BUFHALF 256                         /* HALF OF BUFSIZE */
#define YES 1
#define NO  0
define ACK 6                               /* Acknowledge character */ struct buffer
    {
    char buff[BUFSIZE + 2];                 /* character buffer */
    int nc;             /* Number of characters in the buffer */
    char *pold;         /* Pointer to oldest char in buffer   */
    char *pnew;         /* Pointer to location of newest char + 1 */
    char *pend;                     /* Pointer to end of buffer */
    int bsize;                              /* buffer size */
    };
download(mname,cport)
char *mname;
FILE *cport;
{
char buf[100];
.... ... . . ..;

dt=mod_link(mname);
if(dt == 0)
    {
    transmit("CAN'T LINK TO Newpar.bam MODULE",cport);
    receive(buf,cport,&fl,30);
    return(NO);
    }
mod_unlink(mname);
while(1)
    {
    modrd(buf,&dt);
    if(strcmp(buf,"end_of_file")==0) break;
    if(!bamcmd(buf,cport))
        {
        return(NO);
        break;
        }
    }
return(YES);
}
#include <stdio.h>
#define BUFSIZE 512                         /* I/O BUFFER SIZE */
#define BUFHALF 256                         /* HALF OF BUFSIZE */
#define YES 1
#define NO  0
define ACK 6                               /* Acknowledge character */ struct buffer
    {
    char buff[BUFSIZE + 2];                 /* character buffer */
    int nc;             /* Number of characters in the buffer */
    char *pold;         /* Pointer to oldest char in buffer   */
    char *pnew;         /* Pointer to location of newest char + 1 */
```

```
        char *pend;              /* Pointer to end of buffer */
        int bsize;               /* buffer size */
        };

extern int txack;
bamcmd(string,fp)
char *string;
FILE *fp;
{
char *pc;
int i,n,ntry;
float f;
int f1=0;
char buf[100];

n=strlen(string);
for(ntry =2;0 < ntry;ntry--)
        {
        txack = 0;
        for(i=n,pc=string;0<i;i--,pc++)
                {
                r_out(*pc);
                }
        --pc;
        if(*pc != '\r')
                {
                r_out('\r');
                }
        for(f=5000.00; !txack && (0.0 < f); f-= 1.0)
                {
                r_in();
                }
        if(txack == ACK)
                {
                return(YES);
                }
        else
                {
                transmit("Did not see an ACK",fp);
                receive(buf,fp,&f1,30);
                }
        }
return(NO);
} bamread(string,n)
char *string;
int n;
{
char * pc;
int c,nchar,timout;
timout = 0;
for(pc = string,nchar = 0,n--;(nchar < n) && (timout < 20000);)
        {
        c = r_in();
        switch(c)
                {
                case 0:
                        timout++;
                        break;
                case '\r':
                        *pc=0;
                        return(nchar);
```

```
            case 0x0a:
                timout = 0;
                break;
            default:
                *(pc++) =c;
                nchar++;
                timout = 0;
                break;
            }
        }
    *pc = 0;
    return(nchar);
    }
#include <stdio.h>
#define BUFSIZE 512                         /* I/O BUFFER SIZE */
#define BUFHALF 256                         /* HALF OF BUFSIZE */
#define YES 1
#define NO  0
define ACK 6                               /* Acknowledge character */ struct buffer
    {
    char buff[BUFSIZE + 2];                 /* character buffer */
    int nc;             /* Number of characters in the buffer */
    char *pold;         /* Pointer to oldest char in buffer */
    char *pnew;     /* Pointer to location of newest char + 1 */
    char *pend;                 /* Pointer to end of buffer */
    int bsize;                              /* buffer size */
    };
extern int txack;
extern FILE *ofp;
r_in()
{
char c;
if(_gs_rdy(ofp->_fd) > 0)
    {
    read(ofp->_fd,&c,1);
    fflush(ofp);
    if(c == ACK)
        {
        txack = c;
        c = '\r';
        }
    }
else
    c=0;
return(c);
} r_out(c)
char c;
{
write(ofp->_fd,&c,1);
fflush(ofp);
} wr(s)
char *s;
{
for( ;*s;s++)
    r_out(*s);
}
```

```
dumpbuf(fp)
FILE *fp;
{
int timout;
for(timout =0;timout < 2000; timout++)
        {
        if(r_in())
                timout=0;
        }
}
#include <stdio.h>
main()
  {
    FILE *fp;
    int dt;
    char buf[100];

fp=fopen("/h0/ly/ly/newpar.bam","r");
    dt=mod_link("Newpar.bam");
    if(fp==0 !! dt==0)
      {
        printf("unable to open file\n");
        exit(0);
      }
    mod_unlink("Newpar.bam");
    while(fgets(buf,100,fp)!=0)
      {
        modwr(buf,&dt);
      }
    fclose(fp);
    modwr("end_of_file",&dt);
  }
```

What is claimed is:

1. A drill bit recognition system, comprising:
a drill bit feed track operable to sequentially convey drill bits along a certain path;
first scanner means positioned along an upstream portion of said track, and operable to at least provide data sufficient to determine the end-to-end orientation of each bit as it passes through said upstream portion;
a flipper mechanism positioned along said path downstream of said scanner means, said flipper mechanism including means selectively operable to reverse the end-to-end orientation of any one of said bits;
second scanner means positioned along a downstream portion of said track, and downstream of both said first scanner means and said flipper mechanism, said second scanner means being operable to at least provide a plurality of crosswise diameter scans taken at spaced positions along the length of each bit as said bit passes through said second scanner means; and
a drill bit recognition computer, operatively connected to said first scanner means, said flipper mechanism and said second scanner means, and programmed to selectively operate said flipper mechanism in response to the data provided by said first scanner means, and further, said computer being programmed to recognize the diameter, shank type, flute characteristics and length of each bit from said crosswise diameter scans, to identify the type of each bit for later sorting after each bit exits said feed track.

2. The recognition system of claim 1, including a drill stroker, said stroker being operable to receive each bit as it travels along said feed track, and to convey said bit along said downstream portion of said track at a certain uniform velocity, and wherein said second scanner means includes a laser scanner operable to scan the diameter of each bit as it is conveyed along said downstream portion by said drill stroker, and to periodically produce a crosswise diameter scan indicating the diameter of the silhouette of each bit at a certain location along said bit, and wherein the velocity of said drill stroker and the scan rate of said laser scanner are cooperatively controlled by said computer in a manner so that said laser scanner outputs a crosswise diameter scan at certain equidistant positions along the length of each bit, said crosswise diameter scans being sequentially output as an array to a data acquisition computer that stores said array in an electronic memory, said memory being accessible by said recognition computer for recognizing the diameter, shank type, flute characteristics and length of each bit.

3. A drill bit recognition system, comprising:
a feed track portion operable to sequentially convey drill bits along a certain path;
at least one scanner oriented in a manner so as to scan each drill bit as it is conveyed along said path, and operable to generate scanner data indicating certain physical features of each bit;
a drill bit recognition computer controllably linked to both said feed track portion and said scanner, and programmed to control conveyance of said drill bits along said path, and to receive and process said scanner data, the programming of said computer being characterized in that it includes:

first programming means, operable to process said scanner data, for identifying the shank type of each drill bit;

second programming means, operable to process said scanner data, for identifying at least one flute characteristic of each drill bit;

third programming means, operable to process said scanner data, for identifying the length of each drill bit; and fourth programming means, operable to process said scanner data, for identifying the diameter of each drill bit;

wherein said computer is operable to ascertain the type of each one of said sequentially-conveyed drill bits from the identification of drill bit shank type, flute characteristic, length and diameter, so that said bits may be subsequently sorted as to type.

4. A method for identifying drill bit type, said bit having a butt end and a point end, and a shank portion adjacent said butt end, and a cutting flute portion extending from said shank portion to said point end the method comprising:

(a) obtaining a plurality of crosswise diameter measurements of the silhouette of said bit, substantially from said butt end to said point end;

(b) selecting a certain set of lengthwise locations along said shank portion of said bit, said selected locations being a certain preselected distance from said butt end and corresponding to a given drill bit shank type;

(c) analyzing the crosswise diameter measurements obtained in step (a), and determining which one of said measurements is at or nearest each one of said selected locations;

(d) comparing the values of each one of said measurements determined in step (c) above with expected diameters that would be present at the same location for a given drill bit shank type;

(e) positively identifying the shank type of said bit if said measurements determined in step (c) substantially correspond to said expected diameters;

(f) selecting another set of lengthwise locations corresponding to another drill bit shank type if said measurements determined in step (c) did not substantially correspond to said expected diameter; and (g) repeating the determinations and comparisons made in steps (c), (d), (e), and (f) above, but for said another set of said selected locations, until said measurements determined in step (c) for a given set of lengthwise locations substantially correspond to said expected diameters at said locations, and said shank type is positively identified.

5. The method of claim 4, including identifying the diameter of said drill bit after the shank type thereof has been identified, comprising:

selecting a starting diameter from said plurality of crosswise diameter measurements, and identifying such diameter as being a present maximum diameter;

selecting a starting location for analyzing drill bit diameter, said starting location being selected adjacent said shank portion of said bit;

sequentially analyzing said plurality of crosswise diameter measurements forwardly of said starting location, beginning adjacent said starting location and ending adjacent the point end of said bit, and comparing said forwardly-positioned crosswise diameter measurements with said present maximum diameter; and identifying an updated present maximum diameter if certain ones of said forwardly-positioned diameter measurements exceed said earlier identified present maximum diameter.

6. The method of claim 5, wherein identifying an updated present maximum diameter further includes:

determining whether at any time three sequential crosswise diameter measurements that are forwardly of said present maximum diameter exceed said present maximum diameter; and if so, determining whether any two of said three sequential crosswise diameter measurements are within a certain tolerance measurement relative to each other; and if so, identifying a new updated present maximum diameter that is substantially equal to the maximum diameter of said three sequential crosswise diameter measurements.

7. The method of claim 6, wherein said plurality of crosswise diameter measurements are taken along said bit silhouette at a spacing of approximately 0.03 inches from each other, and wherein said tolerance measurement for updating said present maximum diameter is 0.0003 inches.

8. The method of claim 5, including identifying the flute characteristics of said bit, comprising:

locating the first flute valley along said bit from said starting location toward said point end, by sequentially analyzing said forwardly positioned crosswise diameter measurement; and determining when said forwardly-positioned crosswise diameter measurements pass through a certain minimum value; followed by identifying the location of said certain minimum value as being the location of the first flute valley.

9. The method of claim 8, wherein identifying the flute characteristics of said bit further comprises:

searching for a first bit margin forwardly of said first flute valley by sequentially analyzing said crosswise diameter measurements forwardly of the location of said first flute valley, including determining whether said measurements go through a maximum after leaving said valley, followed by a margin relief within a certain range, said range being located no greater than a certain distance from said first flute valley, said margin relief being slightly less than the value of said maximum, wherein said maximum indicates the location of said first bit margin.

10. The method of claim 9, wherein said certain distance from said first valley is no greater than the present maximum diameter of said bit multiplied by two.

11. The method of claim 9, wherein identifying the flute characteristics of said bit further comprises:

searching for a second bit margin forwardly of said first margin, including determining the minimum diameter across said margin relief, and the location of said minimum diameter within said range, and thereafter determining whether any crosswise diameter measurements forwardly of such minimum diameter go through another maximum within a certain forward distance.

12. The method of claim 11, wherein said another maximum is equal to at least 0.0007 inches of said present maximum diameter.

13. The method of claim 8, including determining the flute helix angle of said bit by determining the location of the next forwardly-located flute valley, and calculating the flute helix angle on a basis of the present maximum diameter of said bit and the distance between said flute valleys.

14. The method of claim 8, wherein said minimum value is no more than 85% of said present maximum diameter.

15. The method of claim 4, wherein said plurality of crosswise diameter measurements are equidistant from each other, and further including:
   determining the length of said bit by multiplying the number of said plurality of crosswise diameter measurements by the distance between each measurement.

16. The method of claim 12, wherein said plurality of crosswise diameter measurements are 0.03 inches from each other.

* * * * *